US011776206B1

(12) United States Patent
Gupta et al.

(10) Patent No.: US 11,776,206 B1
(45) Date of Patent: Oct. 3, 2023

(54) EXTENDED REALITY SYSTEM AND EXTENDED REALITY METHOD WITH TWO-WAY DIGITAL INTERACTIVE DIGITAL TWINS

(71) Applicant: AWE Company Limited, Toronto (CA)

(72) Inventors: Neetika Gupta, Toronto (CA); Srinivas Krishna, Toronto (CA); Laura Thomas, Toronto (CA); Daniel Chantal Mills, Toronto (CA); Naimul Mefraz Khan, Toronto (CA)

(73) Assignee: AWE Company Limited, Toronto (CA)

( * ) Notice: Subject to any disclaimer, the term of this patent is extended or adjusted under 35 U.S.C. 154(b) by 0 days.

(21) Appl. No.: 18/088,431

(22) Filed: Dec. 23, 2022

(51) Int. Cl.
*G06T 17/05* (2011.01)
*G06T 7/70* (2017.01)
*G06V 10/25* (2022.01)
*G01C 21/36* (2006.01)
*G06V 10/74* (2022.01)
*G06F 16/29* (2019.01)

(52) U.S. Cl.
CPC .......... *G06T 17/05* (2013.01); *G01C 21/3635* (2013.01); *G06F 16/29* (2019.01); *G06T 7/70* (2017.01); *G06V 10/25* (2022.01); *G06V 10/761* (2022.01)

(58) Field of Classification Search
CPC .......... G06T 17/05; G06T 7/70; G06F 16/29; G06V 10/25; G06V 10/761; G01C 21/3635
USPC ....................................................... 345/419
See application file for complete search history.

(56) References Cited

U.S. PATENT DOCUMENTS

| 3,059,120 | A1 | 11/2011 | Hashima |
| 9,665,799 | B1 | 5/2017 | Munteanu |
| 10,937,188 | B2 | 3/2021 | Malisiewicz |
| 11,282,404 | B1 | 3/2022 | Yang |
| 2006/0028436 | A1 | 2/2006 | Armstrong |
| 2011/0182469 | A1 | 7/2011 | Ji |
| 2012/0092329 | A1 | 4/2012 | Koo |
| 2014/0177023 | A1 | 6/2014 | Gao |
| 2015/0016777 | A1 | 1/2015 | Abovitz |
| 2015/0070387 | A1 | 3/2015 | Schmalstieg |

(Continued)

OTHER PUBLICATIONS

Yang, Shichao, and Sebastian Scherer "Cubeslam: Monocular 3-d object slam". IEEE Transactions on Robotics 35.4 (2019): 925-938.

*Primary Examiner* — Hai Tao Sun

(57) ABSTRACT

An extended reality system and extended reality method for digital twins, in which the digital twin can be a virtual asset of a real asset. The real asset can be a real object. For example, an initiation of an event in relation to the real asset causes the extended reality method to generate one or more predicted virtual states which are predicted to achieve the event in the virtual asset. The event can be initiated through the real asset and through the virtual asset. The extended reality method can receive one or more further real states of the real asset which achieve the event. The extended reality method can generate a reality 3D map in an extended reality application which concurrently displays, in the 3D space, the virtual asset in the one or more predicted virtual states and the real asset in the one or more further real states.

23 Claims, 26 Drawing Sheets

(56) References Cited

U.S. PATENT DOCUMENTS

| | | |
|---|---|---|
| 2015/0206343 A1* | 7/2015 | Mattila .................. G06T 17/05 |
| | | 345/420 |
| 2015/0302652 A1 | 10/2015 | Miller |
| 2016/0011419 A1 | 1/2016 | Gao |
| 2016/0026253 A1 | 1/2016 | Bradski |
| 2016/0048737 A1 | 2/2016 | Kam |
| 2016/0259994 A1 | 9/2016 | Ravindran |
| 2017/0039759 A1 | 2/2017 | Huet |
| 2017/0124409 A1 | 5/2017 | Choi |
| 2017/0168566 A1 | 6/2017 | Osterhout |
| 2017/0221176 A1 | 8/2017 | Munteanu |
| 2018/0053056 A1 | 2/2018 | Rabinovich |
| 2018/0137642 A1 | 5/2018 | Malisiewicz |
| 2018/0189974 A1* | 7/2018 | Clark ....................... G06N 3/04 |
| 2018/0268220 A1 | 9/2018 | Lee |
| 2019/0180499 A1 | 6/2019 | Caulfield |
| 2019/0188895 A1 | 6/2019 | Miller, IV |
| 2019/0322275 A1* | 10/2019 | Ondruska .......... G01C 21/3647 |
| 2020/0008024 A1 | 1/2020 | Hu |
| 2020/0202554 A1 | 6/2020 | Malisiewicz |
| 2020/0219264 A1 | 7/2020 | Brunner |
| 2020/0219316 A1 | 7/2020 | Baik |
| 2020/0394848 A1 | 12/2020 | Choudhary |
| 2021/0134000 A1 | 5/2021 | Malisiewicz |

* cited by examiner

EXTENDED REALITY SYSTEM AND EXTENDED REALITY METHOD WITH TWO-WAY DIGITAL INTERACTIVE DIGITAL TWINS

TECHNICAL FIELD

Example embodiments extended reality (XR) applications having interactive digital twins of real assets.

BACKGROUND

Virtual 3-Dimensional (3D) maps can be made to represent real world environments. One form of a virtual 3D map is by way of a point cloud map (also known as point cloud). A point cloud map is a set of points in space. The points may represent a 3D shape or object, and can also represent background environment and fixed infrastructure. One way to represent the point cloud map is to give each point a set of Cartesian coordinates in 3D space. For example, an object can be represented by a plurality of points that represent the object.

Some digital twins are virtual objects that represent a real object (real twin), and can be in the form of a digital model or the point cloud map. Conventional digital twins can be static snapshots. For example, only the instant state of the real object is used for creating the digital twin.

A difficulty with such conventional digital twins is that the real object is often treated as a static object. As well, the data flow is often limited to one-way data flow of the real object to the digital twin.

It would be advantageous to provide a XR system and XR method for real-time dynamic interaction between digital twins (virtual assets) of real assets in the real world.

It would be advantageous to provide two-way control between the digital twin (virtual asset) and the real object.

It would be advantageous to predict the states of the real asset and display, in a 3D map of an XR application, both the real states of the real asset and the predicted states of the digital twin.

It would be advantageous to provide rule based modules to generate two-way control in the XR application between the virtual asset and the real asset.

It would be advantageous to provide machine learning models to generate two-way control in the XR application between the virtual asset and the real asset.

Additional difficulties of conventional digital twin systems may be appreciated in view of the Detailed Description, herein below.

SUMMARY

Example embodiments relate to an extended realty (XR) system and XR method for immersion and interaction with real assets and users in the real world. The XR method can be performed in real-time or near real-time to the detection of the real assets by a camera device. An example of the XR method can be applied to the scenario where a user wishes to control a digital twin (virtual asset) using a real asset, or control a real asset using a digital twin, or both. The user can use a display device to interact with the digital twin through a 3D map of the XR application or other 3D environments. The XR application can be, for example, a virtual reality (VR) application, an augmented reality (AR) application, or a mixed reality (MR) application.

An example of the XR method can be applied to the scenario of convenient and automated mapping of the real world, or a 3D space in the real world containing a plurality of assets (objects) and a plurality of camera devices. A camera device can be used to capture one or more images of an object. The XR method can be used to calculate a cuboid and a centroid of an object. The camera device can send the location of the centroid without sending an entire 3D model of the object (e.g. point cloud map). When the object is moved, the XR method can use the centroid, the cuboid, or anchor points, to track the movement of the cuboid in order to determine the new location of the object. A 3D map can be generated that takes into account the new location of the object.

Another example embodiment is an extended reality (XR) method, comprising: receiving: an asset label of a real asset and a real state of the real asset, the real state including: i) at least one image of the real asset, ii) anchor points in real world coordinates of real 3-Dimensional (3D) space, and iii) a real location of the real asset in the real world coordinates of the real 3D space; generating, using i) the at least one image of the real asset, ii) the anchor points in the real world coordinates of the real 3D space, and iii) the real location of the real asset in the real world coordinates of the real 3D space: a 3D map in an XR application which includes a virtual asset of the real asset with a virtual state which matches the real state; receiving navigation through the 3D map in the XR application to a virtual location of the virtual asset which matches the real location of the real asset in the real world coordinates of the real 3D space; receiving an initiation of an event of the real asset; generating, using a physics engine: one or more predicted virtual states of the virtual asset which are predicted to achieve the event in the real world coordinates of a virtual 3D space; receiving one or more further real states of the real asset which achieve the event; and generating the 3D map in an XR application with a concurrent display of the virtual asset in the one or more predicted virtual states and the real asset in the one or more further real states which achieve the event.

In an example embodiment of any of the above, the receiving the initiation of the event is from the real asset.

In an example embodiment of any of the above, the receiving the initiation of the event includes receiving a communication from the real asset.

In an example embodiment of any of the above, the receiving the initiation of the event includes: receiving one or more further real states of the real asset; and detecting a change in the real state of the real asset.

In an example embodiment of any of the above, the receiving the one or more further real states of the real asset includes receiving a respective bounding box for each of the at least one image of the real asset, and wherein the detecting the change in the real state includes comparing the respective bounding box and the at least one image of the real asset with a known attribute of the real asset.

In an example embodiment of any of the above, the receiving the one or more further real states of the real asset includes receiving a centroid of a cuboid of the real asset in the real world coordinates of the real 3D space, and wherein the detecting the change in the real state includes comparing the centroid with a known centroid of the real asset.

In an example embodiment of any of the above, the receiving the one or more further real states of the real asset includes receiving a cuboid in the real world coordinates of the real 3D space, and wherein the detecting the change in the real state includes comparing the cuboid with a known cuboid of the real asset.

In an example embodiment of any of the above, the receiving the one or more further real states of the real asset includes receiving further anchor points of the real asset, and wherein the detecting the change in the real state includes comparing the further anchor points with known anchor points of the real asset.

In an example embodiment of any of the above, the extended reality method further includes generating a cuboid of the real asset or a centroid of the cuboid using the anchor points of the real asset, wherein the detecting the change in the real state includes comparing the cuboid or the centroid with a known cuboid of the real asset or a known centroid of the real asset.

In an example embodiment of any of the above, the receiving the one or more further real states of the real asset includes receiving a pose in the real world coordinates of the real 3D space, and wherein the detecting the change in the real state includes comparing the pose with a known pose of the real asset.

In an example embodiment of any of the above, the receiving the one or more further real states of the real asset includes receiving further anchor points, and wherein the detecting the change in the real state includes using the further anchor points to determine a change in a pose in the real world coordinates of the real 3D space of the real asset.

In an example embodiment of any of the above, the receiving the one or more further real states of the real asset includes receiving a 3D model or a point cloud of the real asset, and wherein the detecting the change in the real state includes comparing the 3D model or the point cloud with a known 3D model or a known point cloud of the real asset.

In an example embodiment of any of the above, the receiving the one or more further real states of the real asset includes receiving sensor information other than visually detected information of the real asset wherein the detecting the change in the real state uses the sensor information.

In an example embodiment of any of the above, the extended reality method further includes determining that the one or more predicted virtual states does not match the one or more further real states of the real asset which achieve the event, and in response causing the real asset to change the one or more further real states of the real asset to match the one or more predicted virtual states.

In an example embodiment of any of the above, the causing includes sending an instruction to the real asset.

In an example embodiment of any of the above, the causing includes sending an instruction to a camera device, a display device, or a robot.

In an example embodiment of any of the above, the extended reality method further includes determining that the one or more predicted virtual states does not match the one or more further real states of the real asset which achieve the event, and in response updating the virtual state of the virtual asset in the 3D map of the XR application to match at least the one of the real states of the real asset.

In an example embodiment of any of the above, the real state of the real asset includes a non-visual attribute.

In an example embodiment of any of the above, the non-visual attribute includes: an audio attribute of the real asset.

In an example embodiment of any of the above, the non-visual attribute includes: a legal right or a permissive right of the real asset.

In an example embodiment of any of the above, the receiving the initiation of the event includes receiving an initiation of a transfer in the legal right or the permissive right of the real asset.

In an example embodiment of any of the above, the receiving the initiation of the transfer includes performing a transaction in relation to the real asset.

In an example embodiment of any of the above, the receiving the real state include receiving at least one of: a cuboid in the real world coordinates of the 3D space of the real asset; a centroid of the cuboid in the real world coordinates of the 3D space; or a respective bounding box for each of the at least one image of the real asset.

In an example embodiment of any of the above, the one or more predicted virtual states of the virtual asset which are predicted to achieve the event include one or more further virtual locations of the virtual asset, wherein the one or more further real states to achieve the event includes one or more further real locations of the real asset.

In an example embodiment of any of the above, the one or more predicted virtual states of the virtual asset which are predicted to achieve the event include predicted anchor points, wherein the one or more further real states to achieve the event includes one or more further anchor points.

In an example embodiment of any of the above, the one or more predicted virtual states of the virtual asset which are predicted to achieve the event are over time, and wherein the one or more further real states of the real asset which achieve the event are over time.

In an example embodiment of any of the above, the real asset is a robot, wherein the one or more further real states includes operation of at least part or all of the robot to achieve the event, wherein at least some of the anchor points denote the at least part or all of the robot.

In an example embodiment of any of the above, the real asset includes a mobile robot, wherein the one or more further real states to achieve the event includes movement of at least part or all of the mobile robot to achieve the event, wherein at least some of the anchor points denote the at least part or all of the mobile robot.

In an example embodiment of any of the above, the one or more further real states includes a pose, a speed and/or a movement orientation of the at least part or all mobile robot to achieve the event.

In an example embodiment of any of the above, the receiving the initiation of the event is received through the navigation to the virtual asset through the 3D map.

In an example embodiment of any of the above, the receiving the initiation of the event is receivable through both of the real asset and the virtual asset.

In an example embodiment of any of the above, the receiving of the initiation of the event is received through one of the real asset or the virtual asset, and the extended reality method further includes: causing the other of the real asset or the virtual asset to achieve the event; receiving an initiation of a second event of the real asset, wherein the receiving of the initiation of the second event is received through the other of the real asset or the virtual asset; and causing the one of the real asset or the virtual asset to achieve the second event.

In an example embodiment of any of the above, the receiving the initiation of the event is received through the real asset or through the virtual asset.

In an example embodiment of any of the above, the extended reality method further includes: receiving at least one previous real state of the real asset; wherein the generating the one or more predicted virtual states further uses the at least one previous real state of the real asset.

In an example embodiment of any of the above, the extended reality method further includes receiving: a location of a camera device that captured the at least one image of the real asset; wherein the generating the one or more predicted virtual states includes accounting for interaction between i) the real asset and ii) the camera device.

In an example embodiment of any of the above, the extended reality method further includes receiving a second asset label of a second real asset and one or more second real states of the second real asset; wherein the generating the one or more predicted virtual states includes accounting for real interaction between i) the real asset and ii) the second real asset.

In an example embodiment of any of the above, the extended reality method further includes: receiving a second asset label of a second real asset and one or more second real states of the second real asset; initiating a second event of the second real asset based on the one or more predicted virtual states of the virtual asset.

The extended reality method of claim 1, the real location is represented by: the anchor points in the real world coordinates of the real 3D space, a cuboid of the real asset in the real world coordinates of the real 3D space, and/or a centroid of the cuboid in the real world coordinates of the real 3D space.

In an example embodiment of any of the above, the extended reality method further includes retrieving a point cloud map or a 3D model of the real asset from an object database, retrieving a map of a real world in the real world coordinates of the real 3D space from a map database, and wherein the generating the 3D map includes inserting the point cloud map or the 3D model of the real asset into the map of the real world using the anchor points in the real world coordinates of the real 3D space.

In an example embodiment of any of the above, the extended reality method further includes updating a training of the physics engine using: the one or more predicted virtual states of the virtual asset which are predicted to achieve the event and the one or more further real states of the real asset which achieve the event.

In an example embodiment of any of the above, the XR application includes a virtual reality (VR) application, an augmented reality (AR) application, or a mixed reality (MR) application.

In an example embodiment of any of the above, the extended reality method is performed by at least one processor.

In an example embodiment of any of the above, the extended reality method further includes displaying the 3D map on a 360 degree display, wherein the at least one image of the real asset is taken from a camera device, wherein the camera device includes the 360 degree display and the at least one processor which performs the extended reality method.

In an example embodiment of any of the above, the real asset is a real object, wherein the asset label is an object label.

In an example embodiment of any of the above, the generating the 3D map in the XR application is performed in real time of the receiving the one or more further real states of the real asset which achieve the event.

Another example embodiment is an extended reality (XR) method, comprising: receiving: an asset label of a real asset and a real state of the real asset, the real state including: i) at least one image of the real asset, and ii) a real location of the real asset in real world coordinates of real 3-Dimensional (3D) space; generating, using i) the at least one image of the real asset, and ii) the real location of the real asset in the real world coordinates of the real 3D space: a 3D map in an XR application which includes a virtual asset of the real asset with a virtual state which matches the real state; receiving a camera location of a camera device which captured the at least one image; receiving navigation through the 3D map in the XR application to a virtual location of the virtual asset which matches the real location of the real asset in the real world coordinates of the real 3D space; receiving an initiation of an event of the real asset through one of the real asset or the virtual asset; causing the other of the real asset or the virtual asset to achieve the event; wherein the causing uses one or more rules that account for interaction between i) the real asset, and ii) the camera device; receiving one or more further real states of the real asset which achieve the event; and generating the 3D map in the XR application with the virtual asset having one or more virtual states which match the one or more further real states.

In an example embodiment of any of the above, the extended reality method further includes receiving: a second asset label of a second real asset and one or more second real states of the second real asset; wherein the one or more rules include one or more physics rules from a physics engine, wherein the one or more physics rules account for physics interaction between i) the real asset and ii) the second real asset.

In an example embodiment of any of the above, the one or more rules include one or more physics rules from a physics engine, wherein the one or more physics rules account for physics interaction between i) the real asset and ii) the camera device.

In an example embodiment of any of the above, the one or more rules include a permissive right of the camera device to perform the causing the other of the real asset or the virtual asset to achieve the event.

In an example embodiment of any of the above, the one or more rules account for a relative location or distance between i) the real asset, and ii) the camera device.

In an example embodiment of any of the above, the receiving the one or more further real states includes receiving at least one further image or at least one further real location from the camera device.

In an example embodiment of any of the above, the receiving the one or more further real states of the real asset includes receiving sensor information other than visually detected information of the real asset wherein the detecting the change in the real state uses the sensor information.

In an example embodiment of any of the above, the camera device is configured to display the 3D map.

In an example embodiment of any of the above, the camera device performs the XR method.

Another example embodiment is a XR system, including: at least one processor;

and memory containing instructions which, when executed by the at least one processor, cause the processor to perform the XR method of any of the above.

Another example embodiment is a camera device, including: a camera; at least one processor; and memory containing instructions which, when executed by the at least one processor, cause the processor to perform the XR method of any of the above.

Another example embodiment is a non-transitory memory containing instructions which, when executed by at least one processor, cause the at least one processor to perform the XR method of any of the above.

Another example embodiment is a computer program product by a machine learning training process, the computer program product comprising instructions stored in a non-transitory computer-readable medium which, when executed by at least one processor, causes the at least one processor to perform the XR method of any of the above.

BRIEF DESCRIPTION OF THE DRAWINGS

Reference will now be made, by way of example, to the accompanying drawings which show example embodiments, and in which.

Similar reference numerals may have been used in different figures to denote similar components.

DETAILED DESCRIPTION

Figure 1:
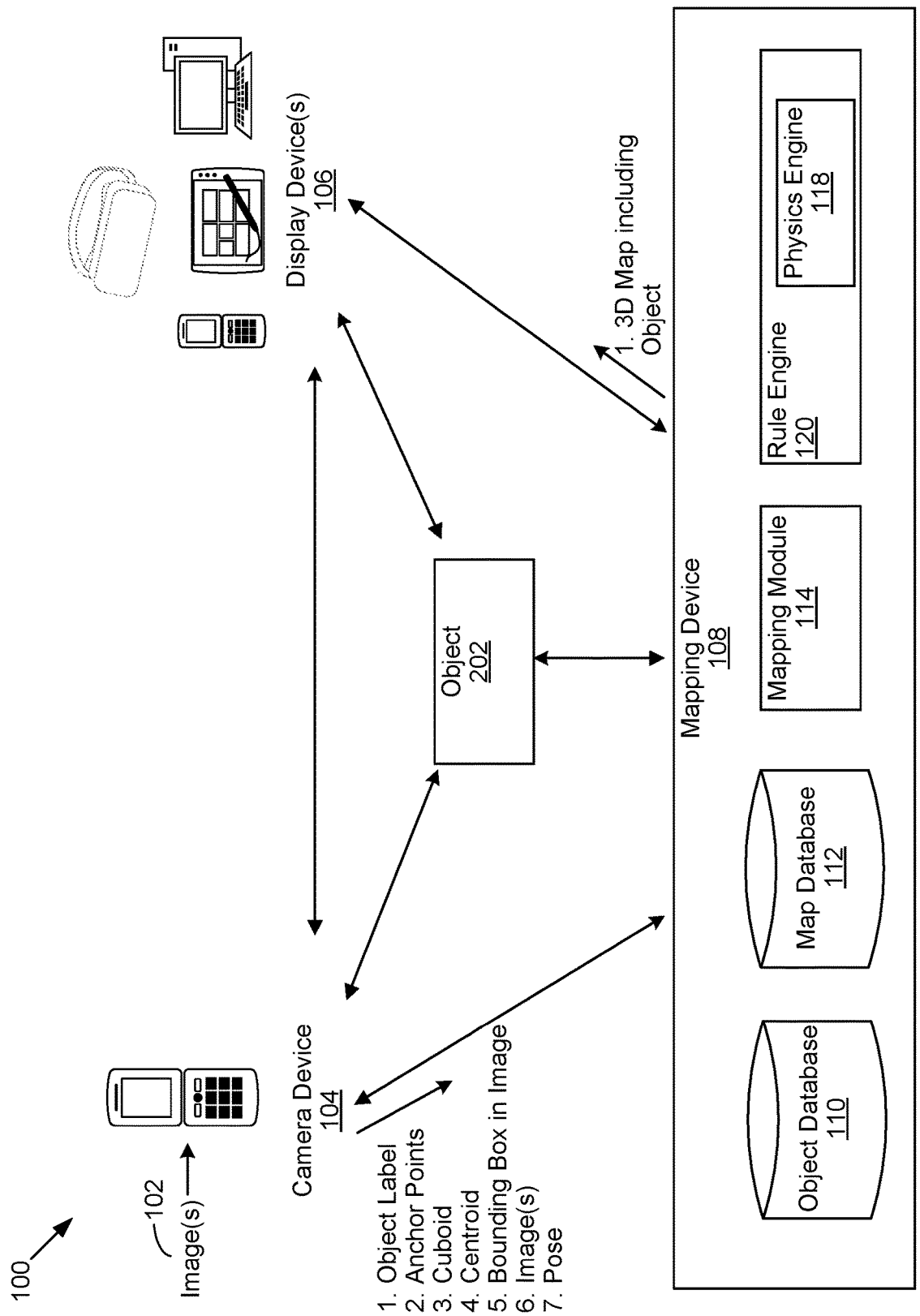
FIG. 1 illustrates a block diagram of an example XR system and XR method, in accordance with an example embodiment.

Example embodiments relate to a XR system and XR method for real-time mapping of real objects and camera devices in the real world.

The entire contents of U.S. patent application Ser. No. 17/494,585 filed Oct. 5, 2021, and granted as U.S. Pat. No. 11,417,069 on Aug. 16, 2022, and PCT Patent Application No. PCT/CA2022/051063 filed Jul. 6, 2022, are herein incorporated by reference in their entirety.

The term "real" is used to refer to any thing or location in the real or physical world, e.g. a real object, a real location. The term "virtual" is used to refer to any thing or location in the digital or virtual world, e.g. a virtual object, a virtual location. A "digital twin" is a virtual thing which corresponds to a real thing. The virtual thing has a virtual appearance and virtual location that is indicative of the counterpart real thing which has a real appearance and real location. The location can include longitude and latitude or northing and easting in real world coordinates. In some examples, the location can also include height in real world coordinates. The location can have more refined details with reference to local coordinates within a location, once the general longitude and latitude of the location are known. The digital twin can be a virtual object of a real object. The digital twin can be a virtual location (environment) of a real location (environment). The digital twin of the real world can be virtual objects and virtual locations (environment) of the real objects and real locations (environment).

The digital twin of an object can also mirror a pose of the real twin of the object, the direction where the real twin is facing in the real world. In an example, the direction can include pitch (gyroscopes and/or accelerometers), yaw (compass), and roll (gyroscopes and/or accelerometers). In another example coordinate scheme for the pose, the direction can include azimuth directions (compass) and elevation directions. The pose can be in real world coordinates of the real world. The digital twin can also mirror a state or other characteristics of the real twin. In some examples, the digital twin is continuously updated to reflect the real twin. In some examples, the real twin is continuously updated to reflect changes made to the digital twin. The digital twin can include the last known attribute of the real twin. Reference to "known" can include the last known attribute of the real object being stored in memory or a database, such as an object database or a map database.

An example of the XR method can be applied to the scenario of convenient and automated mapping of objects in the real world. A camera device can be used to capture one or more images of an object, and generate an object label of the object, a bounding box of the object in each image, and feature points in each image. The XR method can be used to calculate a cuboid in 3D space of the object and a centroid of the cuboid. The XR method can be used to generate, using the feature points and the cuboid: anchor points in 3D space which are contained in (overlap with) the cuboid in 3D space. The camera device can send the object label and location of the centroid without sending an entire 3D model (or point cloud map). When the object is moved, the XR method can track the movement of the centroid in order to determine the new location of the object. A new virtual map can be generated that takes into account the new location of the object. In some example embodiment, the point cloud is initially captured by the camera device for localization of the object, and afterwards the centroid can be used for localization. In some examples, an advantage of the XR method is that 3D models (and point clouds) are not required to be transmitted by the camera device to generate 3D maps when there is a change in the location of the real object.

In example embodiments, the virtual map is used in an extended reality (XR) application or XR platform (e.g., virtual reality (VR), augmented reality (AR) or mixed reality (MR) application or platform) in order to know where each object is located in the virtual map. The XR platform can include an immersive 3D map in which the user views or navigates the 3D map from a point of view (POV) within the 3D map.

In some examples, the pose of the object is determined by the XR method, for example the direction in the real world where the object is facing. The generated 3D map can also represent the pose of the object, and any changes in the pose of the object. In example embodiments, the 3D map in the XR platform includes the pose of the object in the virtual 3D map. In some examples, an advantage of the XR method is that 3D models (and point clouds) are not required to be transmitted by the camera device to generate 3D maps when there is a change in the pose of the real object.

In some examples, the state (one or more attributes) of the object is determined by the XR method. The generated 3D map can also represent the state of the object, and any changes in the state of the object. In example embodiments, the 3D map in the XR platform includes the state of the object in the virtual 3D map. A state can be the present attributes of the object at a particular time. As time passes, the state of the object could change, and the virtual state of the virtual object in the 3D map is updated accordingly.

In example embodiments, the XR system and XR method includes two-way data flow between the virtual object and the real object. For example, information is transmitted such as location and other relevant information (such as the state, obtained from images and sensor readings) from the real asset or from a camera device which captured the images of the real asset. The two-way communication of the information between real object and virtual objects (on-site and digital twins) allow for operation of machines, instruments and sensors as well as tracking and informing users within the system. Tracking all of the data received and transmitted over a period of time allows for real-time and historic tracking of real assets within the system and more informed decision making.

In example embodiments, the XR system and XR method is applied to a particular space (or 3D space) in the real world, in which the particular space has assets (objects), one or more people (users), and camera devices (in which a user carries a respective camera device).

An example of the XR method can be applied to the scenario of event venue setup, in which real objects, stage, seating, tables, audiovisual equipment, people, etc., are required to be setup at particular locations. When a particular real object is moved, the event organizers may desire to track the real object in real-time and the digital twin version of the real object, using the camera device to capture images of the object. As well, event organizers may wish to have a convenient XR (e.g., AR or MR) platform in order to know where each object should be located for event setup, by pointing the camera device to the venue and the camera device displays the placement of the objects in AR or MR. As well, the XR method can be used to identify where particular people should be located at the scheduled times during the event. In another example, the virtual 3D map (including the objects) prevails over the real world. When a real object location differs from the virtual object location, an instruction is sent to the user, a machine, or the object for the real object to return to the desired location in order to match the virtual object location. The XR method can also be used to track the people or performers of the event, who may be required to be at particular locations (which may be different, for example, at particular times).

An example of the XR method can be applied in the field of robotics, for example to the scenario of industrial automation operations or manufacturing. For example, objects such as the components parts of the product being manufactured, and assembly devices (such as robots which can include robotic arms, parts of an assembly line, and robotic machines) can be required to be at particular locations at particular times in order to perform the operations or manufacturing. When a particular object or robot is moved, manufacturers may desire to track the real object in real-time and the digital twin version of the real object, using the camera device to capture images of the object. As well, manufacturers may wish to have a convenient XR platform in order to know where each object should be located for setup of the industrial automation operations or manufacturing.

In some examples, the positions and other relevant attributes of assets, such as state and sensor readings for IoT enabled devices as well as audio and video transmission, are monitored and recorded through persistent communication between the assets, real and virtual, and server.

In some examples, the XR system is governed by rules (from a rules engine) applied to users according to their roles and the spaces and assets they wish to use. As used herein, a rule can include both the criteria that triggers the rule as well as the outcome or execution of the rule.

In some examples, the data and records contained on the system servers can be accessed and utilized, in whole or in part, by assets with access to rights, privileges, or functionalities as they pertain to specific spaces and other assets.

In some examples, the XR system enables two-way operation of virtual assets and real (on-site) assets.

The XR system enables two-way communication with virtual assets and on-site assets.

In an example, two-way communication may further be refined to provide contextually specific information to different users based on each of their respective requirements. An example is the scenario where there are multiple users in a facility, such as a maintenance person and a machine operator. The maintenance person can be recognized using the camera device or mobile phone they are carrying, a badge (e.g. radiofrequency ID (RFID) badge), or facial recognition. For example, a maintenance person inspecting a facility can be displayed information about real-time and historical usage data as well as maintenance schedules for the machine that they are near. A machine operator would not be shown maintenance information when they are near the machine but would be shown operation instructions and safety procedures.

In an example, the XR system can generate visualization data associated with the location and state of the virtual assets and their real assets. The visualization data can include generating a 3D map which displays the virtual asset of the real asset.

In some examples, the XR system can locate and access other users within the space and send a visual or audio communication to those users.

In some examples, the XR system includes rules (from a rules engine) defined in a state machine govern the physical space, the real assets and their virtual assets (digital twins). The rules are used to predict determine reactions resulting from a change in one or more attributes of the state. An event can be initiated through the real asset or the virtual asset. A rule is a change of one or more attributes of a 3D space or the real assets contained in the 3D space. Attributes can include ownership, position, on/off state.

An example embodiment of the XR system includes the use of smart contracts in a shopping mall setting. A retail space in the mall is owned by the mall, rented by a tenant and frequented by staff and customers. Ownership and/or other rights to real assets (on-site) and virtual assets (digital twin) may be transferred permanently or temporarily as those assets change position or state. Another example embodiment can include locking out a machine and only permit the operation of the machine by an operator that is trained in the use of that machine.

Instructions and content can be communicated from (through) the virtual asset to real assets in the XR system, for example using an XR application which displays the virtual asset in a 3D map. In an example, a light is instructed to turn on ahead of a positioned user in the real world. Further embodiments predict the path of the user from environmental conditions and past user decisions and instruct objects (the light) within the space to operate as needed on the user's projected arrival. A virtual light is turned on though the XR application, and the XR system instructs the real light to also turn on.

In an example embodiment, the machine is a slot machine. The ownership of the particular action, payment insertion, payout, are controlled by the XR system.

The virtual asset, knowing the real life position of users, also knows the position of moving assets, e.g. robots/cobots, operating within a space. A cobot is a machine similar to a robot but is designed to work with and assist a system user. Robots/cobots could be moving while the base is static (e.g., rotatable Coordinate Measuring Arm (CMM) arm on an assembly line) or operating as an entity that is free to move within the space (robotic pick and pull cart). Dynamic, real-time updates to the position of assets within the space can either modify the path travelled and action taken by the robot/cobot or to suggest modified actions to users.

A physics engine is incorporated with the XR asset to define the physics interactions between various real assets in the real space, for purposes of predicting one or more virtual states of the virtual asset. Given that the virtual assets are dynamic in placement, their locations as well as quantities will change at any time. An updated training of the physics engine is performed to account for anticipating the suitable or expected physics in a specific situation given the historical and/or prevailing conditions. In an example, real-world physics such as gravity can apply at all times but frictional coefficients of a surface would change with current and expected weather. Weather data van provide characteristics such as temperature and precipitation for a localized area that would then predict the likelihood of ice formation and modify the coefficient of friction for certain surfaces during that time. In another example, the impact of anticipated weather patterns on assets located in a region is calculated in order to recommend alternate routes for navigation while, at the same time, recommending changes to the placement of assets to lessen anticipated adverse effects.

The changes in state of one or more real assets within the space may be predicted and simulated based on a diversity of inputs, attributes and parameters. The predictions can then be used to optimize real asset location or usage within the space in order to produce different outcomes.

For example a first machine (Machine 1) is predicted to shut down at a specific time due to: anticipated weather conditions; emitted heat from an adjacent machine. In an example, Machine 1 has an operating temperature of −10C to 45C and is set to turn off when its temperature falls outside of that range. Machine 1 gets hotter the faster it is set to work. Machine 1 is located beside a second machine (Machine 2) that also emits increasing heat relative to production level but the typical ambient temperature in the working area stays below the Machine 1's operating temperature. The weather is projected to get hotter later in the day but the Machine 1 output is required to be at full. When the temperature of Machine 1 at full production is combined with the ambient temperature from the weather and Machine 2's emitted temperature, Machine 1 is projected to shut off because its temperature will be outside of its operating range. The XR system will automatically optimize Machine 1 and Machine 2 production levels to keep Machine 1 running at full production during the warmer weather. If a combination of optimizing Machine 1 and Machine 2 production levels will not keep Machine 1 within operating temperatures then the Heating, ventilation and air-conditioning (HVAC) system can be instructed to cool the environment further. In some examples, Machine 1 or Machine 2 is instructed by the XR system to move away from the other machine.

In example embodiments, the real asset states and locations at any historic time period are recorded to memory, in the form of a digital black box (archive) of the virtual assets.

In example embodiments, the display of the real asset and the virtual asset, including the asset states, spatial coordinates and physics, can be performed as follows: playback, showing a replay of what occurred; in-real-time display, showing what is currently happening; and simulation, showing the future predicted result.

In example embodiments, historic data is passed into a machine learning library of the physics engine to create 3D predictive pattern models. Changes in asset position, attributes and roles/permissions are communicated in real-time to the machine learning library for evaluation of short and long term effect.

In example embodiments, 3D digital models of a virtual space (indoors or outdoors) therefore mirror the real world look of a real space, layout and dimensions of the same space. Objects within the virtual space are segmented and able to be independently moved within the virtual space, therefore moving a corresponding real object in the real space.

In example embodiments, real time communication of the position of the objects is broadcast to every device logged into the space. The devices can include camera devices, display devices, mapping devices, or other computers on-site or off-site locations. An example embodiment of the XR system uses web socket to provide real time, two way communication between all of the devices.

While on-site, the user position and orientation of all users logged into the XR system is broadcast in real time to the mapping device that is hosting the 3D map with the virtual objects and to all other users currently logged into the XR system. The 3D map with the virtual objects can show a representation of all active on-site users and their location and aspect within the 3D map.

Devices that are IoT enabled can be positioned within the real space as well as connected for real-time control. Examples of devices and their controls include machines, switches and sensors that can have their settings changed, current state recorded and variance from predefined tolerance recorded. Their settings can be changed or monitored remotely as well as by on-site users through their mobile devices.

Historic data and current usage of machines can be used to provide predictive maintenance information to the maintenance person when they are near machines.

Overall flow of people or assets within the real space can be monitored over time to improve object/machine placement, resulting in streamlined user flow within the space. Repeated or redundant tasks can also be identified and improved placement of machines and/or staff.

The XR system can monitor if staff are in an unauthorized location or operating machines that they have not been trained to operate and automatically lock out machines for operation by that user.

An example of the XR method can be applied to the scenario of gaming and sports. For example, objects such as the game elements and individual participants (players or athletes) can be tracked for purposes of 3D mapping and analytics. When a particular object is moved, the physical object can be tracked in real-time and the digital twin version of the physical object can be visualized in the 3D map, by using the camera device to capture images of the object. Game and sport outcomes can be automatically calculated based on the particular location of the object (e.g., a ball going into a goal, a player at a finish line). As well, the players, viewers and coaches may wish to have a convenient XR platform in order to know the location of each object. Similar applications can apply to other sports, gaming and gambling applications.

An example of the XR method can be applied to the scenario of road mapping, such as for autonomous vehicle driving or GPS mapping purposes. For example, real-time 3D maps of the real world are required for accurate and safe navigation for autonomous driving or GPS navigation. For example, objects such as the traffic lights, obstacles, lane markings, and other vehicles may be required to be tracked in order to perform accurate mapping and navigation. When a particular object is moved, the real-time mapping for the vehicle operation may require the tracking of the real object and the digital twin version of the real object, in real-time.

A camera device can be used to capture images of the object for the real-time mapping purposes. The camera device can be onboard the autonomous vehicle in some examples, such as integrated or mounted at the dashboard. The camera device can be off the autonomous vehicle in some examples, for example as a street level camera, aerial satellite cameras, or drone cameras, etc.

Another example embodiment is a XR method, comprising: receiving: an asset label of a real asset and a real state of the real asset, the real state including: i) at least one image of the real asset, ii) anchor points in real world coordinates of real 3-Dimensional (3D) space, and iii) a real location of the real asset in the real world coordinates of the real 3D space; generating, using i) the at least one image of the real asset, ii) the anchor points in the real world coordinates of the real 3D space, and iii) the real location of the real asset in the real world coordinates of the real 3D space: a 3D map in an XR application which includes a virtual asset of the real asset with a virtual state which matches the real state; receiving navigation through the 3D map in the XR application to a virtual location of the virtual asset which matches the real location of the real asset in the real world coordinates of the real 3D space; receiving an initiation of an event of the real asset; generating, using a physics engine: one or more predicted virtual states of the virtual asset which are predicted to achieve the event in the real world coordinates of a virtual 3D space; receiving one or more further real states of the real asset which achieve the event; and generating the 3D map in an XR application with a concurrent display of the virtual asset in the one or more predicted virtual states and the real asset in the one or more further real states which achieve the event.

Another example embodiment is a an extended reality (XR) method, comprising: receiving: an asset label of a real asset and a real state of the real asset, the real state including: i) at least one image of the real asset, and ii) a real location of the real asset in real world coordinates of real 3-Dimensional (3D) space; generating, using i) the at least one image of the real asset, and ii) the real location of the real asset in the real world coordinates of the real 3D space: a 3D map in an XR application which includes a virtual asset of the real asset with a virtual state which matches the real state; receiving a camera location of a camera device which captured the at least one image; receiving navigation through the 3D map in the XR application to a virtual location of the virtual asset which matches the real location of the real asset in the real world coordinates of the real 3D space; receiving an initiation of an event of the real asset through one of the real asset or the virtual asset; causing the other of the real asset or the virtual asset to achieve the event; wherein the causing uses one or more rules that account for interaction between i) the real asset, and ii) the camera device; receiving one or more further real states of the real asset which achieve the event; and generating the 3D map in the XR application with the virtual asset having one or more virtual states which match the one or more further real states.

FIG. 1 illustrates a block diagram of an example XR system 100 and XR method, in accordance with an example embodiment. Generally, the XR system 100 can be used to locate real world objects and generate virtual objects of the real world objects. The real world (e.g. planet Earth) can be represented using real world coordinates in 3D space. Suitable coordinates include Cartesian (X, Y, Z) as shown, or longitude/latitude with height (Z), or a combination of suitable coordinate schemes. The Z coordinate can be relative to sea level or to the local ground. A virtual 3D map includes virtual coordinates in 3D space that correspond to the real world coordinates. Real world coordinates can be used to identify locations, pose and other information of the virtual object in the virtual 3D map. The virtual objects can be placed in the virtual 3D map of the virtual world. In some alternate examples, the Z coordinate (height) may not be required, e.g. for objects that are always on the ground.

As shown in FIG. 1, the XR system 100 can include: a camera device 104, one or more display devices 106, a mapping device 108, and an asset such as an object 202. The camera device 104 can be used to capture images 102 from the real world, including the object. The camera device 104 can also be used to perform aspects of the XR method, including localization of objects in the real world and localization of the camera device 104 itself. The XR method can also be used to perform tracking of the objects and the camera device, which is localization at different times. The camera device 104 can include rules based models to perform the XR method. The camera device 104 can also include machine learning models, which can include one or more neural networks (NNs) such as convolutional neural networks (CNNs). The display devices 106 can be configured to display 3D maps and 3D objects within the 3D maps to a user. The 3D maps can be virtual 3D maps with extended reality (XR) that is immersive, in which the user views or navigates the 3D map from a point of view (POV) within the virtual 3D map.

Digital twins, also called virtual assets, are digital representations of real assets. Examples of the real assets can include real objects (e.g. the object 202) as well as real non-objects. Real objects can include physically definable objects such as living beings and non-living things. Real non-objects include financial assets, sounds (audio), light, weather, wind, environment, etc. Example embodiments described herein in relation to assets can similarly apply to objects, and vice versa, as applicable.

An asset (virtual or real) can have a state (virtual or real) at a particular given time. Each state can include one or more attributes (virtual or real) of the asset. Examples of attributes can include size, pose, location, value, temperature, mass, speed (or velocity), acceleration, material composition, operational component (e.g., mechanical, electromechanical or chemical). An attribute can include legal, financial, business, or relational rights, for example property rights, ownership, privileges, authorizations, permission (or non-permission) rights, right to use, license, trust, loan, or bailment.

The mapping device 108 can be used to generate maps, such as virtual 3D maps that represent real maps of the real world. For example, real world coordinates of the real world (e.g. planet Earth) in real 3D space are represented (matched) by the virtual world coordinates (i.e. the same real world coordinates) in virtual 3D space. The mapping device 108 can be used to perform aspects of the XR method, including localization of objects in the real world. The mapping device 108 can be used to perform localization of the camera device 104 and tracking of the movements of the camera device 104. The mapping device generates virtual 3D maps of the real world that can include the objects and the camera device 104 in virtual coordinates that match the real coordinates (e.g., the virtual coordinates in the virtual world are equivalent to the real coordinates of the real world). As shown in FIG. 1, the mapping device 108 can include an object database 110, a map database 112, a mapping module 114, and a rules engine 120. The rules engine can include a physics engine 118. The mapping device 108 can also include machine learning models, which can include one or more NNs which can include CNNs.

The mapping device 108 can receive an initiation of an event in relation to the object 202. For example, the event can be received from the object 202, in which a user or the object itself activates the real object 202. For example, the event can be received from the display device 106 while a user is navigating through an XR application to a virtual location of the object 202. In response, the mapping device 108 instructs the object 202 (or the camera device 104 or the display device 106) to move the object 202 or change the state of the object 202 to achieve the event. The mapping device 108 uses the physics engine 118 to generate one or more predicted virtual states of the real object 202 which achieve the event. The physics engine 118 can be rules based or can include NNs or CNNs. The mapping device 108 also receives the one or more real states of the object 202, over time, that achieve the event in the real object 202. The mapping device 108 can generate, for display on the display device 106, a 3D map which shows, concurrently, both the one or more predicted virtual states of the virtual object 202 that are predicted to achieve the event and the one or more real states of the object that achieve the event. Concurrently can include displaying side-by-side or overlaid on the display device 106. In some examples, the virtual object 202 (and one or more of the predicted virtual states that achieve the event) is displayed as translucent or with wireframe or outline. In some examples, side-by-side means two separate 3D maps being displayed side-by-side, one 3D map with the virtual object (in virtual states) and one 3D map with the real object (in real states). In some examples, side-by-side means one 3D map with the real object (in real states) adjacent to the virtual object (in virtual states). When the display device 106 is used for AR applications, the display device 106 displays the real object (captured by the camera device 104) and also displays the virtual object, overlaid or adjacent to the real object.

In examples, the camera device 104, the display device 106, the object 202, and the mapping device 108 can communicate with at least one of each other over communication links and communication sessions. The communication links can be wireless or wired. In an example, each of the communication links can include a WebSocket protocol to provide continuous two-way communication.

In an example, the mapping device 108 is part of the camera device 104. In an example, the mapping device 108 is part of the display device 106. In an example, the mapping device 108 is a stand alone device which is separate from the camera device 104 and the display device 106.

Figure 2A:
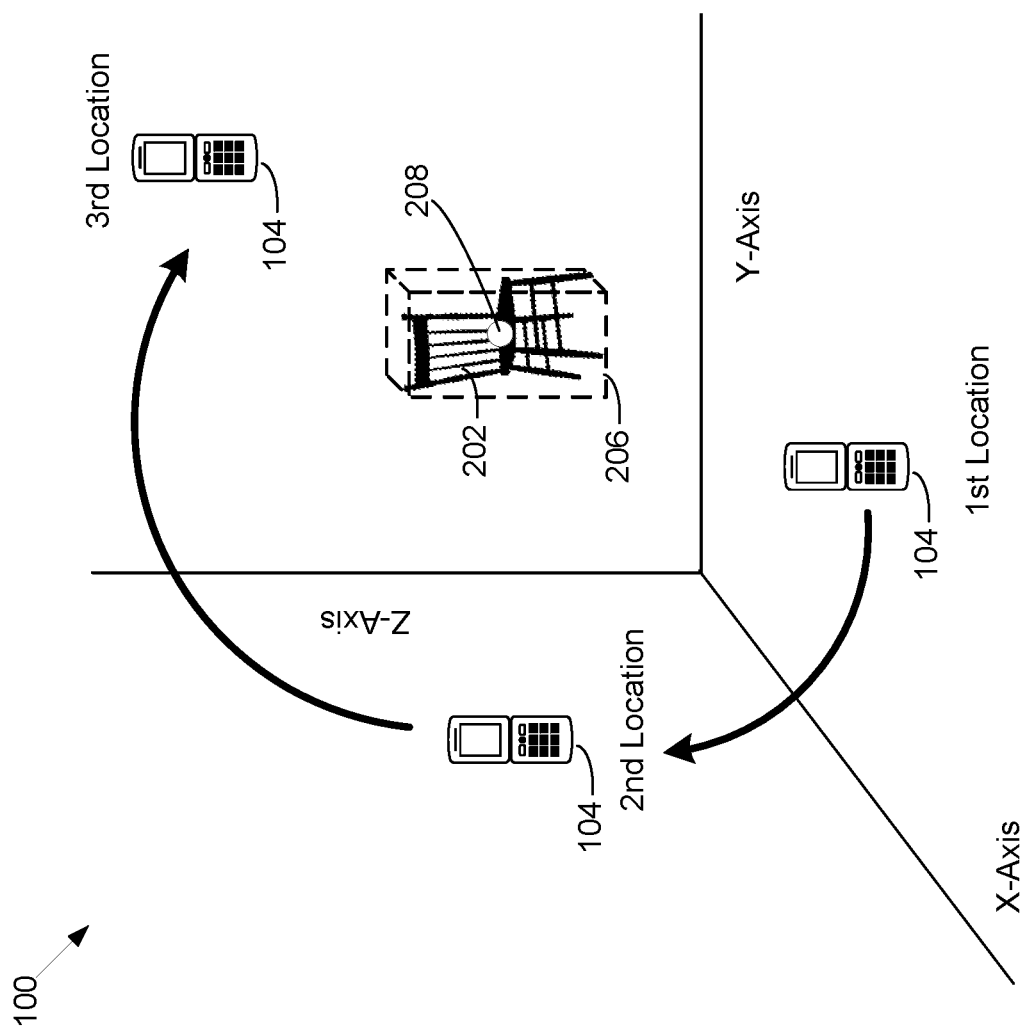
FIG. 2A illustrates a diagrammatic view of the XR system and XR method of FIG. 1, in accordance with an example embodiment.
Figure 2B:
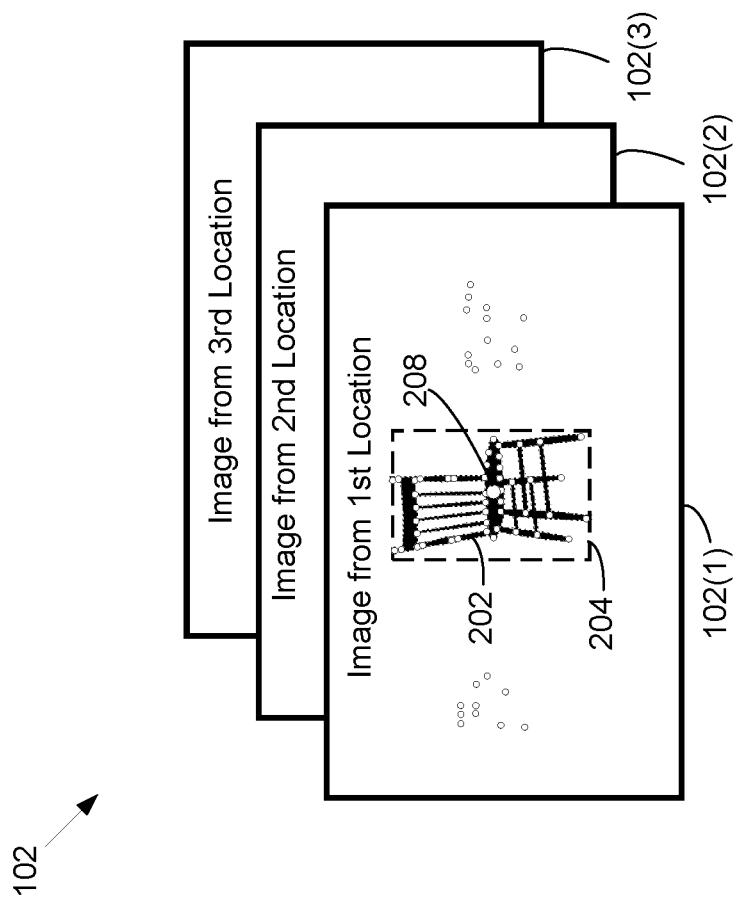
FIG. 2B illustrates a diagrammatic view of example images captured by a camera device and processed by the XR method of FIG. 2A, in accordance with an example embodiment.

FIG. 2A illustrates a diagrammatic view of the XR system 100 and XR method of FIG. 1 for an object 202, in accordance with an example embodiment. FIG. 2B illustrates a diagrammatic view of example images 102 captured by the camera device 104 and processed by the XR method of FIG. 2A, in accordance with an example embodiment. Examples will be described with relation to one real object 202 in the real world, such as a chair as shown in FIG. 2A. It would be appreciated that the XR method can be applied to a plurality of objects 202. For example, each object can be processed at the same time through the XR method, or alternatively each individual object can be processed individually through the XR method to detect and localize each individual object instance at a time. The XR method is used to determine the real location and real pose of the real object 202 in the real world, and generate a virtual 3D map that includes a virtual object 202 of the real object 202, having a virtual location of the real location and a virtual pose of the real pose. In some examples, the virtual 3D map is crowd-sourced in that multiple camera devices 104 can send information to the mapping device 108 regarding the objects for generating updates of the location of the objects in the virtual 3D map.

In FIG. 2A, the camera device 104 can be operated by a user or machine that takes images 102 of the object 202 (e.g. the real chair) in the real world. In the example of FIG. 2A, the camera device 104 takes three images 102 of the object 202, with the locations of the camera device 104 shown as 1st location, 2nd location, and 3rd location. Referring to FIG. 2B, a first image 102(1) is captured by the camera device 104 from the 1st location, a second image 102(2) is captured by the camera device 104 from the 2nd location, and a third image 102(3) is captured by the camera device 104 from the 3rd location. The images 102 will all have different POVs of the same object 202 based on where the images 102 were captured by the camera device 104. In some examples, multiple images can be captured at the same orientation of the camera device 104, at different zoom distances to the object 202, e.g., optical zoom, digital zoom, or manually moving the camera device 104. More or fewer images 102 can be taken of the object 202 than those shown in FIG. 2A. In some examples, the camera device 104 captures a video of the object 202, therefore generating a plurality of the images 102 for the XR method.

As illustrated in FIG. 2B, for each image 102, the camera device 104 can perform image 2D object detection on the first image 102(1) to identify the object 202, generate a bounding box 204 of the object 202, and generate feature points in the first image 102(1). The camera device 104 can identify the object 202 by generating an object label, using one or all of the images 102. The camera device 104 can also generate an object score which represents the probability or confidence score of the object label. The object label can be generated even when the object 202 has different states than the exact appearance that may have been store in the object database 110, such as different facial expressions for a person, a balloon inflated to different sizes, or a robotic arm that is captured in a different position.

The camera device 104 can also generate feature points in the first image 102(1), shown as white circles. A bounding box 204 is a rectangle that bounds the image instance of the object 202 in the image 102. Although not shown in FIG. 2B, an object label, feature points and a respective bounding box 204 of the object 202 are also generated for the second image 102(2) from the 2nd location and for the third image 102(3) from the 3rd location. For the same object 202, the object label should be the same in the first image 102(1), the second image 102(2), and the third image 102(3). Consensus rules and/or object scores can be used to resolve any conflicts in the object label. The respective bounding box 204 of the images 102 are not necessarily rectilinear in relation to ground or the front of the object 202, and can be taken from a variety of angles, POVs, and distances. The centroid 208 is shown as a larger white circle.

The feature points are features detected in the image by the camera device 104, represented by the white circles. Feature points, also known as feature edge points, Kanade-Lucas-Tomasi (KLT) corners or Harris corners, are identified visual features of particular edges detected from the image 102. In an example, Google ARCore is used to generate the feature points. As shown in FIG. 2B, features may be generated for the object 202 (within the bounding box 204) and also can be generated for the environment and other objects outside of the object and the bounding box 204. The feature points outside the bounding box are shown without images of the environment for clarity.

Figure 5:
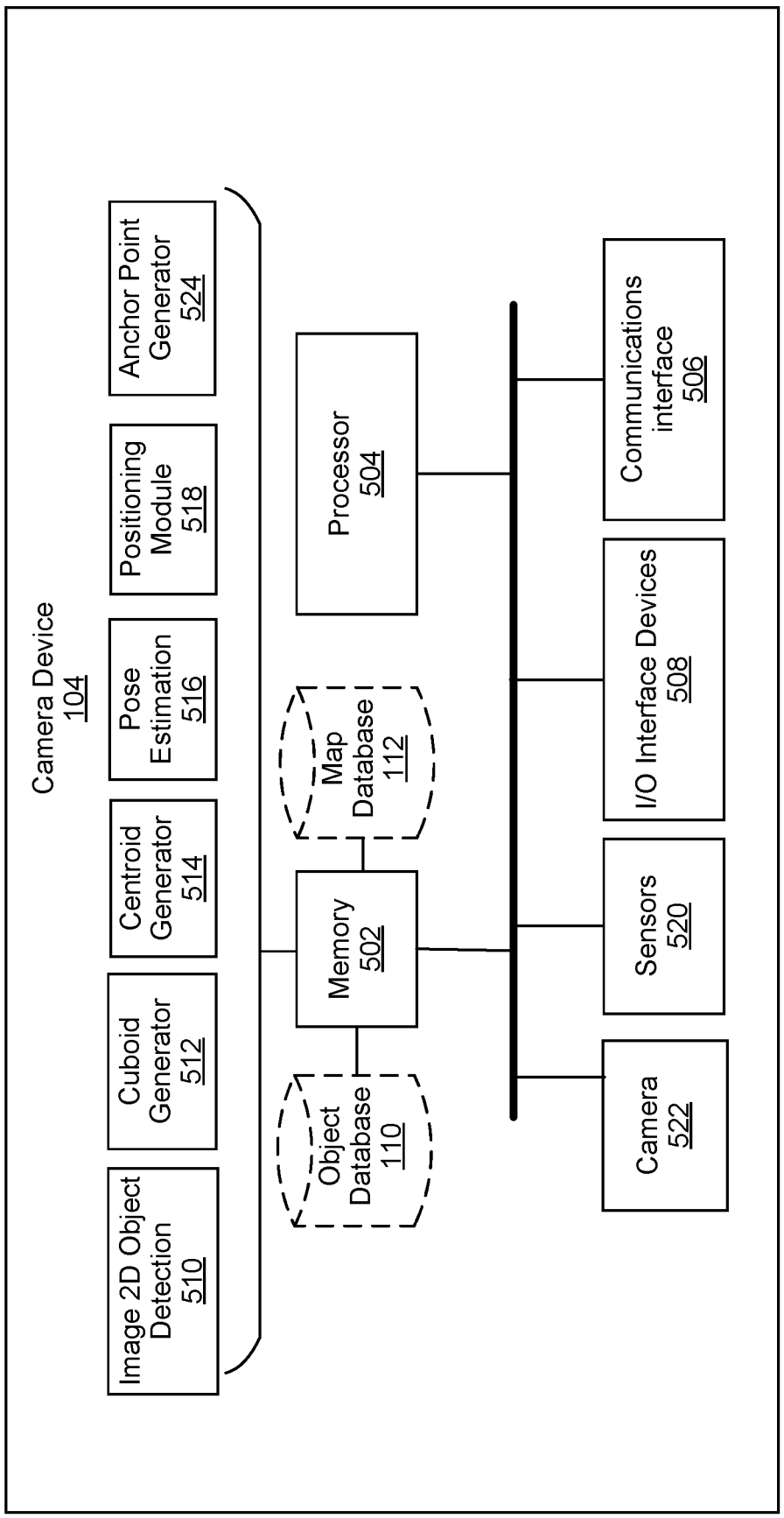
FIG. 5 illustrates a block diagram of a camera device for the XR system of FIG. 1, in accordance with an example embodiment.

Referring to FIG. 2A, in example embodiments, the camera device 104 can determine the real world locations (coordinates) of the camera device 104, which is described in greater detail herein, e.g. as in FIG. 5. In example embodiments, using the images 102, the respective bounding box 204 of the images 102, and the respective locations of the camera device 104 for capturing each image 102, the camera device 104 can generate a cuboid 206 in 3D space of the object 202. The cuboid 206 is a rectangular prism in 3D space which bounds the object 202.

In example embodiments, using the cuboid 206, the camera device 104 can generate or calculate the centroid 208 of the cuboid 206. The centroid 208 is the center of the cuboid 206 in 3D space. The centroid 208 can be represented by real word coordinates and the same virtual world coordinates. In example embodiments, using the centroid 208 and the object label, the XR method can generate a 3D map which includes the virtual object 202 in the exact same (within suitable thresholds) virtual location as the real object 202 in the real world. For example, the display device 106 can be used to view and interact with the virtual object 202 in the 3D map in real-time. The centroid 208 can be used to compare with the last known centroid 208 of the virtual object 202, and the 3D map of the virtual object 202 can be generated or updated accordingly. A distance threshold for the movement of the centroid 208 can be used in some examples to determine whether the real object 202 had actually moved, in which the distance threshold can vary depending on the application, the size of the real object 202, or the particular real world environment.

In some examples, the cuboid 206 can be defined for consistency purposes such that the front of the object 202 is a front face of the cuboid 206 perpendicular to horizontal ground, and a bottom of the object 202 is a bottom face of the cuboid 206 parallel to horizontal ground. In other examples, arbitrary faces of the object 202 are used to generate the cuboid 206. For example, different cuboids 206 at various different angles for the same object 202 can have a centroid 208 that does not substantially vary for practical purposes of determining whether the known centroid 208 of the real object 202 had moved (or not). For example, any variances in defining the cuboid 206 and the associated centroid 208 would still have the centroid 208 within the distance threshold in the situation when the object 202 has not moved.

In some examples, the camera device 104 is used to generate anchor points (also known as anchors) in 3D space of the feature points. An anchor point is in real world coordinates (of real 3D space of the real world) for a particular feature point of an image 102. In some examples, one anchor point represents overlapping feature points that were generated from different images 102, because those feature points were actually the same feature taken from different orientations of the camera device 104. An anchor point can be represented as a sphere (e.g. a white sphere) or a dot in 3D space. In an example, the anchor points can be generated by the camera device 104 using ARAnchorManager from AR Foundation. In some examples, each anchor point of the object is individually trackable. In examples, movements of the object, or a part of the object, can be tracked using the anchor points.

In some examples, the camera device 104 is used to determine a pose of the object 202. The pose is the direction or orientation where the front of the real object 202 is facing in the real world. In an example, the pose can include pitch, yaw (compass), and roll. In other examples, the pose can include azimuth directions (compass) and elevation directions.

Figure 8A:
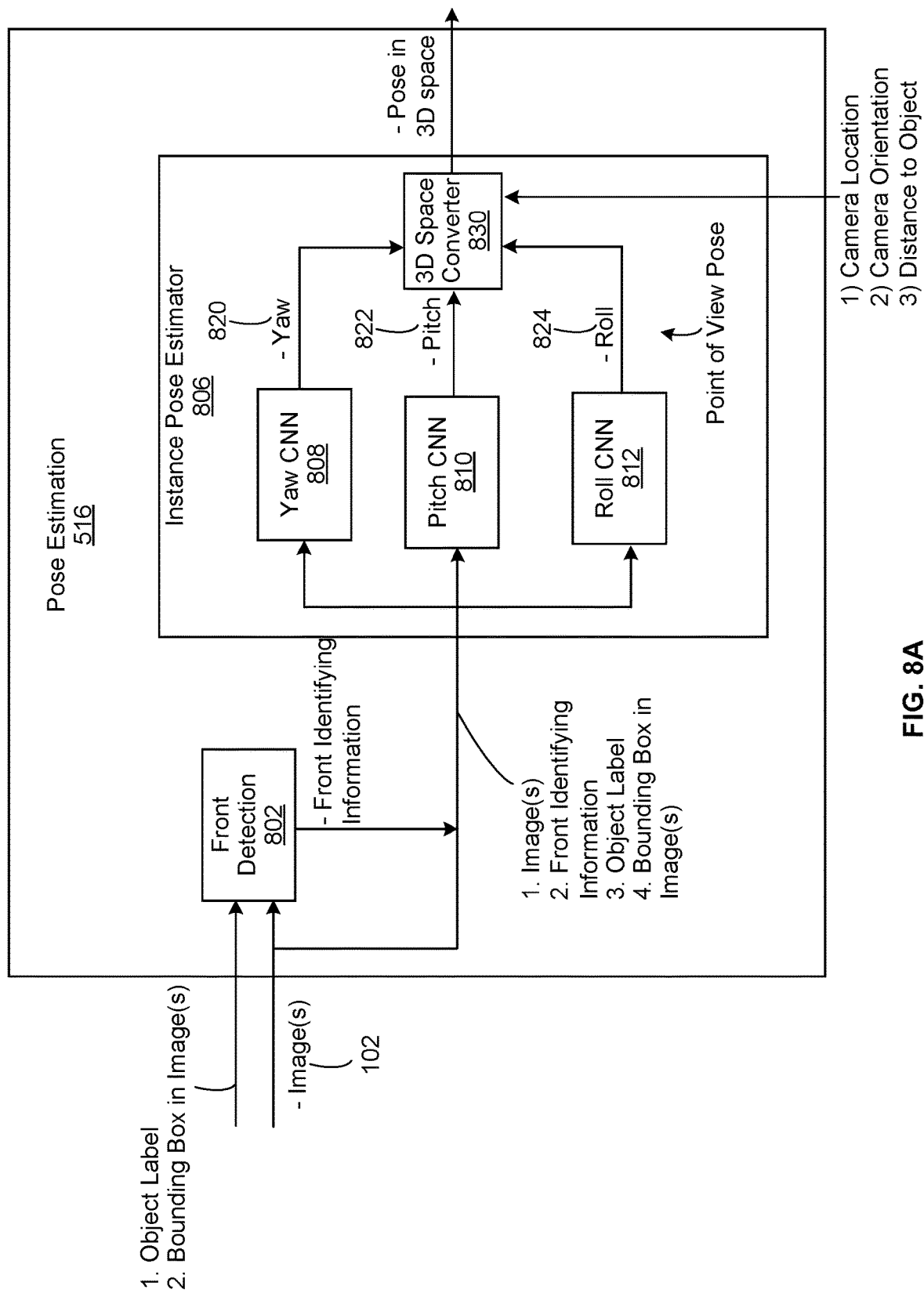
FIG. 8A illustrates a detailed example of a pose estimation module for the XR method, in accordance with an example embodiment.

For example, the camera device 104 can generate front identifying information from one or more of the images 102, which is described in greater detail herein, e.g. as in FIG. 8A. From the front identifying information, at least one of the images 102, the respective bounding box in 3D space, and the object label, the camera device 104 can generate the pose of the object 202 in the real world which is then used by the mapping device 108 for generating the virtual pose of the virtual object in the virtual map.

Example embodiments of determining the real pose are generally described herein in relation to identifying the front (front face) of the object 202. It would be understood that other faces other than the front face can be used to determine the pose, for example the rear face (e.g. when following behind an object such as a mobile robot), top face (e.g. when the camera device 104 is overhead), or bottom face (e.g., tracking aerial vehicles from the ground during takeoff, in flight, and landing), etc.

In some examples, the camera device 104 is used to determine a point of view (POV) pose and POV distance from the POV of the camera device 104 to object 202. For example, the POV pose is the pose from the POV from the camera device 104 when the camera device 104 captured the image 102, and can include pitch, yaw (compass), and roll. In examples, the POV pose is in relation to coordinates of the camera, e.g. directly forward from the camera is zero degrees. For example, the POV distance is the distance between the object and the camera device 104 when the camera device 104 captured the image 102. For example, the distance is between a perpendicular plane (bounding box) at the closest point of the object 202 to the camera device 104.

In some examples, the anchor points within the bounding box are used to generate the POV pose of the object 202 from the POV of the camera device 104. The camera device 104 can generate, using the location and orientation of the camera device, the pose of the object 202 in the real world which is then used by the mapping device 108 for generating the virtual pose of the virtual object in the virtual map.

In some examples, the camera device 104 captures the images 102 using video capture. A video can include a plurality of video frames, which are the images 102. For example, a user or a machine can activate a video record function of the camera device 104 and move the camera device 104 to the first location, the second location, and the third location (and/or other locations). The video can then be used by extracting the images 102 (video frames), which are then used by the XR method to perform localization of the object 202. The video can be recorded and then processed by the XR method at a later time, or can be processed in real-time. In some examples, audio from the video can be used to assist the XR method in generating the object label, for example animal noises, human voices, vehicles, etc. The audio can also be used by the camera device 104 or the mapping device 108 for multivariate analysis for the physics engine 118, e.g. rattling noise from a machine, analysis of cars coming closer to predict collision, etc.

Figure 2C:
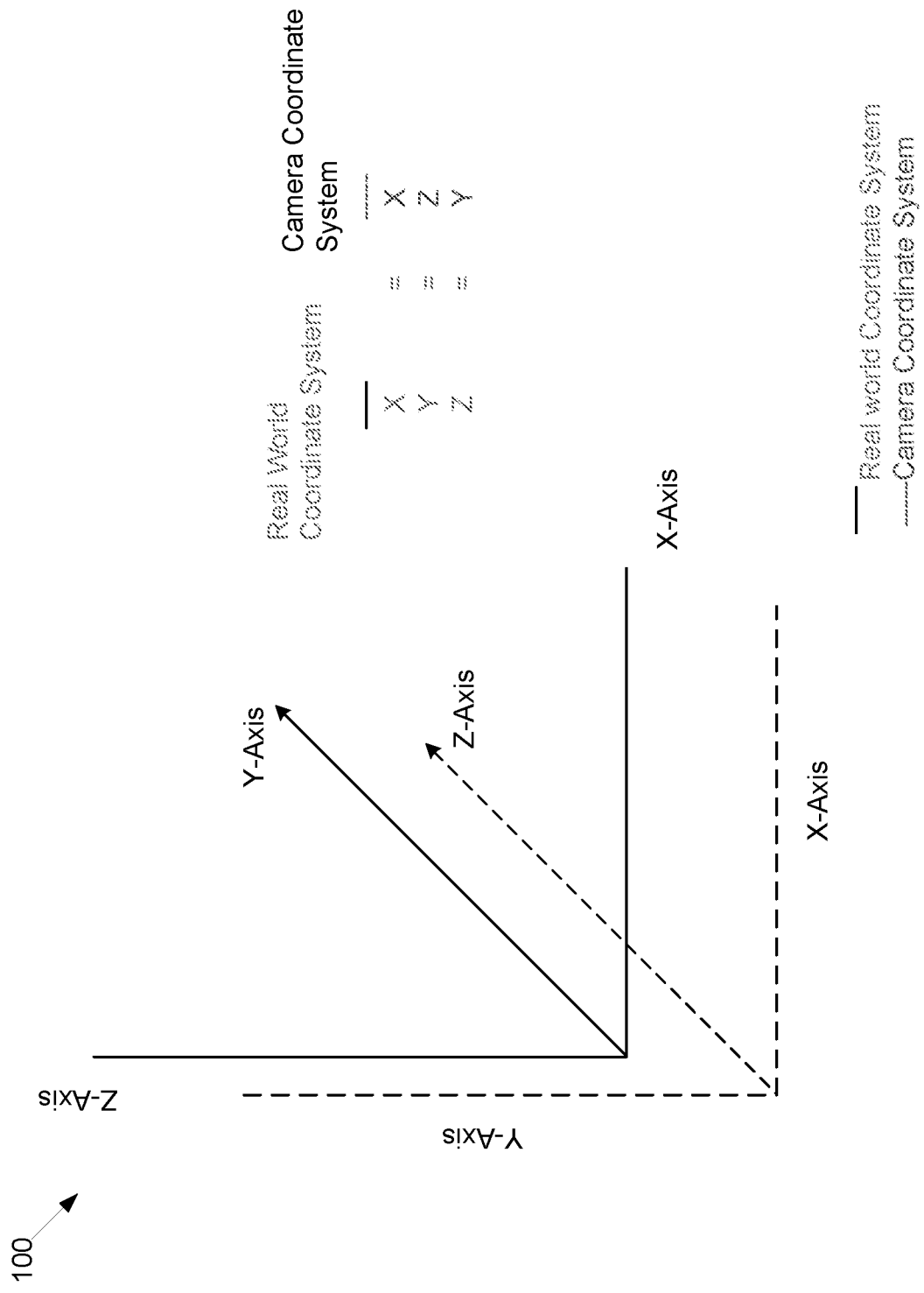
FIG. 2C illustrates a diagrammatic view of transforming camera 3D coordinates to real world 3D coordinates, by the XR method of FIG. 2A, in accordance with an example embodiment.

FIG. 2C illustrates a diagrammatic view of transforming camera 3D coordinates to real world 3D coordinates, by the XR method, in accordance with an example embodiment. For example, the transforming can be a transforming method performed by the camera device 104. For example the transToWorld function can be used, as understood in the art. The transToWorld function is the transformation matrix (rotation and displacement) for the transforming method from the camera 3D coordinates to real world 3D coordinates. The transforming method can also be used to transform one or more vanishing points (VPs) from the camera 3D coordinates to real world 3D coordinates. In an example, the transforming method includes detecting a plane of a floor, generating a height from the camera device to the floor. The transforming of the VPs and the anchor points in the camera 3D coordinates to real 3D space includes include determining scale of the detected object based on the height of the camera device 104 to the floor.

The coordinate system can include the camera 3D coordinate system (shown in dashed lines in FIG. 2C) and the real world coordinate system (shown as solid lines in FIG. 2C). The camera 3D coordinate system is defined as: x right, y up, z forward. The real world coordinate system is defined as: x right, y forward, z upward. In some examples, the Camera is always parallel to the ground.

The coordinate alignment is as follows: X world=X camera; Y world=Z camera; Z world=Y camera.

The transToWorld is a 4×4 matrix represented as:

Row1: X component: (_arCameraManager.transform.right.x, _arCameraManager.transform.right.y, _arCameraManager.transform.right.z, 0f);

Row2: Y component: (_arCameraManager.transform.forward.x, _arCameraManager.transform.forward.y, _arCameraManager.transform.forward.z, 0f);

Row3: Z component: (_arCameraManager.transform.up.x, _arCameraManager.transform.up.y, _arCameraManager.transform.up.z, 1_camToFloor);

Row4: (0f, 0f, 0f, 1f);

In the 4×4 matrix, variable 1_camToFloor represents camera height, and _arCameraManager is the ARCamera component managed by ARFoundation's ARCameraManager.

In other examples, e.g. when using other software other than ARFoundation, the transToWorld is a 4×4 matrix represented as:

Row1: X component: (camera.right.x, camera.right.y, camera.right.z, 0f);

Row2: Y component: (camera.forward.x, camera.forward.y, camera.forward.z, 0f);

Row3: Z component: (camera.up.x, camera.up.y, camera.up.z, 1_camToFloor);

Row4: (0f, 0f, 0f, 1f);

In an example, the camera height is calculated (generated) by pointing the camera device 104 (e.g., shooting a ray from the center of the screen or the camera 522) towards a detected plane on the floor. For example, the camera height is generated by ARPlaneManager from ARFoundation or other software.

Referring again to FIG. 1, in an example embodiment of the XR method, the camera device 104 can generate the localization and orientation of the camera device 104. The camera device 104 is configured to determine, from the images 102 and the location of the camera device 104: an object label of the object 202, a bounding box of the object in the image, anchor points of the object, a cuboid of the object (in 3D space), a centroid location (in 3D space) of the cuboid of the object 202, and pose of the object 202. The camera device 104 transmits to the mapping device 108 the object label, the anchor points, the pose, and at least one or all of: the cuboid, the centroid, or the bounding box in the image (with the image). The mapping device 108 is configured to use the mapping module 114 to use the object label, the anchor points, and the remaining information to generate a virtual object 202 of the real object 202. For example, a 3D model such as a point cloud or other suitable form of the object 202 can be retrieved from the object database 110. The mapping device 108 is configured to generate the virtual 3D map in 3D model (point cloud or other suitable form) which includes the virtual object 202 having virtual coordinates that are the same as the real coordinates of the real object 202.

The mapping device 108 sends the virtual 3D map to the display device(s) 106, which can display the virtual 3D map in an interactive fashion. In examples, the virtual 3D map is an immersive 3D virtual map, which means that the display 160 displays the 3D map from a point of view as if the user is within the 3D map. A user who views the 3D map on the display device 106 can navigate to the same virtual coordinates as the real coordinates of the real object 202, in order to view the virtual object 202. The virtual object 202 has the same virtual pose as the real pose of the real object 202 (e.g., pitch, yaw (relative to virtual compass direction such as virtual North), roll).

In an example embodiment of the XR method, the mapping module 114 upon receiving the object label, the anchor points, and the remaining information, can determine from the map database 112 if there is any change in the last known centroid (or cuboid) location or the last known pose of the object. If there is no change in the centroid (or cuboid) location or the pose, then the virtual 3D map does not need to be updated for the object 202. If there is a change in the centroid (or cuboid) location or the pose, then the virtual 3D map can be updated to accommodate such differences in the virtual 3D map, for display by the display devices 106.

Therefore, referring again to FIG. 1, the camera device 104 generates, from the images 102 of the object 202: the object label, the anchor points, the cuboid, the centroid, the bounding box, and the pose of the object 202 in the real world. The camera device 104 sends to the mapping device 108: the object label, the anchor points, the pose and at least one or all of: the cuboid, the centroid, or the bounding box in the image (with the image). The mapping device 108 can use the object label to retrieve the virtual object 202 (in a suitable 3D model format such as a point cloud map) from the object database 110. The mapping device 108 generates, from the object label, the 3D model of the object, and the remaining received information: a 3D map which includes the virtual object 202 with the centroid or cuboid location and the pose in the virtual world. In an example, the anchor points are used as points of reference by the mapping device to determine whether the location of the object, e.g. the centroid or cuboid location, has changed. The mapping device 108 sends the virtual 3D map to the display device 106, which displays the virtual 3D map. The virtual 3D map can be an interactive and immersive virtual 3D map in some examples. For example, the user can navigate through the display device 106 to the virtual location of the virtual object 202 in order to view the virtual object 202. The virtual object 202 has a virtual pose that is the same as the real pose of the real object 202. The virtual object 202 can also be called a digital twin of the real object 202.

In some examples, the mapping device 108 compares the centroid or cuboid location and the pose with the last known centroid or cuboid location and pose of the object 202 as contained in the map database 112. In some examples, the mapping device 108 sends the new centroid or cuboid location and/or the pose to a 3D renderer on the mapping device 108 or the display device 106, which updates the location and/or the pose of the virtual object 202 in the 3D map.

It would be appreciated that, for the XR method at this stage, the camera device 104 does not need to send an entire point cloud map of the real object to the mapping device 108 or the display device 106.

Figure 6A:
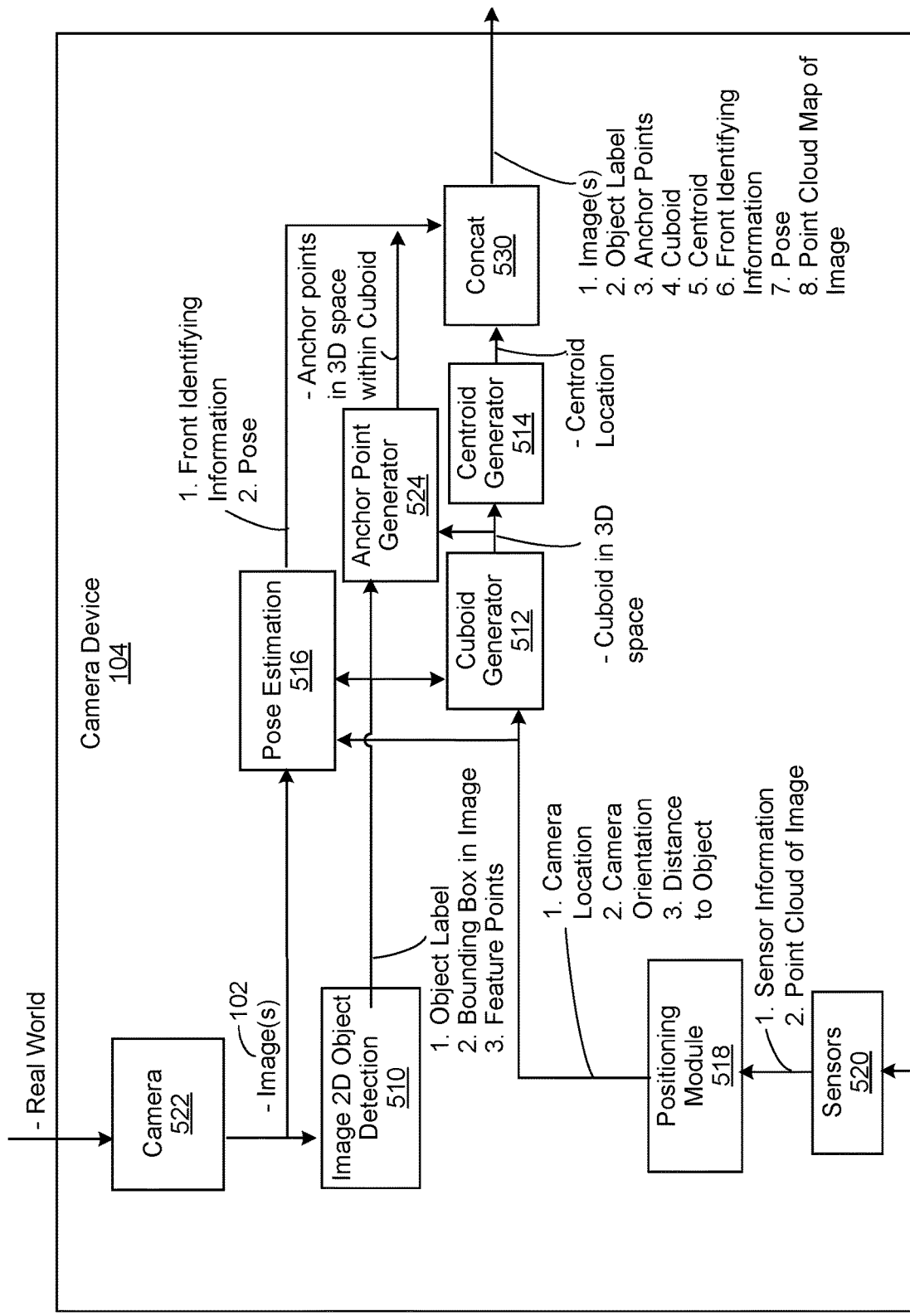
FIG. 6A illustrates an example detailed block diagram of the XR method performed by the XR system, for initially localizing an object and generating a 3D model of the object, in accordance with an example embodiment.

In some examples, a 3D model (e.g. full point cloud) of the 3D object 202 can be initially generated by using the camera device 104, which is described in greater detail in relation to FIG. 6A, herein. Briefly, the camera device 104 can take multiple images 102 and scanning using e.g. Light Detection And Ranging (LiDAR) of the real object 202. The full point cloud map of the object 202 is generated and sent with the images 102 from the camera device 104 to the object database 110. The camera device 104 can determine anchor points in 3D space, a pose in 3D space, a cuboid in 3D space, and a centroid in 3D space of the real object 202, and send to the map database 112. The map database 112 can therefore store the anchor points, the virtual pose, the virtual cuboid and the virtual centroid in 3D space of the virtual object 202. In examples, these virtual data stored in the map database 112 can also be called "known" data. It would be appreciated that, after the 3D model (e.g. full point cloud) of the object 202 is initially sent from the camera device 104 to the object database 110, the camera device 104 subsequently does not need to send the full point cloud map of the object 202. Rather, the object label and object location by way of centroid or cuboid location, and in some examples, the pose, can be sent from the camera device 104 to the mapping device 108, without the point cloud map of the object 202, in order for the mapping device 108 to generate or update the 3D map with the 3D object. In examples, other formats of the 3D model other than point clouds can be generated, such as vector based models, primitive models, polygonal models, computer-aided design (CAD) models, solid models, wireframe models, etc.

In some examples, the mapping module 114 and the 3D model generator 116 are combined in the same module.

Figure 2D:
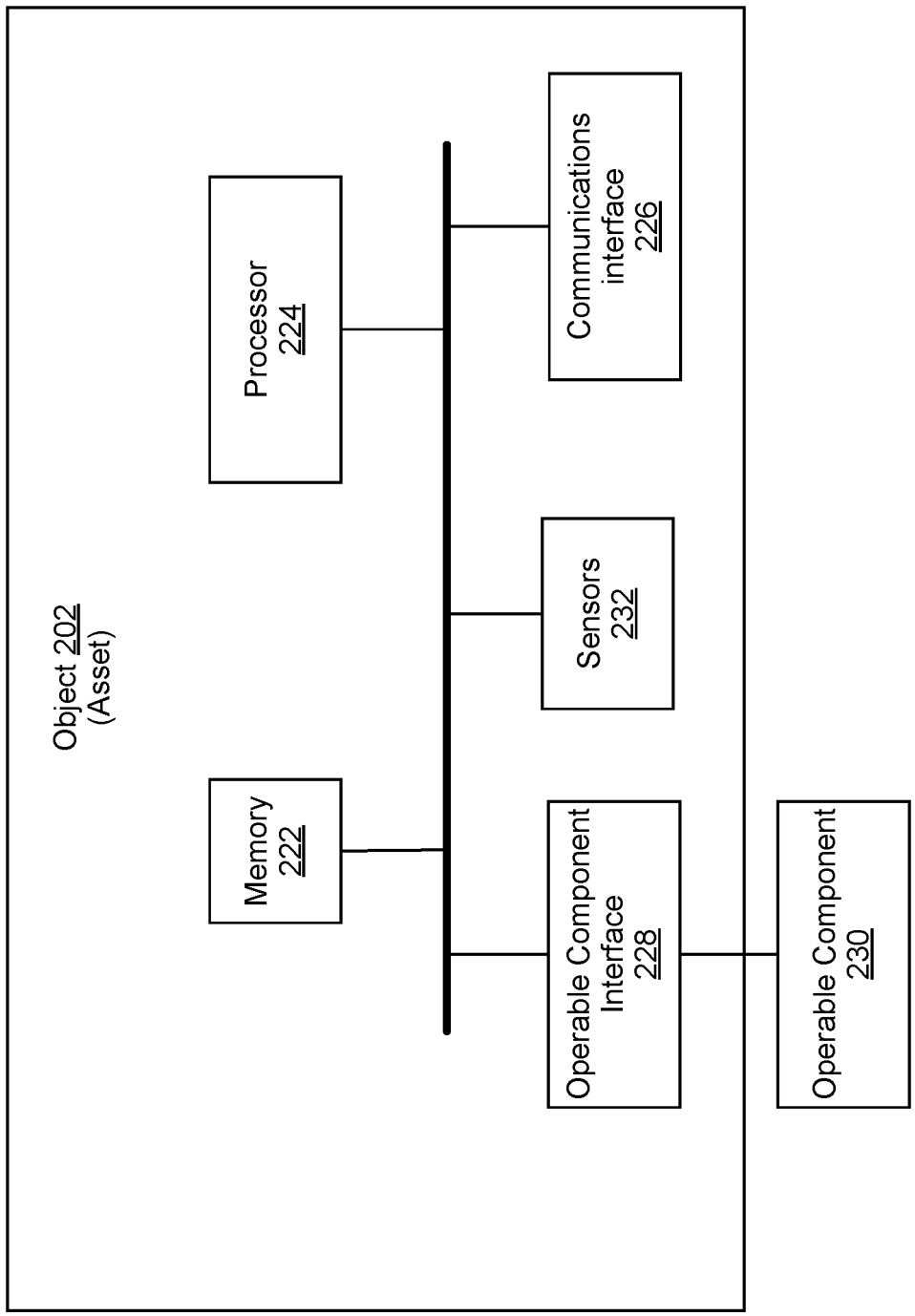
FIG. 2D illustrates a detailed block diagram of an object for the XR system of FIG. 1, in accordance with an example embodiment.

FIG. 2D illustrates a detailed block diagram of an example of the object 202 for the XR system of FIG. 1, in accordance with an example embodiment. The object 202 is also an example of an "asset", and the terms object 202 and asset can be interchanged in example embodiments herein, as applicable. In some other examples, the object is not "smart" and does have any special functionality or fewer (or none) of the illustrated components. The object 202 shown in FIG. 3 includes at least one memory 222 (one shown), at least one processor 224 (one shown), and at least one communications interface 226 (one shown). A communication connection is implemented between the memory 222, the processor 224, and the communications interface 226, for example using a bus or other communication links. The processor 224 is configured to execute, from the applications and modules stored in the memory 222, steps of the XR method from the object 202. The communications interface 226 can be used to communicate with any or all of the camera device 104, the mapping device 108, or the display device 106.

In an example, the object 202 includes an operable component 230 (e.g. a part or all of the object). In an example, the object 202 includes an operable component interface 228 for sending instructions to, and/or receiving feedback or messages from, the operable component 230.

In an example, the object 202 includes one or more sensors 232. The sensors can be used to detect the environment of the object 202 and/or one or more internal attributes of the object 202. In some examples, the sensors 232 can sense one or more attributes of the operable component 230.

In some examples, the sensors 232 are external to the object 202. For example, the sensors 232 may be on the camera device 104.

In an example scenario, the object 202 is a mobile object such as a chair or mobile robot having wheels or a propulsion mechanism. In some examples, the operable component 230 is a motor that controls the wheels in terms of direction and speed. In other examples, the operable component 230 is separate from the object 202. For example, the operable component 230 is a lifter or pusher that is separate from the chair, and the lifter or pusher is controlled to move to the location of the chair and then move the chair. For example, the lifter or pusher is controlled by the object 202, the camera device 104, or the mapping device 108. In an example of the XR method, a user may move the virtual object 202 through a 3D map of an XR application to new real world coordinates, and the chair is moved to a location that matches the new real world coordinates of the virtual object 202 that represents the chair.

In an example scenario, the operable component 230 of the object 202 has a state that can be changed. For example, the operable component 230 is a robotic arm that can move to a particular position, location or state. In some examples, the operable component 230 includes a motor of the robotic arm that controls the robotic arm in terms of direction and speed. In an example of the XR method, the robotic arm is controlled to that match one or more virtual attributes, of a virtual state, of a virtual object 202 that represents the robotic arm. The state of the object 202 can be affected by the robotic arm, e.g. turn on, turn off, or partially turn on.

In an example scenario, the object 202 is a controllable real object such as a light, and the operable component 230 of the object 202 is a switch (or variable dimmer) of the light. The light can be changed to have a state that is on/off or a dimmed level. In an example of the XR method, a user may activate the operable component 230 (switch or dimmer) of the light. The camera device 104 can be used to capture an image of the switch or dimmer and the XR method can determine that the switch or dimmer has changed the attribute of the object 202 (on, off, or dimmed level). In response, the virtual object 202 (virtual light) in the 3D map of the XR application is caused by the XR method to match the same attribute of the real object 202 based on the attribute of the switch. Similarly, through the XR application of the display device 106, a user may navigate to the real world 3D coordinates to the location of the virtual light. The user can initiate an event in relation to the light, for example turning on, off or dimmed level of the virtual light. A predicted light level of the virtual light is generated and displayed on the display device 106. In response to the initiating of the event, the XR application can affect a change in the object 202 to match the attribute of the light, e.g. physically activating the switch or dimmer to on, off or dimmed level. The physically activating may be performed internally by the switch, or via an instruction to the camera device 104 or the display device 106, or instructing another robot to physically activate the switch. The camera device 104 can be used to capture the actual real light level of the real light. In an example, both the virtual predicted light level and the real light level are displayed on the display device 106. For example, the real light may not behave as expected, due to deterioration, damage, or being obstructed by another object. Therefore, the XR method includes two-way dynamical control between the virtual object 202 and the real object 202.

In some examples, one of the sensors 232 is used to determine the attribute (e.g. real light level) of the state of the object (light). For example, one of the sensors 232 can include a luminosity sensor, a current sensor, a voltage sensor, and/or a temperature sensor. The attributes can also be generated from the processor 224, based on automated or manual control of the light through the processor. In some examples, both the sensor 232 and the camera device 104 are used to determine the real attribute (light level) of the object (light). In some examples, the operable component 230 includes a motor or electromechanical component that physically moves the switch or dimmer. In some examples, the operable component 230 includes a digital controller to control the switch or dimmer.

In an example, the processor 224 includes a machine learning module for performing a task, such as moving the object 202 to a particular location. In an example, the processor 224 receives a message that merely states that particular location, without any particular specifics as to the route to the particular location. The processor 224 is configured to achieve the task, by activating at least one operable component 230 and the sensors 232 to achieve the task. For example, the processor 224 is configured to activate at least one operable component 230 to move to the particular location, using internal or environmental information through the sensors 232 (which can include a GPS, not shown here) to move to the particular location. Referring again to FIG. 1, the mapping device 108 is used to predict one or more predicted states of the object 202 to achieve the task. In an example, the camera device 104 is used to capture one or more real states (and therefore the real movements or visual attributes) of the object 202, from initiation of the task (or event) to achievement of the task (or event). The mapping device 108 can compare the predicted states with the real states. The mapping device 108 can generate a 3D map that displays, concurrently, both the predicted states and the real states of the object 202. The mapping device 108 can train the physics engine 118 using the predicted states and the real states.

Figure 3:
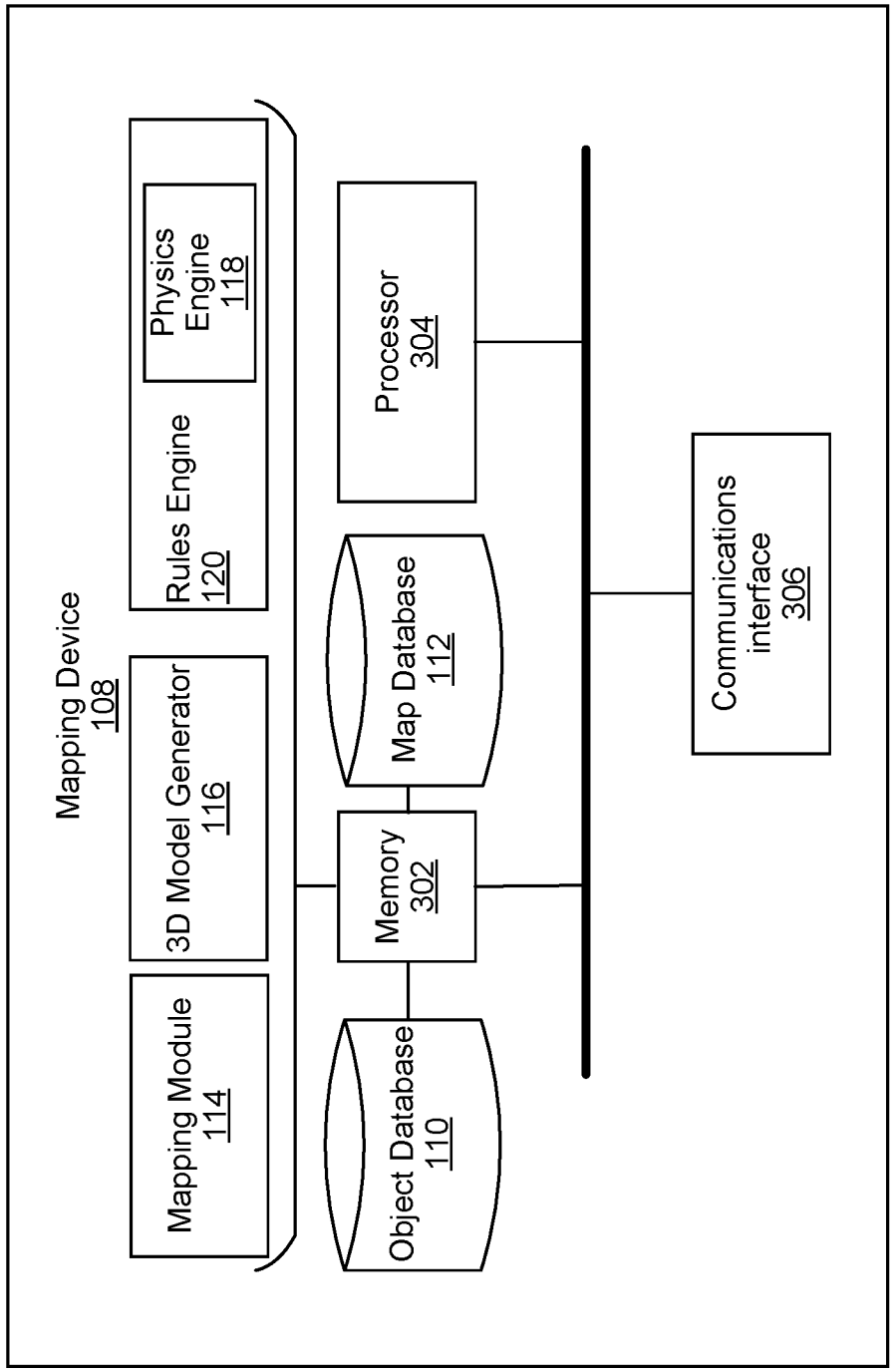
FIG. 3 illustrates a detailed block diagram of a mapping device for the XR system of FIG. 1, in accordance with an example embodiment.

FIG. 3 illustrates a detailed block diagram of the mapping device 108, in accordance with an example embodiment. The mapping device shown in FIG. 3 includes at least one memory 302 (one shown), at least one processor 304 (one shown), and at least one communications interface 306 (one shown). A communication connection is implemented between the memory 302, the processor 304, and the communications interface 306, for example using a bus or other communication links. The processor 304 is configured to execute, from the applications and modules stored in the memory 302, steps of the XR method.

The memory 302 can be a read-only memory (ROM), a static storage device, a dynamic storage device, or a random access memory (RAM). The memory 302 may store programs such as a mapping module 114 and a 3D model generator 116. The memory 302 can be a non-transitory memory. The modules, e.g. mapping module 114, 3D model generator 116, physics engine 118, rules engine 120, can include software stored in the memory 302, hardware, or a combination of software and hardware. The memory 302 can store one or more databases, such as the object database 110 and the map database 112. The object database 110 can store, for each object: 1) an object label, 2) a 3D model, 3) front identifying information, 4) anchor points, 5) cuboid of the object, 6) centroid of the object. In examples, these virtual data stored in the object database 110 can also be called "known" data. The 3D model is a virtual object that represents a respective real object. In examples, the 3D model includes a point cloud, which is a virtual object representation of a real object. The object database 110 can store a cuboid of the object and/or a centroid of the cuboid. In some examples, the cuboid is in 3D space in coordinates of the real world (e.g., using opposite diagonal coordinates). In some examples, the cuboid is not in coordinates of the real world but rather is the dimensions of the cuboid, with one face of the cuboid being indicated as the front face using the front identifying information. Similarly, in an example, the centroid of the cuboid can be in 3D space in coordinates of the real world. The centroid can also be defined in relation to the cuboid (e.g. relative to one corner coordinate of the cuboid), not in real world coordinates. The anchor points also contain pertinent information regarding the object location, size, and pose, and can be used by the mapping module 114 to generate any changes in the object location and/or pose. For example, upon receipt of anchor points of an object from the camera device 104, the mapping module 114 can compare the anchor points to known anchor points (for example using a partial amount or all of the anchor points of the object). In an example, for example when the cuboid or centroid is not received by the mapping module 114, the mapping module 114 can generate the cuboid in 3D space of the object using the received anchor points, for example by generating the cuboid in 3D space that tightly bounds the anchor points. The mapping module 114 can also generate (e.g. calculate) the centroid from the cuboid.

In an example, the mapping module 114 can use the object label to retrieve a known cuboid of the object and, using the anchor points and/or the cuboid received from the camera device 104, can determine whether the known cuboid has moved. The mapping module 114 can use the object label to retrieve a known centroid of the object and, using the anchor points and/or the centroid received from the camera device 104 (or calculating the centroid from a received cuboid), can determine whether the known centroid has moved. The mapping module 114 can use the object label to retrieve a known pose of the object and, using the anchor points and/or the pose received from the camera device 104, can determine whether the known pose has changed.

In some examples, the object database 110 stores the known anchor points in 3D space of each object.

In some examples, the object database 110 stores front identifying information of each object. The front identifying information can be used to determine the pose of the object. In an example, the front identifying information can be a particular POV of the 3D model of the object. Another example of the front identifying information is an image of the front of the object. Another example of the front identifying information is a 3D model or point cloud map of only the front of the object. Another example of the front identifying information is descriptive text of the front of the object, e.g. "face" or "nose" for a human, or "hood" for a car. In an example, the front identifying information can be the identification of particular anchor points of the front of the object. In other examples, other faces other than the front face are stored in the object database 110 and can be used to generate the orientation, for example back face, top face, bottom face, left face, or right face, etc. Example embodiments are described in respect to the front face where indicated, for clarity and convenience.

The object label is the name of the object. In some examples, every real object in the real world that is being captured by the XR method has a unique object label (and associated 3D model) in the object database 110. In some examples, an object label and 3D model can be used for more than one real world object, such as a row of identical chairs for purposes of event planning in an event venue. In the latter example, the swapping of two identical chairs may not need to be reflected in the virtual map of the virtual world, and such real objects (e.g. chairs) are given the same object label of "chair" and the same 3D model. However, in other examples the identical chairs can have unique object labels and have respective unique 3D models which are stored in the object database 110, for individual tracking by the XR method.

The object database 110 and the map database 112 can also store the location and orientation (POV) of the camera device 104. For example, the 3D map can include a 3D model of the virtual camera device 104, with the same location and orientation as the real camera device 104. The 3D model can be a marker, an avatar, or a point cloud that resembles the camera device 104 or resembles the user associated with (or carrying) the camera device 104.

The map database 112 can also store historical information of the location and pose information, for example, the location and pose of each object in the real world and virtual world at different times, also known as tracking. The historical information can include the location and orientation of the camera device 104. The historical information can include the particular POV directions displayed by the display device(s) 106 of the virtual 3D map, at different times. The map database 112 can store the known cuboid, centroid, and anchor points of the object (in 3D space of real world coordinates).

The map database 112 and the object database 110 can be the same database in some examples, not shown. The pose can also be stored in the object database 110 in some examples.

The physics engine 118 is used to generate one or more predicted virtual states of a virtual asset (object) in order to achieve an event initiated in relation to the real asset (object).

The physics engine 118 includes information, models and rules to define the physics interactions between various assets in the system 100. Given that the virtual assets (digital twins) are dynamic in placement, their locations as well as quantities will change at any time. A modification or learning of the physics engine 118 is claimed to account for anticipating the suitable or expected physics in a specific situation given the historical and/or prevailing conditions. In an example, real-world physics such as gravity can apply at all times but frictional coefficients of a surface can change with current and expected weather. Weather data can provide characteristics such as temperature and precipitation for a localized area that would then predict the likelihood of ice formation and modify the coefficient of friction for certain surfaces during that time. In another example, the impact of anticipated weather patterns on assets located in a region is calculated in order to recommend alternate routes for navigation while, at the same time, recommending changes to the placement of assets to lessen anticipated adverse effects.

The rules engine 120 can include rules governing the interrelationship between attributes of one or more assets, states of one or more assets, and the interrelationship between such assets. The rules engine 120 can include rules governing the relationship between one or more assets and one or more of the devices (e.g., the camera device 104 or the display device 106, or a user who is holding the camera device 104 or the display device 106).

In the example shown, the rules engine 120 can include the physics engine 118.

The mapping module 114 can receive, from the camera device 104, one or more real states of the real asset. The mapping module 114 can be used to generate a 3D map that includes, for concurrently display on the display device 106, both the one or more predicted virtual states of the virtual asset and the one or more real states of the real asset (captured by the camera device 104).

The processor 304 can be a general central processing unit (CPU), a microprocessor, an application-specific integrated circuit (ASIC), a graphics processing unit (GPU), a Tensor Processing Unit (TPU), or one or more integrated circuits. The processor 304 may be an integrated circuit chip with a signal processing capability. In an implementation process, steps of the XR method as described herein can be performed by an integrated logical circuit in a form of hardware or by an instruction in a form of software in the processor 304. In addition, the processor 304 can be a general purpose processor, a digital signal processor (DSP), an ASIC, a field programmable gate array (FPGA) or another programmable logic device, a discrete gate or a transistor logic device, or a discrete hardware assembly. The processor 304 can implement or execute the methods, steps, and logical block diagrams that are described in example embodiments. The general purpose processor can be a microprocessor, or the processor may be any conventional processor or the like. The steps of the XR method described with reference to the example embodiments may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 302. The processor 304 reads information from the memory 302, and completes, by using hardware in the processor 304, some or all of the steps of the XR method.

The mapping module 114 and the 3D model generator 116 can each include a machine learning model. In some examples, the machine learning model includes one or more NNs. In some examples, the NNs include CNNs. In some examples, the mapping module 114 and the 3D model generator 116 use rules based models. In some examples, the mapping module 114 and the 3D model generator 116 respond to manual feedback from a user.

The communications interface 306 implements communication between the mapping device 108 and another device or communications network by using wireless or wired communication. In some examples, training data may be obtained by using the communications interface 306.

In an example, the processor 304, with the communications interface 306, executes a live data application program interface (API) to communicate with feeds and third party services e.g. updated maps of the real world, updated libraries of 3D models of objects.

It should be noted that, although the memory 302, the processor 304, and the communications interface 306 are shown in the mapping device 108 in FIG. 3, in a specific implementation process, a person skilled in the art should understand that the mapping device 108 may further include other components that are necessary for implementing normal running. In addition, based on specific needs, a person skilled in the art should understand that the mapping device 108 may further include hardware components that implement other additional functions. In addition, a person skilled in the art should understand that the mapping device 108 may include only a component required for implementing the embodiments, without a need to include all the components shown in FIG. 3. In other examples, the mapping device 108 is executed on a local computer, the camera device 104 or the display device 106, referred to as edge processing.

In some examples, the mapping device 108 includes a server or a cloud server. In some examples, the mapping device 108 includes third party machine learning processing services and cloud storage such as Amazon Web Services (AWS)™, Microsoft Azure™, and Google Cloud™. For example, the object database 110 and/or the map database 112 can be on a separate storage server or the cloud storage. In other examples, not shown, the mapping module 114 or the 3D model generator are executed by the camera device 104, or the display device 106, or other devices.

Figure 4:
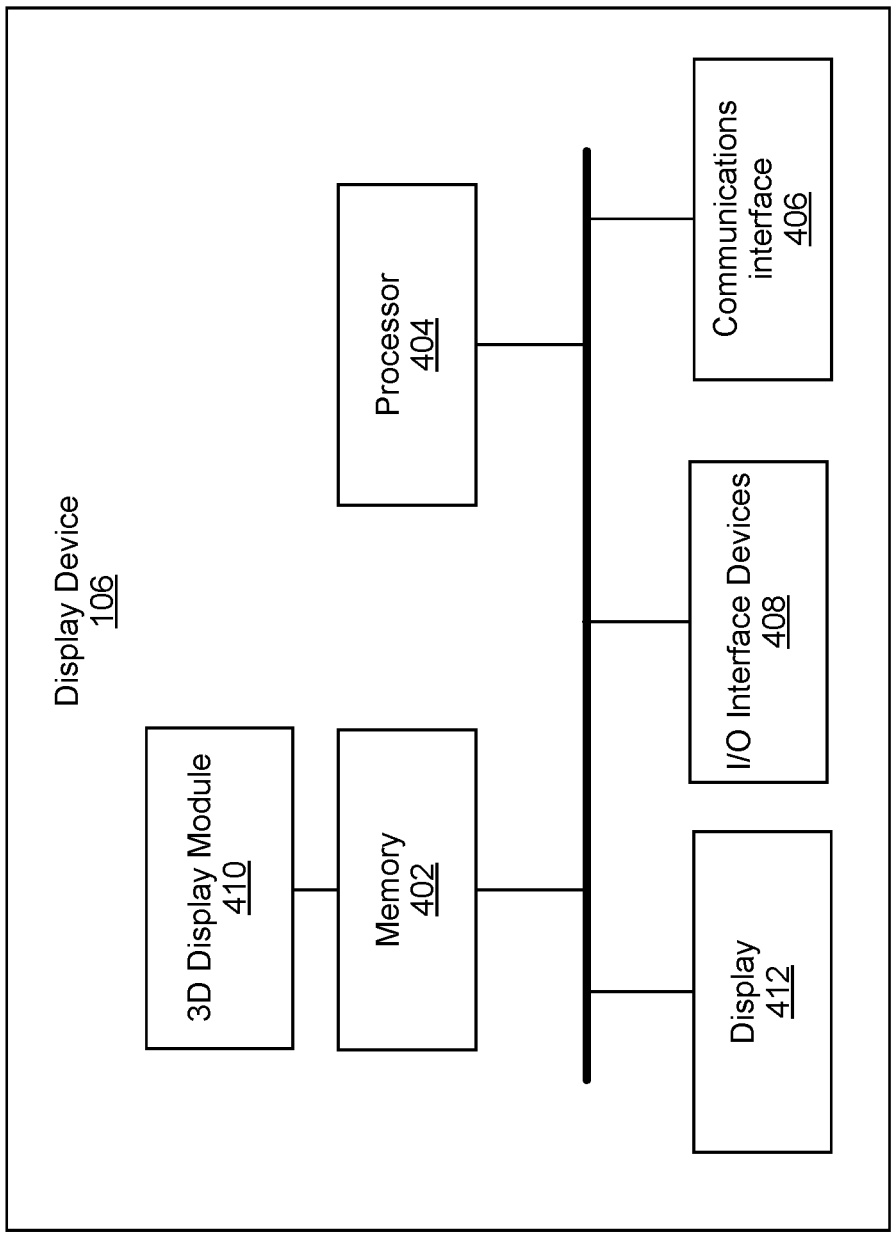
FIG. 4 illustrates a detailed block diagram of a display device for the XR system of FIG. 1, in accordance with an example embodiment.

FIG. 4 illustrates a detailed block diagram of the display device 106, in accordance with an example embodiment. The display device 106 can be an electronic device or user equipment, for viewing by a user of 3D maps which contain 3D objects. The display device 106 can be a desktop, a laptop, a set top box, or a mobile communication device such as a smart phone or a tablet. The display device 106 can be the same or different as the camera device 104 (e.g., for AR purposes). The user of the display device 106 can be the same or different as the user of the camera device 104.

The example display device 106 in FIG. 4 includes at least one memory 402 (one shown), at least one processor 404 (one shown), at least one communications interface 406 (one shown), and I/O interface devices 408. The memory 402, the processor 404, the communications interface 406 can be similar to those described in relation to the mapping device 108 of FIG. 3. The memory 402 can store a 3D display module 410 for execution by the processor 404. The modules (e.g. 3D display module 410) of the display device 106 can include software stored in the memory 402, hardware, or a combination of software and hardware. The display device 106 includes a display 412, which can be a 360-degree display. The I/O interface devices 408 can include but are not limited to touch screen, keyboard, camera, microphone, speaker, mouse, gesture feedback device (through the camera or accelerometers) and/or haptic feedback device.

The 3D display module 410 can receive, from the mapping device 108, the 3D map for display on the display 412. The particular format of the 3D map can be a 3D model, a point cloud map, or data for the 3D display module 410 to reconstruct the 3D map (which can include retrieving 3D object models or data from other sources or the object database 110). In some examples, the data received from the mapping device 108 can include a change in a virtual object, such as the location or the pose, and the 3D display module 410 can move the virtual object in the virtual world based on the data. Therefore, in some examples, entire point cloud maps do not need to be transmitted to the display device 106 for such changes.

In some examples, the 3D display module 410 is executed by a particular platform such as a 3D video platform such as a mobile platform, streaming platform, web platform, gaming platform, application plug-ins, etc. The display device 106 can include input/output (I/O) interface devices 408 for interacting with the user. For example, the user can manually interact with and manipulate the 3D map.

In an example embodiment, the display 412 is a computer monitor. For example, a rectilinear subset view (frame) of a 3D map which includes the one or more virtual objects is output to the computer monitor and the user can change the view being displayed on the display 412 using an input device (one of the I/O interface devices 408). In some examples, the display device 106 receives the 3D map from the mapping device 108 and displays the particular rectilinear subset view (frame) on the display 412. In other examples, the display device 106 only receives the particular rectilinear subset view (frame) from the mapping device 108 that is the particular POV of the display 412.

In accordance with an example embodiment, the display 412 is a 360-degree display. For example, as shown in FIG. 1, in accordance with example embodiments, the 360-degree display is a head-mounted display. For example, the head-mounted display has a cover, padding and a strap. The user can put on the head-mounted display by placing the padding around the user's eyes and holding it in place with the strap. In accordance with example embodiments, the head-mounted display has a screen and sensors within the cover. The display 412 displays a portion of the 3D map together with the one or more layers based on the location and pose of the user's head. The sensors can include a compass and/or accelerometers to determine the orientation of the 360-degree display.

In accordance with an example embodiment, the user can use the input device to virtually navigate to the virtual location of the virtual object. The virtual location has virtual world coordinates that correspond to real world coordinates in the world (e.g. planet Earth). In some examples, the user can walk while wearing the display device 106 to change virtual locations. In some examples, the user can walk on a 360-degree VR treadmill (not shown here) to change virtual locations. The particular POV of the 3D map is displayed on the display 412 depending on the virtual location and virtual orientation of the display device 106 in relation to the virtual 3D map, e.g. in relation to the virtual location and virtual pose of the virtual object.

In accordance with an example embodiment, the display device 106 can be used for augmented reality (AR). For example, Google ARCore can be used. In an example of AR, the user can physically move to the same real location as the real object. The display 412 shows or acknowledges the virtual object when the display device 106 faces the real object in the real world. Additional augmenting information can be displayed by the display 412 on the 360-degree display, which overlays or modifies the object on the 360-degree display or the rectilinear subset view of the 3D map. In some examples, for example for AR, the camera device 104 is the same device as the display device 106 (and sometimes also the same device as the mapping device 108).

Another example of the 360-degree display is a room with projections on a curved wall or multiple walls, also known as "cave projection". The user is immersed in the room and can see different POV angles by turning their head or controlling the desired view to the front of the room. In various examples, the POV of the projection can be selected (navigated) through the input device or can be the same POV as the location of the camera device 104. The cave projection can also display coordinates of the particular location of the POV being displayed, for example using real world coordinates of latitude and longitude (and optionally height).

FIG. 5 illustrates a block diagram of the camera device 104, in accordance with an example embodiment. The camera device 104 can be an electronic device or user equipment. The camera device 104 can be a mobile camera device 104. The camera device 104 can be operated by a user or a robot. The camera device 104 includes a camera 522, which can be used to capture images of the real world and real objects. The example camera device 104 includes at least one memory 502 (one shown), at least one processor 504 (one shown), and at least one communications interface 506 (one shown). The memory 502, the processor 504, the communications interface 506 can be similar to those described in relation to the mapping device 108 of FIG. 3 or the display device 106 of FIG. 4. The camera device 104 can include input or output (I/O) interface devices 508, including but not limited to touch screen, display screen, keyboard, microphone, speaker, mouse, gesture feedback devices (through the camera 522) and/or haptic feedback device. In some examples, the camera device 104 memory 502 can access the object database 110 and the map database 112, e.g. from the mapping device 108, from the cloud storage, or can contain a mirror copy in the memory 502.

In examples, the camera device 104 includes sensors 520 which are used to detect information from the real world. In an example, the sensors 520 can be used to determine a location and an orientation (e.g., pitch, roll, yaw) of the camera device 104. The sensors 520 can include: global positioning system (GPS), local positioning system (LPS), range director or scanner such as LiDAR to determine the camera distance to objects or points of the objects, barometric pressure sensor to determine a height (Z axis) of the camera device 104, compass to determine orientation of the camera device 104 in relation to North, and/or accelerometers to determine orientation of the camera device 104. The GPS and/or the LPS can be used to generate the location of the camera device 104. The range detector can be used to determine a distance between the camera device 104 and the object being captured by the camera 522.

The range director such as LiDAR can be used by the camera device 104 to determine the camera distance to objects or points of the objects. For example, the distance is between a perpendicular plane (bounding box) at the closest point of the object to the camera device 104.

In some examples, the range detector is not required by the camera device 104 and the distance between the camera device 104 and the object can instead be generated using photogrammetry, such as: knowing the size or cuboid size of the object using the object database 110, and/or calculating a vanishing point of the object. In some examples, Google ARCore can be used. In some examples, a combination of photogrammetry and at least one of the sensors 520 can be used by the positioning module 518 to determine the distance.

In some examples, Google ARCore can be used to determine the distance from the camera device 104 to the particular feature points in the image (e.g., for purposes of generating the anchor points in 3D space of the feature points). In some examples, the range detector can be used to determine the distance from the camera device 104 to the particular feature points in the image.

The positioning module 518 can be used to generate a location and orientation of the camera device 104. In some examples, the positioning module 518 uses data from the sensors 520. In some examples, the positioning module 518 uses data from the GPS and/or the LPS. In some examples, the user is localized and presumed to be the same location and optionally the same orientation as the camera device 104, i.e., the user is holding the camera device 104 and optionally the user's pose is the same as the camera device 104.

In another example, the location and orientation of the camera device 104 can be generated without using the GPS, the LPS, and/or the compass (or any sensors 520 other than the camera 522). For example, the location and pose of a stationary real object is known from the map database 112. The camera device 104 can capture one or more images of the stationary real object. The camera device 104 can generate a POV distance and a POV pose between the camera device 104 and the stationary real object. The camera device 104 can generate, using the known location and known pose of the stationary real object, and the POV distance and POV pose: the real location and real orientation of the camera device 104.

In example embodiments, the memory 502 can store modules for execution by the processor 504, including: image 2D object detection module 510, cuboid generator 512, centroid generator 514, pose estimation module 516, positioning module 518, and anchor point generator 524. The modules can include software stored in the memory 502, hardware, or a combination of software and hardware. In some examples, the modules of the camera device 104 include machine learning models, which can include NNs such as CNNs. For example, the image 2D object detection module 510 can include an image 2D object detector model which includes a CNN. The pose estimation module 516 can include a pose estimation model which includes a CNN.

The cuboid generator 512 is used to generate a cuboid of the object in the images. The centroid generator 514 is configured to generate the centroid of the cuboid.

The anchor point generator 524 is used to generate anchor points in 3D space of the feature points, using the location and orientation of the camera device 104. For example the anchor points are generated in camera 3D coordinates, and are then transformed to real world 3D coordinates. The anchor points that overlap with the bounding box in real 3D space are used for the XR method, and the remaining anchor points can be removed.

In some examples, one or more of the modules are executed by other devices, such as the mapping device 108 or a cloud server.

In some examples, the camera 522 and the images captured by the camera 522 are part of a third party mapping service, such as Google Maps™. The images from the third party mapping service are received or parsed using an API or other software applications (and/or can be extracted from 3D views of the third party mapping service). In such examples, the third party mapping service typically also provides the 3D coordinates (at least longitude/latitude) and the particular orientation of the camera 522. The XR method for generating the location and pose of the object in real world coordinates can use photogrammetry from the images of the third party mapping service, along with the location of the object and the orientation of the camera 522, without requiring any of the sensors 520. The third party mapping service can be continuously parsed for the XR method to generate up-to-date 3D mapping information, which includes the location and pose of the object.

Figure 6B:
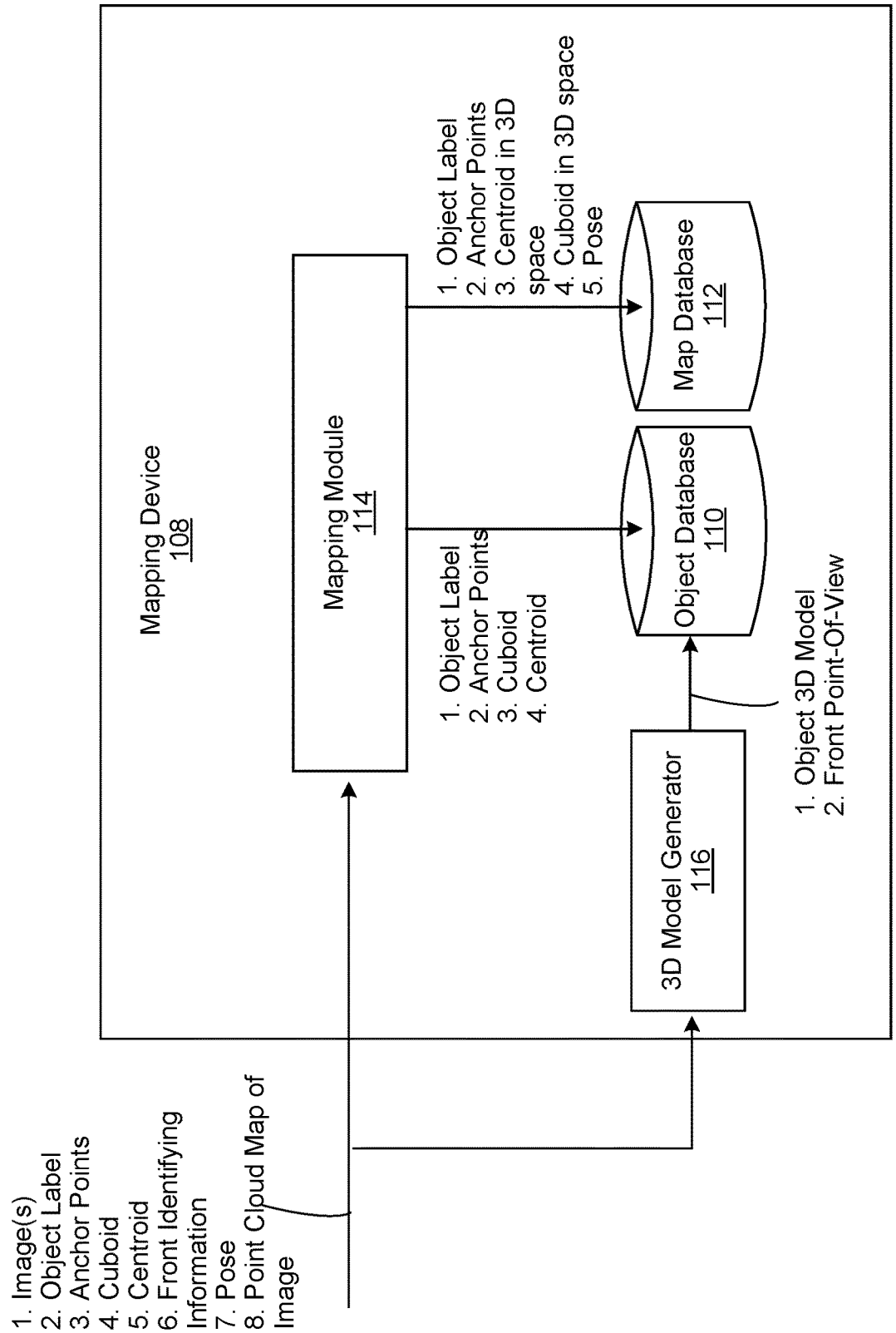
FIG. 6B illustrates a detailed example of a mapping module of the mapping device for performing the XR method of FIG. 6A.
Figure 7A:
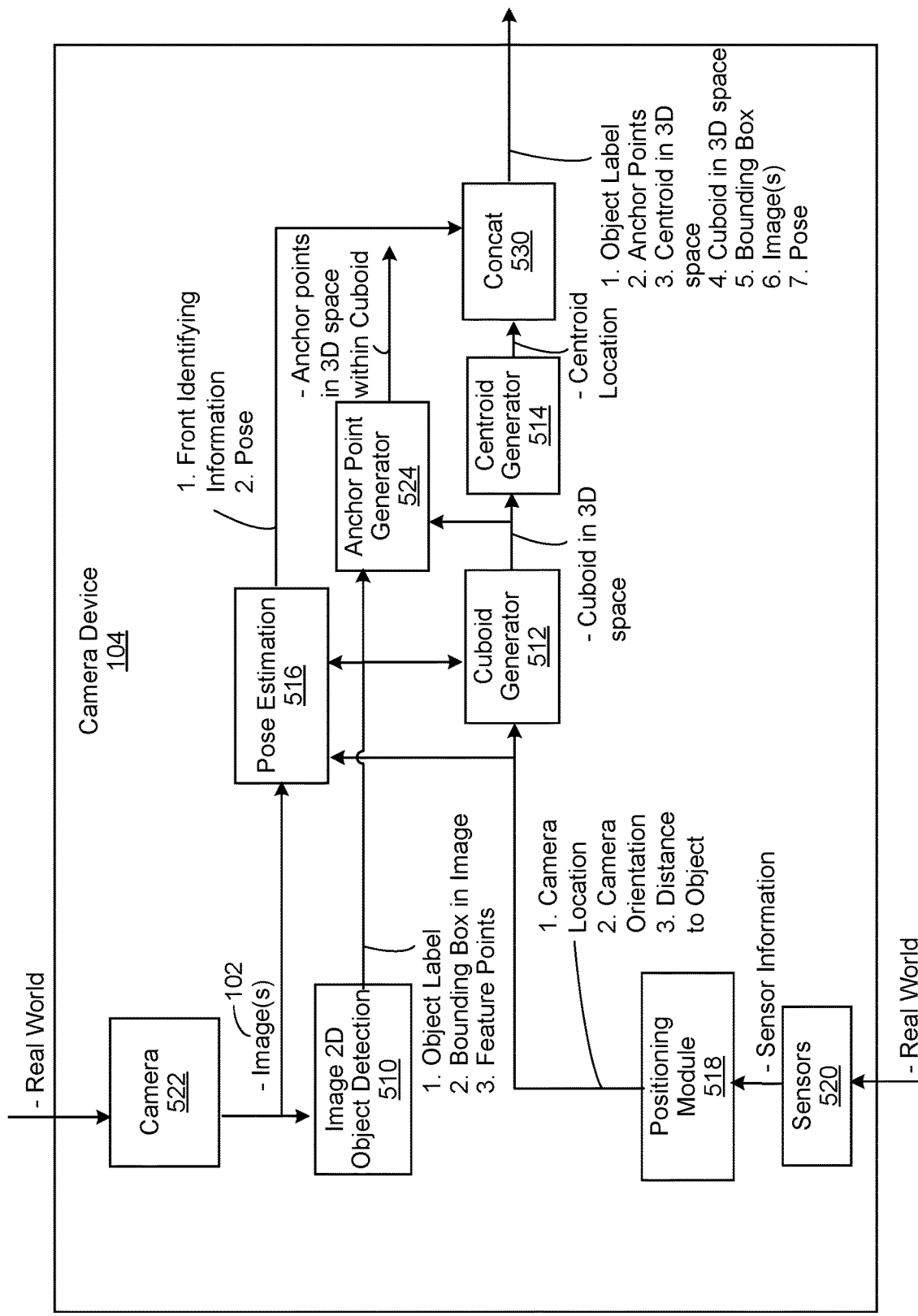
FIG. 7A illustrates a detailed example of the XR method performed by the XR system, for subsequently localizing the object of FIG. 6A, in accordance with an example embodiment.
Figure 7B:
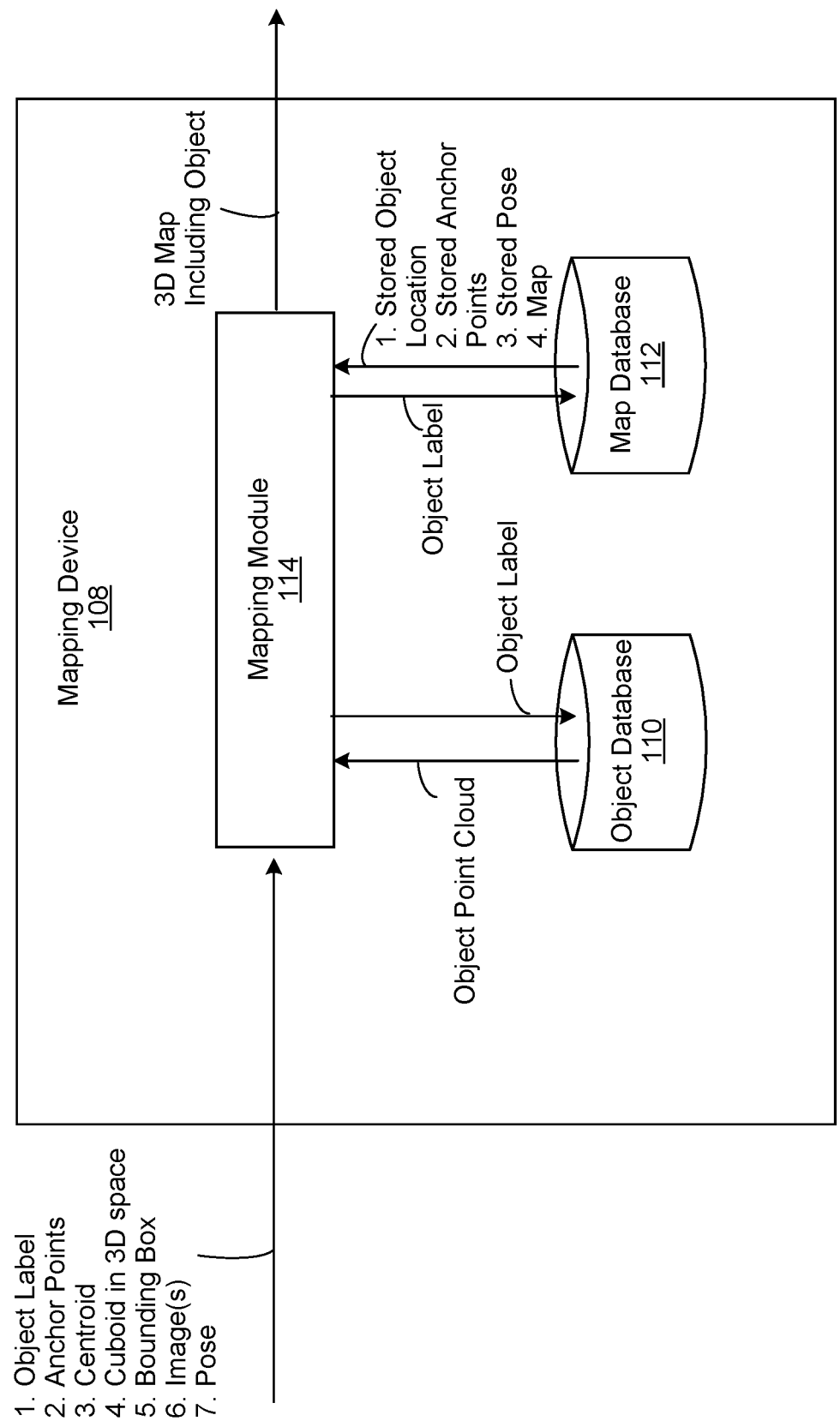
FIG. 7B illustrates a detailed example of the mapping module of the mapping device for performing the XR method of FIG. 7A.
Figure 8B:
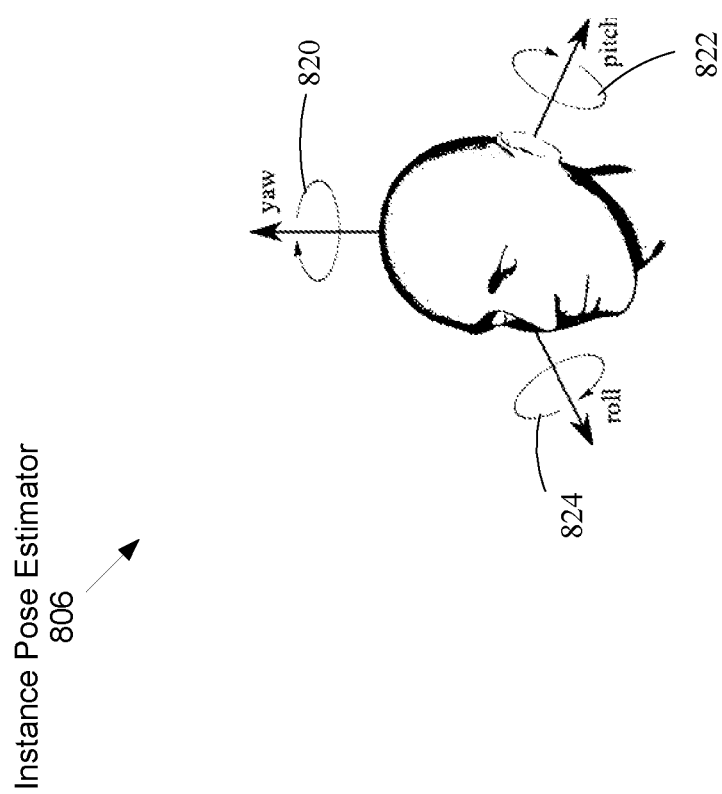
FIG. 8B illustrates a pictorial view of an instance pose estimator of the pose estimation module, in accordance with an example embodiment.
Figure 9A:
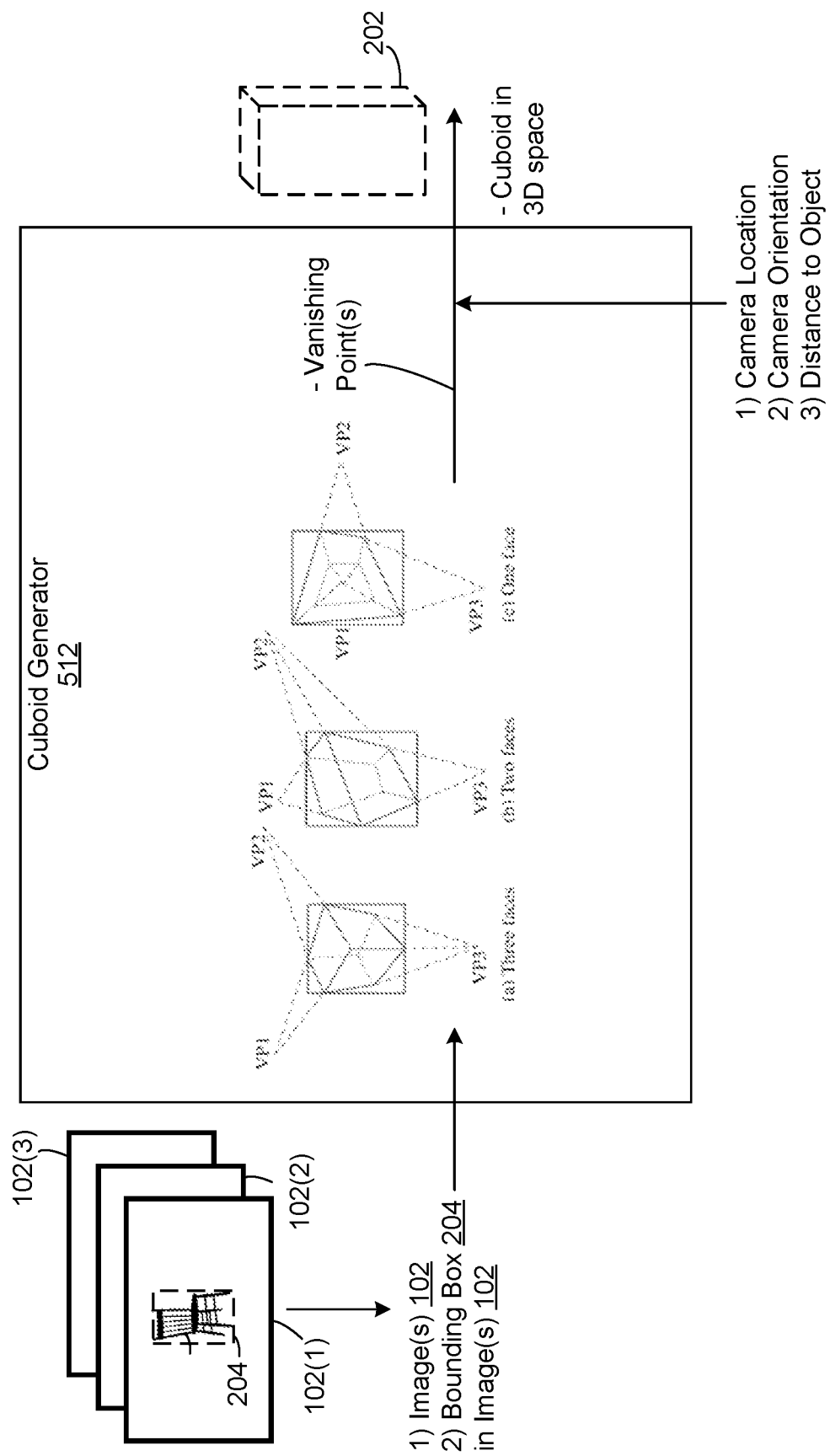
FIG. 9A illustrates a pictorial example of a cuboid generator for the XR method, in accordance with an example embodiment.
Figure 9B:
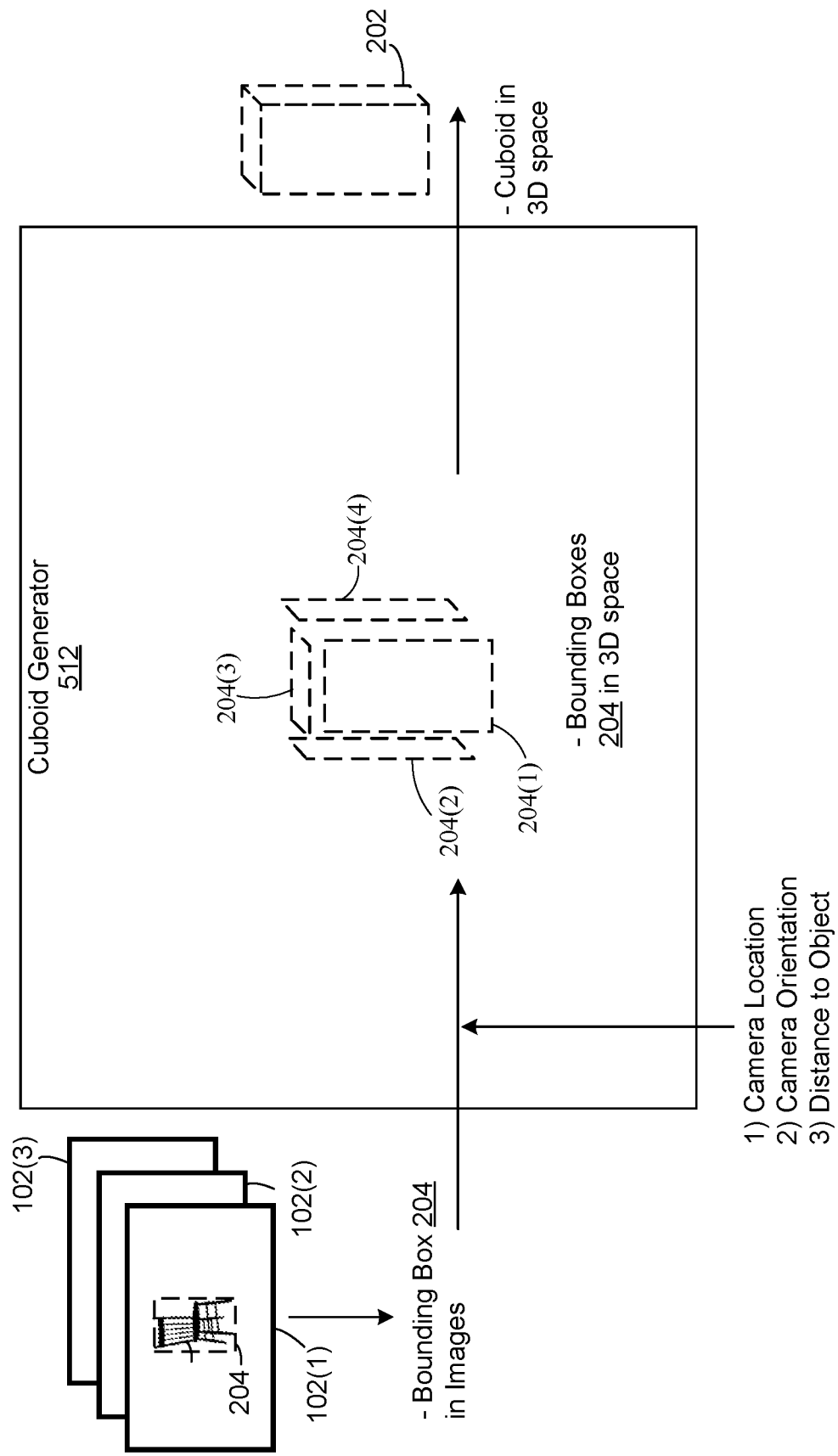
FIG. 9B illustrates a pictorial example of an alternate example cuboid generator for the XR method, in accordance with an example embodiment.
Figure 10A:
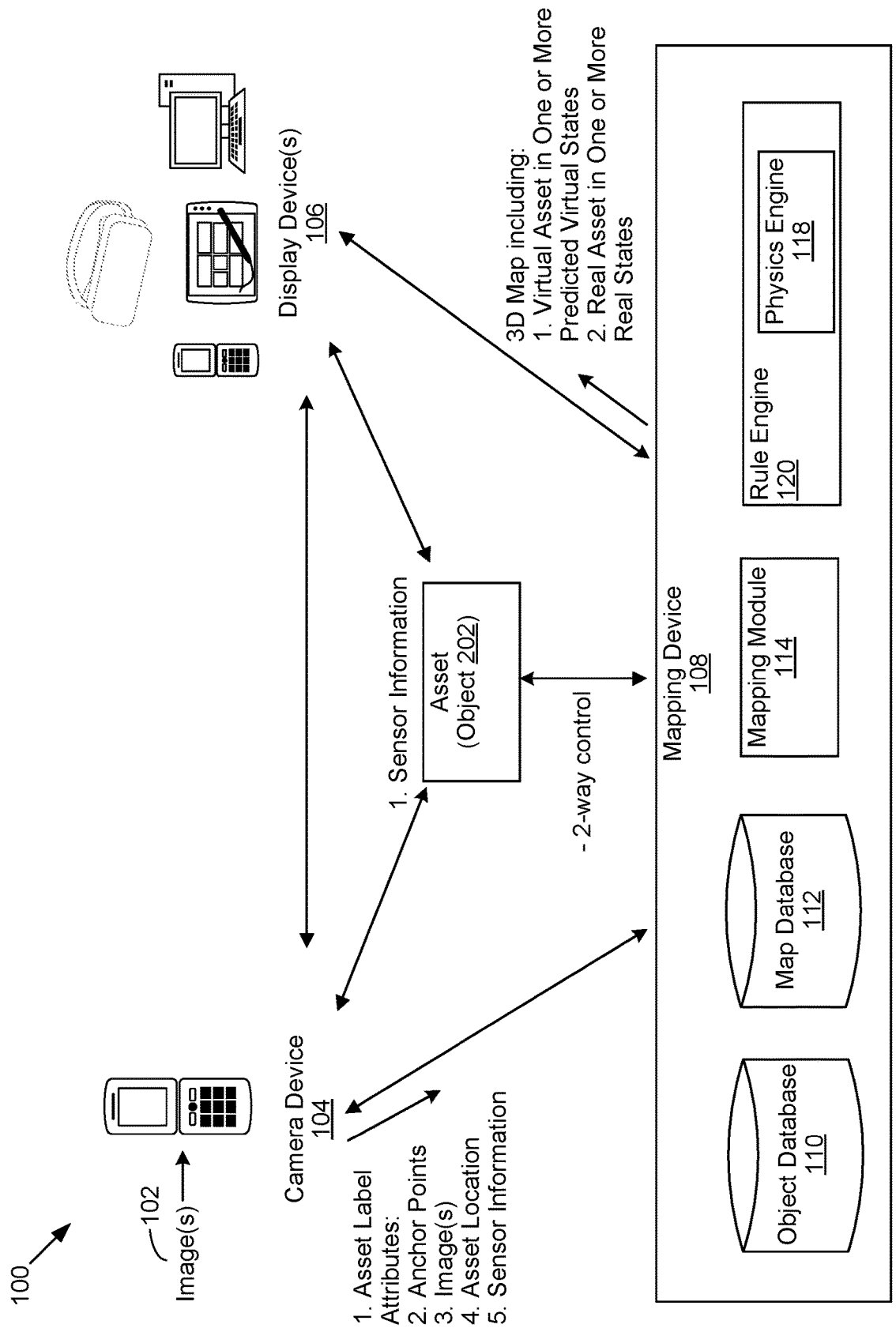
FIG. 10A illustrates a diagrammatic view of the XR method performed by the XR system, for two-way control of one or more digital twins, in accordance with an example embodiment.
Figure 10B:
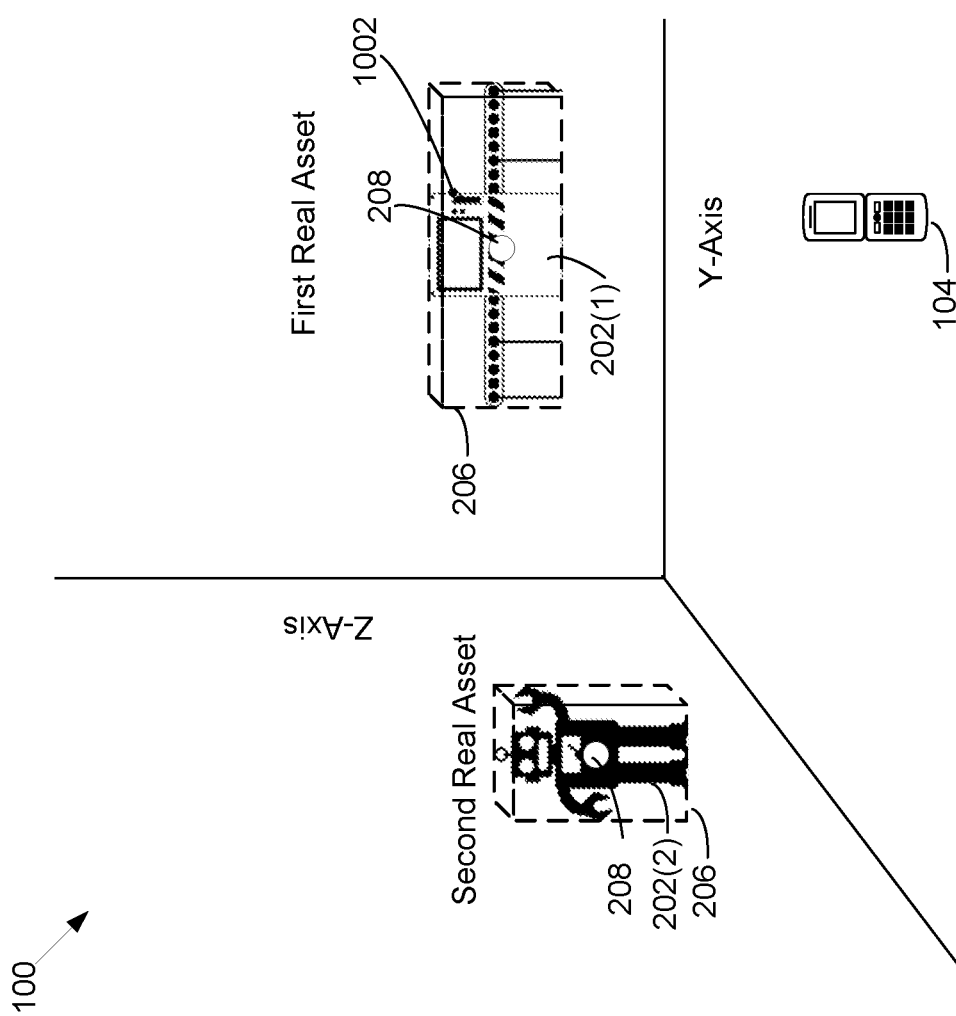
FIG. 10B illustrates an example of interacting with real assets by the XR method of FIG. 10A, in accordance with an example embodiment.

The applications and modules of the camera device 104, the mapping device 108, and the display device 106 can be used to perform aspects of the XR method in accordance with example embodiments. FIGS. 6A and 6B illustrate initially localizing an object and generating a 3D model of the object, in accordance with an example embodiment of the XR method. FIGS. 7A and 7B illustrate subsequently localizing the object, in accordance with an example embodiment of the XR method. FIGS. 8A and 8B illustrate example pose estimation as performed by the pose estimation module 516 for the XR method. FIGS. 9A and 9B illustrate example cuboid generation as performed by the cuboid generator 512 for the XR method. FIGS. 10A, 10B and 10C illustrate two-way control of digital twins, in accordance with an example embodiment.

FIG. 6A illustrates an example of the XR method performed by the XR system 100, for initially localizing an object and initially generating a 3D model of the object, in accordance with an example embodiment. The camera 522 generates one or more images 102 by capturing light (and optionally non-visible radiation) from the real world. The sensors 520 generate sensor information from the real world. The sensors 520 can include a scanner such as LiDAR to create a point cloud map of the real object of interest contained in each image, typically captured at the same locations as the capturing of the images 102 from camera 522 (although not necessarily so). In some examples, as understood in the art, the LiDAR scanner of the camera device 104 can be configured with a point map generator, which stitches together various scans from the camera device 104 at different locations. From the point cloud map of each image, the LiDAR scanner creates a point cloud map of the object. The various images of the object can also be used to generate color information for the point cloud map. In some examples, the camera device 104 or the mapping device 108 can be configured to subsequently generate a point cloud map of the object from the individual point cloud map of each image (with color information generated using the images). In some other examples, photogrammetry from the various images 102 (without the LiDAR scanner) is used by the positioning module 518 in order to generate the point cloud map. For example, Google ARCore™ can be used to generate the point cloud map of the real object of interest.

In an example, the positioning module 518 may also include ARCore. ARCore includes a mobile augmented reality library that can be used for camera orientation estimation, which is readily available on most Android™ devices or smartphones. ARCore is a library by Google™, which uses the data from the inertial measurement unit (IMU) sensors (e.g. accelerometer, magnetometer, and gyroscope), along with image feature points for tracking the camera orientation of the camera device 104 utilizing a Simultaneous Localization and Mapping (SLAM) algorithm. ARCore can perform camera orientation estimation in real-time. In that regard, to track the motion of the camera device 104, an android application (i.e. the positioning module 518) using ARCore can be developed in Unity3D environment, the Unreal environment, or other interactive 3D environments, for capturing red-green-blue (RGB) images along with the real world location of the camera device 104. The positioning module 518 can generate or determine the location and the camera orientation of the camera device 104 in a 3D coordinate system in the real world for each image 102. The positioning module 518 can generate or determine the distance from the camera device 104 to an object in the 3D coordinate system in the real world for each image 102.

The LiDAR scanner can also be used as a range detector to detect a distance between the camera device 104 and the object. The sensors 520 can include a GPS or LPS to localize the camera device 104 in 3D coordinates of the real world, therefore generating the camera location. The sensors 520 can include a compass and/or accelerometers to generate an orientation of the camera device 104. The positioning module 518 generates, using the sensor information: i) camera location, ii) camera orientation, and iii) camera distance to object.

As an alternative to using some or all of the sensor information, in an example, the positioning module 518 can also localize the camera device 104 using photogrammetry from an image of a stationary real object. For example, using the known pose, location, and dimensions of the stationary real object, the XR method can generate the orientation and location of the camera device 104.

In the XR method of FIG. 6A, the image 2D object detection module 510 generates for each image 102, using the image 102: i) object label, ii) bounding box, and iii) feature points in the image. In examples, the image 2D object detection module 510 is an image 2D object detector which can detect objects and feature points from images. Example embodiments that generate the object label can also generate an object score (probability or confidence of labelling the object), but are not shown for clarity. The bounding box is a rectangle that bounds the object detected in the image 102 by the image 2D object detection module 510. The image 2D object detection module 510 can include a CNN, for example as described in relation to FIG. 11 herein. In an example, the image 2D object detection module 510 can include a ResNET backbone, as understood in the art.

In an example, the object label is uniquely assigned to each object in the real world. For example, when the object is initially detected from the camera device 104, the object label can be initially assigned a unique object label. If there are a plurality of similar objects, each of those objects can be assigned a unique object label.

In other examples, the object label can be specific to a particular model and be used for multiple objects, for example a row of the same model of chairs can have each chair assigned the same object label, and the swapping of two real chairs does not require any change to the virtual 3D map for the same two virtual chairs. In some examples, the object label may already exist in an object library (e.g. object database 110) and that object label is initially assigned to the object.

In the XR method of FIG. 6A, the pose estimation module 516 generates, using the images 102, the object label, the bounding box in each image 102, the camera location, the camera orientation, and the distance to the object: i) front identifying information for the object, and ii) a pose of the object. The pose is the real pose in the real world coordinates, e.g. pitch, yaw (compass direction), roll.

The front identifying information can be used to determine the pose of the object. An example of the front identifying information is an image of the front of the object or a bounding box of the front of the object. Another example of the front identifying information is descriptive text of the front of the object, e.g. "face" or "nose" for a human, "hood" for a car. In other examples, other faces other than the front face are generated for purposes of generating the pose, for example back face, top face, bottom face, left face, or right face, etc. Another example of the front identifying information is the anchor points of the front of the object.

The pose estimation module 516 can include a CNN, for example as described in relation to FIGS. 8A and 8B herein. The pose estimation module 516 can include a ResNET backbone, as understood in the art.

In the XR method of FIG. 6A, the cuboid generator 512 generates for each bounding box, using the images 102, the object label, the bounding box in each image 102, the camera location, the camera orientation, and the distance to the object: the cuboid in 3D space (for example defined by opposite corners in real world coordinates).

In some examples, the cuboid can be defined for consistency purposes such that the front of the object is a front face of the cuboid perpendicular to horizontal ground, and a bottom of the object is a bottom face of the cuboid parallel to horizontal ground. Other definitions and landmarks can be used to define the cuboid. In other examples, arbitrary faces of the object are used to define the cuboid.

Examples of the cuboid generator 512 are described herein in relation to FIGS. 9A and 9B. In an example, the cuboid generator 512 can be rules based to generate the cuboid, e.g. based on stitching, estimating and/or averaging of the bounding boxes in 3D space. In an example, the cuboid generator 512 can include a cuboid generator model, which includes a CNN to generate the cuboid.

In the XR method of FIG. 6A, the centroid generator 514 generates a centroid using the cuboid. The centroid is the location in 3D space of the center of the cuboid. In an example, the centroid generator 514 is rules based. For example, given a cuboid having opposing diagonals of (X1, Y1, Z1) and (X2, Y2, Z2), the centroid of the cuboid can be calculated as ((X2+X1)/2, (Y2+Y1)/2, (Z2+Z1)/2). In other examples, the centroid generator 514 includes a centroid generator model that includes a CNN for generating the centroid using the cuboid.

In other examples, the centroid generator 514 includes a centroid generator model that includes a CNN for estimating the centroid using the images 102. For example, the CNN of the centroid generator 514 does not require the cuboid or the cuboid generator 512 and instead generates the centroid of the object using the images 102, the object label, the bounding boxes of the object in the images, the camera location, the camera orientation, and the camera distance to object.

The anchor point generator 524 generates anchor points which are the feature points in the 3D space. The anchor point generator 524 generates, using the feature points, the camera location, the camera orientation, and the distance to the object: the anchor points in 3D space. The anchor point generator 524 also generates, using the cuboid in 3D space: only the anchor points that are within the cuboid (e.g., those that overlap or are contained within the cuboid in 3D space).

The concatenation module 530 is used to concatenate and output any generated data and any pass through data. For example, the concatenation module 530 is used to output data to the mapping device 108 in order for the mapping device 108 to initially generate a 3D model of the object and map the object (location and pose). In the XR method of FIG. 6A, the concatenation module 530 concatenates and outputs: i) the images 102 of the object; ii) the object label; iii) the anchor points in 3D space, iv) the cuboid of the object; v) the centroid of the cuboid; vi) the front identifying information; vii) the pose; and viii) the point cloud map of the object (e.g. from the LiDAR scanner or photogrammetry). The output of the concatenation module 530 can be sent to the mapping device 108 for storing the location and pose of the object, and for generating and storing the 3D model of the object.

FIG. 6B illustrates a detailed example of the mapping module 114 for the XR method of FIG. 6A. The mapping module 114 can be configured to generate and store localization, pose and 3D models of the object for 3D mapping purposes. After the camera device 104 initially detects the object from the camera device 104, the mapping module 114 can generate and store a 3D model (e.g. point cloud map) of the object and the anchor points of the object. The 3D model can be retrieved for subsequent 3D mapping purposes, e.g. for interactive and immersive 3D maps such as VR and AR. When initially detecting the object, the mapping module 114 can store the initial location, pose, and anchor points of the object, using virtual coordinates of the virtual world that correspond to real world coordinates of the real world. For subsequent detection and localization of the object, the mapping device 108 can detect changes in the centroid or cuboid and the pose of the object in order to update the 3D map. For example, the mapping device 108 does not need to receive the entire point cloud map of the object in order to update the 3D map.

In the XR method of FIG. 6B, the mapping device 108 receives data from the camera device 104, for example the output of the concatenation module 530: i) the images 102 of the object; ii) the object label; iii) the anchor points, iv) the cuboid; v) the centroid; vi) the front identifying information; vii) the pose; and viii) the point cloud map of the object.

The 3D model generator 116 generates, using the point cloud map of the object: a 3D model of the object. The 3D model generator 116 stores the 3D model of the object to the object database 110. The 3D model can be in various formats, such as vector based models, primitive models, polygonal models, computer-aided design (CAD) models, solid mods, wireframe models, etc. In some examples, the 3D model generator 116 stored the point cloud map to the object database 110.

The 3D model generator 116 can store to the object database the front identifying information received from the camera device 104. The 3D model generator 116 can generate, using the front identifying information and the point cloud map of the object, additional front identifying information and store the additional front identifying information to the object database 110. For example, the additional front identifying information can be a particular POV of the 3D model and/or the point cloud map that represents the front of the object. For example, the additional front identifying information can be an image (rendered or actual) of the front of the object. For example, the additional front identifying information can be the anchor points of the front of the object.

In examples, the mapping module 114 stores the remaining information of the object to the object database 110, such as the object label, the anchor points, the cuboid, and the centroid. The cuboid can be a rectangular prism that represents the size and dimension of the real object, and can include the cuboid independent of real world coordinates in 3D space in some examples. The cuboid does not necessarily need to be stored in the object database 110 with the 3D coordinates in 3D space, although such embodiment is possible. The centroid can be the center of the cuboid in 3D space. The centroid can be the center of the cuboid, and does not necessarily need to be stored in the object database 110 with the 3D coordinates in 3D space, although such embodiment is possible. As well, the centroid can be stored in the object database 110 or can be calculated on an as-needed basis. The anchor points can be stored relative to coordinates of 3D space or relative to the 3D model (without coordinates of 3D space).

In some examples, the cuboid is adjusted or registered with the image of the 3D model and the point cloud map of the object, for example the front face of the cuboid can be registered with the front face of the object. The bottom face of the cuboid can be registered with the bottom face of the object. The adjustment or registration can be enriched using object libraries or manual adjustment.

Therefore, the object database 110 contains the 3D model of the object (along with other characteristics) which can be subsequently retrieved from the object database 110 for generating virtual 3D maps of the object.

In the example when the object is initially detected from the camera device 104, referring still to FIG. 6B, the mapping module 114 stores to the map database 112: i) the object label; ii) the anchor points in 3D space, iii) the centroid in 3D space; iv) the cuboid in 3D space; and iv) the pose of the object. The map database 112 can be used to generate a virtual 3D map of the object. In examples, when there is a subsequent location of the centroid or pose, the map database 112 can be used to compare and check if there are any changes in the location or the pose. If so, the virtual 3D map can be updated for that object. If not, the virtual 3D map does not need to be updated for that object. The cuboid in 3D space provides additional comparative information for any changes to the object. The anchor points in 3D space provide additional comparative information for any changes to the object.

FIG. 7A illustrates a detailed example of the XR method performed by the XR system 100, for subsequently localizing the object that was initially localized and 3D modelled in FIGS. 6A and 6B. For example, from the XR method in FIGS. 6A and 6B, the mapping device 108 stored the 3D model of the object in the object database 110, and stored the location and pose of the object in the map database 112.

The camera 522 generates one or more images 102 by capturing light (optionally non-visible radiation) from the real world. The sensors 520 generate sensor information from the real world.

The LiDAR can also be used as a range detector to detect a distance between the camera device 104 and the object. The sensors 520 can include a GPS or LPS to localize the camera device 104 in 3D coordinates of the real world, therefore generating the camera location. The sensors 520 can include a magnetometer (e.g. compass), gyroscopic, and/or accelerometers to generate an orientation of the camera device 104. The positioning module 518 generates, using the sensor information: i) camera location, ii) camera orientation, and iii) camera distance to object.

As an alternative to using some or all of the sensor information, in an example, the positioning module 518 can also localize the camera device 104 using photogrammetry from an image of a stationary real object, in which the location, pose and size of the stationary real object are known.

In the XR method of FIG. 7A, the image 2D object detection module 510 generates for each image 102, using the image 102: i) object label, ii) bounding box of the object in the image, iii) feature points in the image. The image 2D object detection module 510 can include a CNN, for example as described in relation to FIG. 11 herein. The image 2D object detection module 510 can include a ResNET backbone, as understood in the art. In an example, the image 2D object detection module 510 is trained to identify the proper object label to the object. The object label can be previously generated from the XR method of FIG. 6A, or can be obtained from a library of objects having object labels. In some examples, the object label is unique to the object. In other examples, the object label can be specific to a particular model and be used for multiple objects of that particular model, for example a row of the same model of chairs can have each chair assigned the same object label.

In some examples, the image 2D object detection module 510 also uses the camera location from the positioning module 518 and the last known location of objects from the map database 112. Any objects having a centroid location that were last known to be "close" or within a distance threshold to the camera location can be generated by the image 2D object detection module 510 as having a higher object score. For example, when inside an event venue, a chair that was last known to be located within the event venue is more likely to be the same chair (and given a higher object score) than another chair that was last known to be located across the real world.

In the XR method of FIG. 7A, the pose estimation module 516 generates, using the images 102, the object label, the bounding box in each image 102, the camera location, the camera orientation, and the camera distance to the object: i) front identifying information for the object, and ii) a pose of the object. The pose is the real pose in the real world coordinates, e.g. pitch, yaw (compass direction), roll.

The front identifying information can be used by the pose estimation module 516 to determine the pose of the object. The pose estimation module 516 can include a CNN, for example as described in relation to FIGS. 8A and 8B herein. The pose estimation module 516 can include a ResNET backbone, as understood in the art.

In some examples, the pose estimation module 516 can estimate the pose of the object using only one image.

In the XR method of FIG. 7A, the cuboid generator 512 generates for each bounding box, using the images 102, the object label, the bounding box in each image 102, the camera location, the camera orientation, and the distance to the object: the bounding box in 3D space (for example defined by opposite corners in real world coordinates). The cuboid generator 512 generates, from the bounding boxes in 3D space: a cuboid in 3D space (for example defined by opposite corners in real world coordinates). The bounding box in 3D space can be located at a perpendicular plane at the closest point of the object to the camera device 104.

In some examples, the cuboid can be defined for consistency purposes such that the front of the object is a front face of the cuboid perpendicular to horizontal ground, and a bottom of the object is a bottom face of the cuboid parallel to horizontal ground. Other definitions and landmarks can be used to define the cuboid.

In other examples, arbitrary faces of the object are used to define the cuboid. In other words, the cuboid generated by the cuboid generator 512 in FIG. 7A may be slightly different (at different angles) than the cuboid generated by the cuboid generator 512 in FIG. 6A. The differences in centroid location of the centroid at different times can generally be within an acceptable threshold to determine that the object has been stationary.

In some examples, the cuboid generator 512 can generate the cuboid of the object using only one image.

An example of the cuboid generator 512 is described herein in relation to FIGS. 9A and 9B. In an example, the cuboid generator 512 can be rules based to generate the cuboid, for example using vanishing points (VP) and photogrammetry. The cuboid generator 512 can be e.g. based on stitching, estimating and/or averaging of the bounding boxes in 3D space. In an example, the cuboid generator 512 can include a CNN to generate the cuboid.

In the XR method of FIG. 7A, the centroid generator 514 generates a centroid using the cuboid. The centroid is the location in 3D space of the center of the cuboid. In example, the centroid generator 514 is rules based or can include a machine learning model such as a CNN.

In other examples, the CNN of the centroid generator 514 does not require the cuboid or the cuboid generator 512 and instead generates the centroid of the object using the images, the object label, the bounding boxes of the object in the images, the camera location, the camera orientation, and the camera distance to object.

The anchor point generator 524 generates anchor points which are the feature points in the 3D space. The anchor point generator 524 generates, using the feature points, the camera location, the camera orientation, and the distance to the object: the anchor points in 3D space. The anchor point generator 524 also generates, using the cuboid in 3D space, only the anchor points that are within the cuboid (e.g., those that overlap or are contained within the cuboid in 3D space).

The concatenation module 530 is used to concatenate and output any generated data and any pass through data. For example, the concatenation module 530 is used to output data to the mapping device 108 in order for the mapping device 108 to determine whether there has been a change in the object (location and pose) for 3D mapping purposes. In the XR method of FIG. 7A, the concatenation module 530 concatenates and outputs: i) the object label; ii) the anchor points in 3D space of the object in the cuboid, iii) the centroid of the cuboid; iv) the cuboid; v) the bounding box; vi) the image(s). In other examples, not shown, the concatenation module 530 can output i) the object label; ii) the anchor points of the object in the cuboid, vii) the pose, and at least one or more of: iii) the centroid of the cuboid; iv) the cuboid; or v) the bounding box with vi) the image(s), any or all of which can be used as additional information by the mapping device 108 for generating the 3D map.

In some examples, not shown, the image 2D object detection module 510 also generates, from each image 102, a mask of the image 102. A mask is a binary image with pixel values in place of the object in the image. In some examples, the mask can be used as additional data by the pose estimation module 516. As well, the mask can be used as additional data by the cuboid generator 512.

FIG. 7B illustrates a detailed example of the mapping module 114 for the XR method of FIG. 7A. For subsequent detection and localization of the object, the mapping device 108 can detect changes in the location (centroid or cuboid) and the pose of the object in order to update the 3D map. For example, at this stage, the mapping device 108 does not need to receive the entire point cloud map of the object in order to update the 3D map.

In the XR method of FIG. 7B, the mapping module 114 receives data from the camera device 104, for example the output of the concatenation module 530: i) the object label; ii) the anchor points in 3D space of the object in the cuboid, iii) the centroid of the cuboid; iv) the cuboid; v) the bounding box; vi) the image(s); and vii) the pose. In other examples, not shown, the concatenation module 530 can output i) the object label; ii) the anchor points of the object in the cuboid, vii) the pose, and at least one or more of: iii) the centroid of the cuboid; iv) the cuboid; or v) the bounding box with vi) the image(s), any or all of which can be used as additional information by the mapping device 108 for generating the 3D map.

The mapping module 114 uses the object label to query the map database 112 of the last known location (centroid location or cuboid location), the known anchor points of the object, and the known pose of the object. In response, the map database 112 returns the last known location, the known anchor points, and the known pose to the mapping module 114. The map database 112 also returns the virtual 3D map of the applicable real world coordinates at the last known location, which is typically without the object but includes the background, environment, terrain, and sometimes stationary real objects.

When the mapping module 114 determines that there is a change in the location (centroid or cuboid), the anchor points, or the pose (or the change exceeds a respective distance or angular threshold), the mapping module 114 also updates the map database 112 with the new changed location (centroid or cuboid), the new anchor points (changed anchor points), or new pose (changed pose). The mapping module 114 can use the object label to query the object database 110. In response, the object database 110 returns the 3D model of the object (e.g., that was generated and stored in the object database 110 as in FIG. 6B) which can include the known anchor points. The mapping module 114 generates, using the object 3D model, the object location (centroid or cuboid), the anchor points, the pose, and the 3D map: the 3D map with the object. The mapping device 108 can output the 3D map with the object, for example by transmitting to the display device 106. In some examples, the information regarding the change in the object location (centroid or cuboid) or the pose is transmitted to the display device 106, and the 3D display module 410 (FIG. 4) takes into account the change the centroid or the pose when outputting the 3D map to the display 412.

The cuboid in 3D space and the images from the camera device 104 can also be used by the mapping module 114 as additional information to determine whether there is a change in the location or the pose of the object. For example, one of the faces of the cuboid can be identified (e.g. the front identifying information) as the front of the object, and can be used to generate the pose of the object.

When there is no change in the location (centroid or cuboid) or pose (or within a respective distance or angular threshold), the object in the 3D map does not change. For example, either the 3D map that has not changed is output to the display device 106 and does not need updating/refreshing, or a message is output to the display device 106 that the location and pose of the object has not changed and therefore the 3D map does not need updating/refreshing. A similar example can be implemented when there is no change in the cuboid in 3D space.

It can be appreciated that the mapping device 108 generating of the 3D map including the object can be performed in near real-time to the capturing of the image(s) 102 by the camera device 104 as in FIG. 7A. For example, the mapping device 108 does not need to receive a 3D point cloud map of the object or the environment for the XR method of FIGS. 7A and 7B, which is data intensive. Rather, the mapping device 108 can receive the object label, the anchor points, and the cuboid or the centroid and the pose in order to establish that the object had moved or not moved, in order to update the 3D map.

In another example, the digital 3D map (including the objects) prevails over the real world. When a real object location differs from the virtual object location, the mapping device 108 sends an instruction to the user, a machine, or the object itself for the object to return to the desired real location in order to match the virtual object location. An example can be applied to the scenario of event venue planning. A chair may have a desired location for the venue setup. The virtual 3D map stores the desired virtual location. The chair may have been inadvertently moved. The XR method is used by the mapping device 108 to determine that the real location differs from the virtual location. In response, the mapping device 108 sends an instruction to the user, a machine, or the chair itself (if motorized) to return to the desired virtual location. The XR method of FIGS. 7A and 7B can be performed again on the real object to determine that the object has moved to the desired location, and pose. In some examples, an AR application so that the desired location and pose of the virtual chair are overlaid in the display output of the display device 106.

FIG. 8A illustrates a detailed example of the pose estimation module 516 for the XR method, in accordance with an example embodiment. The front detection module 802 is used to generate front identifying information from the images. The pose can be initially generated or calculated as the POV pose 814 from the POV of the camera device 104, e.g. in relation to a line of sight from the camera device 104 to the object. The 3D space converter 830 can be used to translate the POV pose 814 to the real world pose in 3D space 816 (also just called "pose" herein), with the 3D space converter 830 using math or a NN such as a CNN.

FIG. 8B illustrates a pictorial view of the instance pose estimator 806 of the pose estimation module 516, in accordance with an example embodiment. In particular, the instance pose estimator 806 generates a respective pose from each image of the object in the respective bounding box. As shown in FIG. 8B, the pose can include pose angles of yaw 602, pitch 604, and roll 606. Each pose angle can be an angular value such as degrees, radian, or other suitable scale.

The real and virtual pose angle can use a common reference point of the world, such as real North and virtual North for yaw 602, e.g. 0 degrees being North. The roll 606 and the pitch 604 can use the real ground and virtual ground as a common reference point, e.g. 0 degrees being parallel to ground. In an example, positive angular values follow the left hand rule with the thumb pointing along the respective axis. In some examples, at least one but not all of the particular pose angles are detected. For example, in some instances only yaw 602 (compass direction) is detected. In other examples, other coordinate schemes can be used for the pose, such as compass direction angle (yaw 602) and elevation angle (pitch 604).

Referring again to FIG. 8A, the front detection module 802 generates, using at least one image 102, the object label, and the bounding box in each image: front identifying information. The front detection module 802 can include a front detection model that includes a NN such as a CNN. For example, the CNN can be trained to return a vector that represents the front identifying information. In an example, the front identifying information can include a bounding box of only the front of the image. In an example, the front identifying information is the anchor points of the front of the object. In an example, the front identifying information can include descriptive text, e.g. "face" or "nose" for a human, or "hood" for a car. In an example, the front detection module 802 can query the object database 110 to retrieve any one of the following example front identifying information: the descriptive text, a POV of the front of a 3D model of the object, an image of a front of the object, or a 3D model or point cloud map of only the front of the object.

The pose estimation module 516 includes an instance pose estimator 806, which determines the pose of the object in 3D space 816. The instance pose estimator 806 includes a yaw CNN 808, a pitch CNN 810, and a roll CNN. The instance pose estimator 806 receives: i) the image(s) 102, ii) the front identifying information, iii) the object label, and iv) the bounding box in each image. The yaw CNN 808 generates the yaw in the POV pose 814 (perspective of the camera device 104). The pitch CNN 810 generates the pitch 822 in the POV pose 814 (perspective of the camera device 104). The roll CNN 812 generates the yaw in the POV pose 814 (perspective of the camera device 104). The 3D space converter 830 uses the POV pose 814, the camera location, the camera orientation, and the camera device to object to generate: the pose in 3D space 816. The 3D space converter 830 uses math or a NN such as a CNN. More images 102 can be used by the pose estimation module 516 to provide better accuracy for the pose in 3D space 816. In some examples, only one image 102 is used to generate the pose in 3D space 816.

FIG. 9A illustrates a pictorial example of the cuboid generator 512 for the XR method, in accordance with an example embodiment. The cuboid generator 512 generates the cuboid in 3D space, which can be defined by real world coordinates of two opposite diagonals of the cuboid, e.g. (X1, Y1, Z1) and (X2, Y1, Z2). The cuboid in 3D space bounds the object from the images 102. In FIG. 9A, for example, the cuboid generator 512 generates, from one or more images 102 and their respective bounding box 204: one or more vanishing points (VPs) of the object. For a 3D object, three VPs points can be used to fully define the cuboid of the object. In some examples, one or two VPs may be used. In FIG. 9A, the cuboid generator 512 generates, using the one or more VPs and the camera location, the camera orientation, and the distance to the object: the cuboid in 3D space.

An example of generating one or more of the VPs is described by Yang et al., "*Cubeslam: Monocular 3-d object slam*" IEEE Transactions on Robotics 35.4 (2019): 925-938, incorporated herein by reference. In an example, the goal of the cuboid is such that the 3D cuboid's projected corners should fit the 2D bounding box tightly. A general 3D cuboid can be represented by 9 Degree of Freedom (DoF) parameters: 3 DoF position=t=[tx, ty, tz]; 3 DoF rotation R; and 3 DoF dimension=d=[dx, dy, dz].

In order to fully constrain all 9 parameters more information is needed along with the 2D bounding box for the detected object. In some examples, provided or predicted object dimensions and orientations used. In the present example, rather than relying on the predicted dimensions, VPs points are used to change and reduce the regression parameters in order to work for general objects. The VP is a parallel lines' intersection after projection onto perspective images. A 3D cuboid has three orthogonal axes and can form three VPs after projections depending on object rotation matrix R with respect to the camera frame and calibration matrix K:

$VP_i = KR_{col(i)}$, i□{1, 2, 3} where $R_{col(i)}$ is the $i^{th}$ column of R.

VP is determined by the object rotation matrix R.

Additional examples of the XR method generating the cuboid are described in PCT Patent Application No. PCT/CA2022/051063.

FIG. 9B illustrates a pictorial example of an alternate example of the cuboid generator 512 for the XR method, in accordance with an example embodiment. The cuboid generator 512 generates the cuboid in 3D space, which can be defined by real world coordinates of two opposite diagonals of the cuboid, e.g. (X1, Y1, Z1) and (X2, Y1, Z2). The cuboid in 3D space bounds the object from the images 102.

As before, the images 102(1), 102(2), 102(3) can be taken from a variety of orientations and distances between the POV of the camera device 104 to the object 202. In FIG. 9B, the cuboid generator 512 generates, using the bounding box 204 in each image 102(1), 102(2), 102(3), the camera location, the camera orientation, and the camera distance to the object: the bounding boxes 204(1), 204(2), 204(3), 204(4) in 3D space. The bounding boxes 204(1), 204(2), 204(3), 204(4) in 3D space are shown as being rectilinear for simplicity and clarity, and in most scenarios the bounding boxes 204(1), 204(2), 204(3), 204(4) in 3D space will be taken from a variety of angles that include oblique angles to the object 202. The cuboid generator 512 generates, using the bounding boxes 204(1), 204(2), 204(3), 204(4) in 3D space: the cuboid in 3D space. The cuboid generator 512 uses math or a NN such as a CNN. The math can include averaging and estimating the bounding boxes 204(1), 204(2), 204(3), 204(4) in 3D space. More images 102 can be used by the cuboid generator 512 to provide better accuracy for the cuboid in 3D space.

In some examples, only one image 102 is used to generate the cuboid in 3D space. For example, not shown, using the object label, the pose from the pose estimation module, a known cuboid dimensions retrieved from the object database 110 using the object label, the camera location, the camera orientation, and the camera distance to the object, the cuboid generator 512 generates the cuboid in 3D space.

FIG. 10A illustrates a diagrammatic view of the XR method performed by the XR system 100, for two-way control of one or more digital twins, in accordance with an example embodiment. The XR system 100 of FIG. 10A will be described in relation to one asset (object 202) and one camera device 104 in a space as shown, with the understanding that the XR system 100 can include a plurality of assets or a plurality of camera devices 104. The camera device 104 can also be the display device 106, in order to display the 3D map. An event can be initiated in relation to the real asset. The event can be initiated though the real asset, to cause a change in the virtual asset. The event can be initiated though the virtual asset, to cause a change in the real asset. Therefore, there is two-way control between the virtual asset (generated by the mapping device 108) and the real asset. In some examples, control commands are indirectly transmitted between the real asset and the mapping device 108, for example through the camera device 104 or the display device 106.

In an example, the asset has one or more sensors 232 (FIG. 2D) that detect sensor information relating to one or more attributes of the asset. The sensor 232 (or the asset) can transmit the sensor information. The sensor information can be transmitted directly to the mapping device 108 or indirectly to the mapping device 108 through the camera device 104.

In an example, the camera device 104 is used to capture one or more images of the real asset (object 202). In an example, the camera device 104 and the mapping device 108 perform the XR method as described in relation to FIG. 1, for the mapping device 108 to generate the 3D map. In FIG. 10A, the camera device 104 generates the anchor points and the asset location, for example using the XR method as in FIG. 6A. The asset location can be defined by real world 3D coordinates, by way of the anchor points, the cuboid 206, and/or the centroid 208 of the asset. The camera device 104 generates the asset label (object label) as described above. The camera device 104 sends to the mapping device 108: i) the asset label (object label), ii) the anchor points, iii) the images (which can also include a bounding box of the asset), iv) the asset location, and optionally v) the sensor information. In some examples, not shown here, the camera device 104 can also generate the pose of the asset and transmit the pose to the mapping device.

The mapping device 108 generates the 3D map of the same real world 3D coordinates, in which the 3D map includes the virtual asset of the real asset, having a 3D model or point cloud map in the same location. Real world changes detected by the camera device 104 or the sensors 232 of the real asset are updated by the mapping device 108 to be reflected in the virtual asset. In some examples, the mapping device 108 generates one or more predicted virtual states of the virtual asset. The mapping device 108 sends, to the display device 106 (which can be the camera device 104 in some examples), the 3D map. In an example, the 3D map includes, for concurrent display by the display device 106, the virtual asset in one or more predicted virtual states and the real asset in one or more real states.

In an example, the mapping device 108 receives navigation (from the display device 106 or the camera device)

through the 3D map in the XR application to a virtual location of the virtual asset which matches the real location of the real asset in the real world coordinates of the real 3D space. In an example, the mapping device 108 receives an initiation of an event of the real asset. The mapping device 108 generates, using the physics engine 118: one or more predicted virtual states of the virtual asset which are predicted to achieve the event in the real world coordinates of a virtual 3D space. The mapping device 108 receives one or more further real states of the real asset which achieve the event. For example, each real state is a state of the real asset at a particular time. Each real state can include one or more attributes of the real asset. The real states can be obtained from the sensors 232 or from the camera device 104 capturing and processing one or more further images. In some examples, the real states can be received in real time. The mapping device 108 generates the 3D map in an XR application with a concurrent display of the virtual asset in the one or more predicted virtual states and the real asset in the one or more further real states which achieve the event. In some examples, therefore, the mapping device 108 is configured to facilitate two-way control in that the initiation of the event can be initiated from the real asset and from the virtual asset.

For example, the initiation of the event is from the real asset. In an example, the receiving the initiation of the event includes receiving a communication from the real asset. In an example, the receiving the initiation of the event includes: receiving one or more further real states of the real asset; and detecting a change in the real state of the real asset.

In an example, the receiving the one or more further real states of the real asset includes receiving a respective bounding box for each of the at least one image of the asset, and wherein the detecting the change in the real state includes comparing the respective bounding box and the at least one image of the asset with a known attribute of the real asset.

In an example, the receiving the one or more further real states of the real asset includes receiving a centroid of a cuboid in the real world coordinates of the real 3D space, and wherein the detecting the change in the real state includes comparing the centroid with a known centroid of the real asset.

In an example, the receiving the one or more further real states of the real asset includes receiving a cuboid in the real world coordinates of the real 3D space, and wherein the detecting the change in the real state includes comparing the cuboid with a known cuboid of the real asset.

In an example, the receiving the one or more further real states of the real asset includes receiving further anchor points, and wherein the detecting the change in the real state includes comparing the further anchor points with known anchor points of the real asset.

In an example, the receiving the one or more further real states of the real asset includes receiving a pose in the real world coordinates of the real 3D space, and wherein the detecting the change in the real state includes comparing the pose with a known pose of the real asset.

In an example, the receiving the one or more further real states of the real asset includes receiving further anchor points, and wherein the detecting the change in the real state includes using the further anchor points to determine a change in a pose in the real world coordinates of the real 3D space of the real asset.

In an example, the receiving the one or more further real states of the real asset includes receiving a 3D model or a point cloud of the real asset, and wherein the detecting the change in the real state includes comparing the 3D model or the point cloud with a known 3D model or a known point cloud of the real asset.

In an example, the receiving the one or more further real states of the real asset includes receiving sensor information other than visually detected information of the real asset wherein the detecting the change in the real state uses the sensor information.

In an example, the mapping device 108 (through the display device 106) receives navigation from a user through the 3D map in the XR application to the virtual asset. In such an example, the receiving the initiation of the event is received through the virtual asset through the 3D map. In response, the mapping device 108 instructs the real asset (or the camera device 104, the display device 106, or a robot) to perform the event, e.g. changing one or more attributes (the state) of the real asset such as moving the real asset to a new location that matches the change in the virtual asset.

In an example, the performing of the XR method and the generating the 3D map in the XR application is performed in real time of the receiving the one or more further real states of the real asset.

In an example, the one or more rules can include a permissive right of the camera device 104 to perform the causing the other of the real asset or the virtual asset to achieve the event. In an example, the rules engine 120 or the physics engine 118 accounts for a relative location or distance between i) the real asset, and ii) the camera device 104. In an example, the physics engine 118 accounts for the physics between i) the real asset, and ii) the camera device 104.

FIG. 10B illustrates a pictorial view of the XR method performed by the XR system 100, for a space containing a plurality of real assets 202(1), 202(2) (two objects shown) and a plurality of camera devices 104 (one shown). The space is a real space (3D space) in the real world (or universe). The space can be an industrial floor, or a social event space, for example. The mapping device 108 can generate a 3D map of a virtual space that represents the real space, having in the same 3D coordinates of the 3D space and pose in the 3D space: a respective virtual asset for each of the assets 202 and a virtual camera for each of the camera devices 104. The assets 202 can interact with each other, in terms of physics and/or rules. The assets 202 can interact with the camera device 104, in terms of physics and/or rules. The physics can be predicted by the physics engine 118. The rules can be executed using the rules engine 120. In the example shown in FIG. 10B, the first real asset 202(1) is a machine and the second real asset 202(2) is a robot.

The example assets shown in FIG. 10B are a first real asset 202(1) and a second real asset 202(2). The camera device 104 is used to capture images of the first real asset 202(1) and the second real asset 202(2). In an example, the camera device 104 captures the images by way of video. In an example, one of the operable components 230 (FIG. 2D) of the first real asset 202(1) is an arm 1002 or lever, which is used to manually initiate an event in the first real asset 202(1). In an example, the arm 1002 is manually pulled to turn on or turn off the first real asset 202(1), and in some examples can be used for variable control by moving the arm 1002 to a partial position between an on state and an off state. In an example, the first real asset 202(1) can be instructed to move the arm 1002 though digital instructions via the processor 224 and the operable component interface 228 (FIG. 2D).

In an example, the camera device 104 sends to the mapping device 108: i) the asset label (object label) of the first real asset 202(1) and the second real asset 202(2), ii) the images (which can each also include a bounding box of the first real asset 202(1) and/or the second real asset 202(2)), iii) the asset location (e.g. anchor points, cuboid 206, or centroid 208) of the first real asset 202(1) and the second real asset 202(2), and optionally iv) the sensor information of the first real asset 202(1) or the second real asset 202(2). In an example, the respective sensor information can be sent by the first real asset 202(1) or the second real asset 202(2), or by external sensors (not shown here). In an example, the mapping device 108 generates a 3D map that includes a first virtual asset of the first real asset 202(1) and a second virtual asset of the second real asset 202(2). A user can navigate through the 3D map using the XR application to effect a change in the first virtual asset, which initiates an event in the first real asset 202(1). As well, a user located at the first real asset 202(1) can manually control the first real asset 202(1) (e.g. by pulling the arm 1002 of the first real asset 202(1)) or the first real asset 202(1) can self-initiate an event through the processor 224 (FIG. 2D)), in order to initiate an event of the first real asset 202(1), in which predicted virtual states are made by the mapping device 108 for the virtual asset. The progress of the event which changes the real state (one or more attributes of the first real asset 202(1)) is monitored by the camera device 104 and/or one or more of the sensors 232. Each state of the first real asset 202(1) can be tracked over time. The predicted virtual states can include consideration of the second real asset 202(2), and the effect of the second real asset 202(2) on the physics or rules (response) of the first real asset 202(1) (and vice versa).

In an example, the mapping device 108 receives the camera location of the camera device 104 which captured the at least one image. The mapping device 108 receives an initiation of an event of the real asset through one of the real asset or the virtual asset. The mapping device 108 causes the other of the real asset or the virtual asset to achieve the event. The causing uses one or more rules that account for interaction between i) the real asset, and ii) the camera device. The mapping device 108 receives one or more further real states of the real asset which achieve the event. The mapping device 108 generates the 3D map in an XR application with the virtual asset having one or more virtual states which match the one or more further real states. The real states which achieve the event can be received from the camera device 104 by way of further images, further real locations, or further sensor information.

An example is the scenario where there are multiple users in a facility, such as a maintenance person and a machine operator. Each user can be carrying a camera device 104 (which can sometimes include the display device 106). The maintenance person can be recognized using the camera device 104 they are carrying. For example, a maintenance person holding his camera device 104 inspecting a facility can be displayed information about real-time and historical usage data as well as maintenance schedules for the first asset 202(1) (Machine 1) that they are near. A machine operator holding his camera device 104 would not be shown maintenance information when they are near the first asset 202(1) (Machine 1) but would be shown operation instructions and safety procedures. Such a scenario is an example of a rule that accounts for interaction between i) the real asset, such as the first asset 202(1), and ii) the camera device 104. The interaction can include permissions in this example.

In some examples, the rules (from the rules engine 120) or physics (from the physics engine 118) can include other interactions between the user of the camera device 104 and the first asset 202(1). For example, the rules or physics may take into account the user's speed and ability to carry the first asset 202(1) from a first location to a second location, or to perform a manual operation on the first asset (e.g. operation or maintenance). Such a scenario is an example of a rule that accounts for interaction between i) the real asset, such as the first asset 202(1), and ii) the camera device 104. The interaction can include predictions based on physics in this example.

In some examples of the XR method, the causing of the real asset or the virtual asset to achieve the event uses one or more rules that account for interaction between i) a first asset, and ii) a second asset. For example, the first real asset 202(1) can be a first machine (Machine 1) and the second asset 202(2) can be a second machine (Machine 2). Machine 1 is predicted to shut down at a specific time due to: anticipated weather conditions; emitted heat from an adjacent machine. In an example, Machine 1 has an operating temperature of −10C to 45C and is set to turn off when its temperature falls outside of that range. Machine 1 gets hotter the faster it is set to work. Machine 1 is located beside a second machine (Machine 2) that also emits increasing heat relative to production level but the typical ambient temperature in the working area stays below the Machine 1's operating temperature. The weather is projected to get hotter later in the day but the Machine 1 output is required to be at full. When the temperature of Machine 1 at full production is combined with the ambient temperature from the weather and Machine 2's emitted temperature, Machine 1 is projected to shut off because its temperature will be outside of its operating range. The XR system will automatically optimize Machine 1 and Machine 2 production levels to keep Machine 1 running at full production during the warmer weather. If a combination of optimizing Machine 1 and Machine 2 production levels will not keep Machine 1 within operating temperatures then the HVAC system can be instructed to cool the environment further. In some examples, Machine 2 is mobile and is instructed by the mapping device 108 to move away from the other Machine 1. Alternatively, the mapping device 108 sends an output message the camera device 104 or the display device 106 to instruct a corresponding user to manually move Machine 2. Alternatively, the mapping device 108 instructs another machine (not shown) to move Machine 2. Another example is a rule that accounts for interaction between i) the real assets, being the first asset 202(1) and the second asset 202(2), and ii) the camera device 104. The interactions can include permissions or predictions based on physics.

Figure 11:
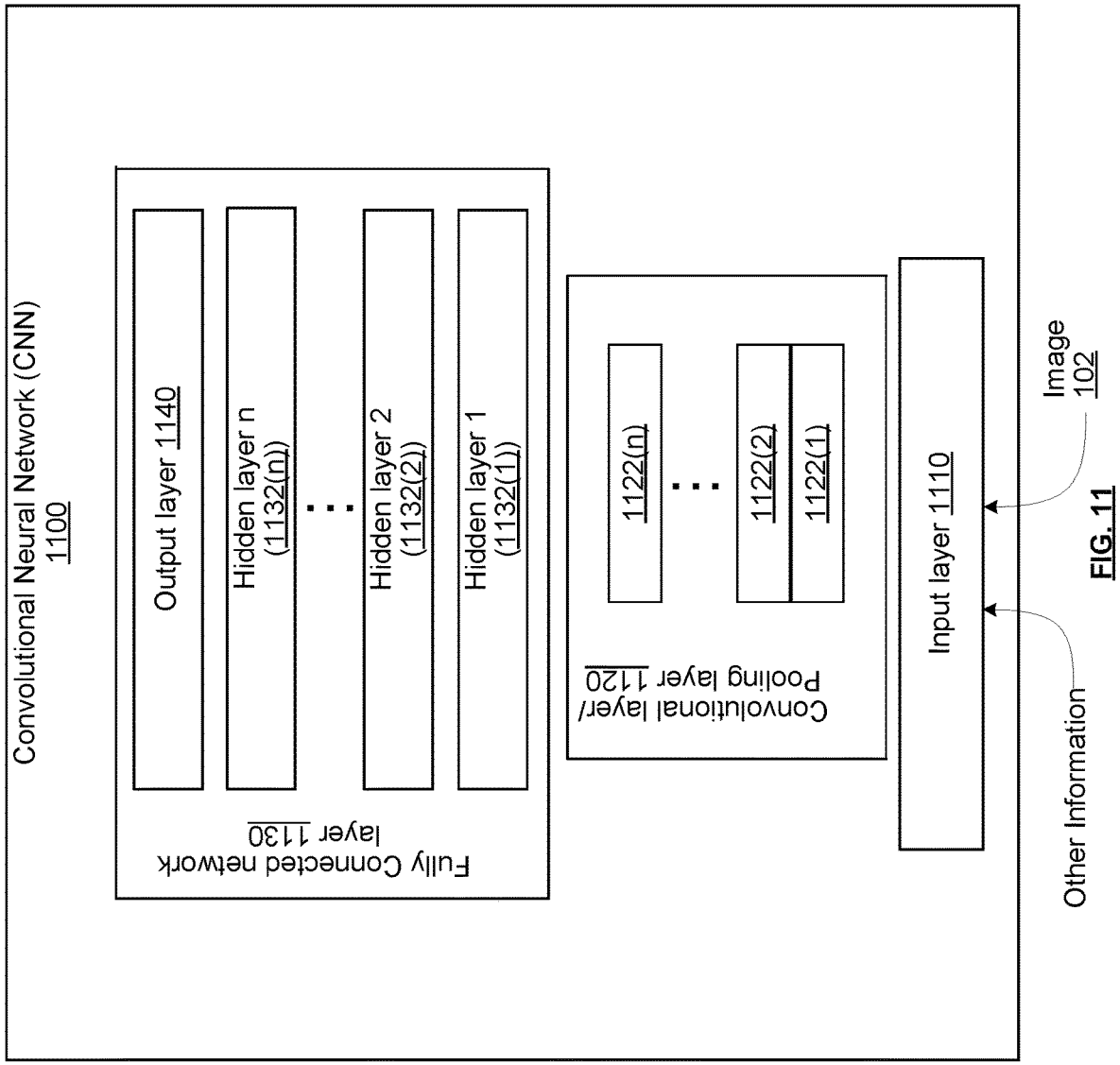
FIG. 11 illustrates an example detailed block diagram of a convolutional neural network (CNN) model for use in the XR method performed by the XR system, in accordance with an example embodiment.

FIG. 11 illustrates an example detailed block diagram of a CNN model for use in the XR method performed by the XR system 100, in accordance with an example embodiment. For examples, at least one or more of the described modules or applications can include a CNN. The CNN is a deep neural network with a convolutional structure, and is a deep learning architecture. The deep learning architecture indicates that a plurality of layers of learning is performed at different abstraction layers by using a machine learning algorithm. As a deep learning architecture, the CNN is a feed-forward (feed-forward) artificial neural network. Each neural cell in the feed-forward artificial neural network may respond to an image input to the neural cell.

As shown in FIG. 11, the CNN 1100 may include an input layer 1110, a convolutional layer/pooling layer 1120 (the pooling layer is optional), and a fully connected network layer 1130. In examples, the input layer 1110 can receive the image 102 and can receive other information (depending on the particular module or model).

The convolutional layer/pooling layer 1120 shown in FIG. 11 can include, for example, layers 1122(1), 1122(2), ..., 1122(n). For example: In an implementation, the layer 1122(1) is a convolutional layer, the layer 1122(2) is a pooling layer, the layer 1122(3) is a convolutional layer, the layer 1122(4) is a pooling layer, the layer 1122(5) is a convolutional layer, and the layer 122(6) is a pooling layer, and so on. In another implementation, the layers 1122(1) and 1122(2) are convolutional layers, the layer 1122(3) is a pooling layer, the layers 1122(4) and 1122(5) are convolutional layers, and the 1122(6) is a pooling layer. In examples, an output from a convolutional layer may be used as an input to a following pooling layer, or may be used as an input to another convolutional layer, to continue a convolution operation.

The following describes internal operating principles of a convolutional layer by using the layer 1122(1) as an example of a convolutional layer 1122(1). The convolutional layer 1122(1) may include a plurality of convolutional operators. The convolutional operator is also referred to as a kernel. A role of the convolutional operator in image processing is equivalent to a filter that extracts specific information from an input image matrix. In essence, the convolutional operator may be a weight matrix. The weight matrix is usually predefined. In the process of performing a convolution operation on an image, the weight matrix is usually processed one pixel after another (or two pixels after two pixels), depending on the value of a stride in a horizontal direction on the input image, to extract a specific feature from the image. The size of the weight matrix needs to be related to the size of the image. It should be noted that a depth dimension of the weight matrix is the same as a depth dimension of the input image. In the convolution operation process, the weight matrix extends to the entire depth of the input image. Therefore, after convolution is performed on a single weight matrix, convolutional output with a single depth dimension is output. However, the single weight matrix is not used in most cases, but a plurality of weight matrices with same dimensions (row x column) are used, in other words, a plurality of same-model matrices. Outputs of all the weight matrices are stacked to form the depth dimension of the convolutional image. It can be understood that the dimension herein is determined by the foregoing "plurality". Different weight matrices may be used to extract different features from the image. For example, one weight matrix is used to extract image edge information, another weight matrix is used to extract a specific color of the image, still another weight matrix is used to blur unneeded noises from the image, and so on. The plurality of weight matrices have the same size (row x column). Feature graphs obtained after extraction performed by the plurality of weight matrices with the same dimension also have the same size, and the plurality of extracted feature graphs with the same size are combined to form an output of the convolution operation.

Weight values in the weight matrices need to be obtained through a large amount of training in actual application. The weight matrices formed by the weight values obtained through training may be used to extract information from the input image, so that the CNN 1100 performs accurate prediction.

When the CNN 1100 has a plurality of convolutional layers, an initial convolutional layer (such as 1122(1)) usually extracts a relatively large quantity of common features. The common feature may also be referred to as a low-level feature. As the depth of the CNN 1100 increases, a feature extracted by a deeper convolutional layer (such as 1122(6) or 1122(n)) becomes more complex, for example, a feature with high-level semantics or the like. A feature with higher-level semantics is more applicable to a to-be-resolved problem.

An example of the pooling layer is also described. Because a quantity of training parameters usually needs to be reduced, a pooling layer usually needs to periodically follow a convolutional layer. To be specific, at the layers 1122(1), ... 1122(n), one pooling layer may follow one convolutional layer, or one or more pooling layers may follow a plurality of convolutional layers. In an image processing process, the purpose of the pooling layer is to reduce the space size of the image. The pooling layer may include an average pooling operator and/or a maximum pooling operator, to perform sampling on the input image to obtain an image of a relatively small size. The average pooling operator may compute a pixel value in the image within a specific range, to generate an average value as an average pooling result. The maximum pooling operator may obtain, as a maximum pooling result, a pixel with a largest value within the specific range. In addition, just like the size of the weight matrix in the convolutional layer needs to be related to the size of the image, an operator at the pooling layer also needs to be related to the size of the image. The size of the image output after processing by the pooling layer may be smaller than the size of the image input to the pooling layer. Each pixel in the image output by the pooling layer indicates an average value or a maximum value of a subarea corresponding to the image input to the pooling layer.

The fully connected network layer 1130 is now described. After the image is processed by the convolutional layer/pooling layer 1120, the CNN 110000 is still incapable of outputting desired output information. As described above, the convolutional layer/pooling layer 1120 only extracts a feature, and reduces a parameter brought by the input image. However, to generate final output information (desired category information or other related information), the CNN 1100 needs to generate an output of a quantity of one or a group of desired categories by using the fully connected network layer 1130. Therefore, the fully connected network layer 1130 may include a plurality of hidden layers (such as 1132(1), 1132(2), ..., 1132(n) in FIG. 11) and an output layer 1140. A parameter included in the plurality of hidden layers may be obtained by performing pre-training based on related training data of a specific task type. For example, the task type may include image recognition, image classification, image super-resolution re-setup, or the like.

The output layer 1140 follows the plurality of hidden layers 1132(1), 1132(2), ..., 1132(n) in the network layer 1130. In other words, the output layer 1140 is a final layer in the entire CNN 1100. The output layer 1140 has a loss function similar to category cross-entropy and is specifically used to calculate a prediction error. Once forward propagation (propagation in a direction from 1110 to 1140 in FIG. 11 is forward propagation) is complete in the entire CNN 1100, back propagation (propagation in a direction from 1140 to 1110 in FIG. 11 is back propagation) starts to update the weight values and offsets of the foregoing layers, to reduce a loss of the CNN 1100 and an error between an ideal result and a result output by the CNN 1100 by using the output layer.

It should be noted that the CNN 1100 shown in FIG. 11 is merely used as an example of a CNN. In actual application, the CNN may exist in a form of another network model.

Figure 12A:
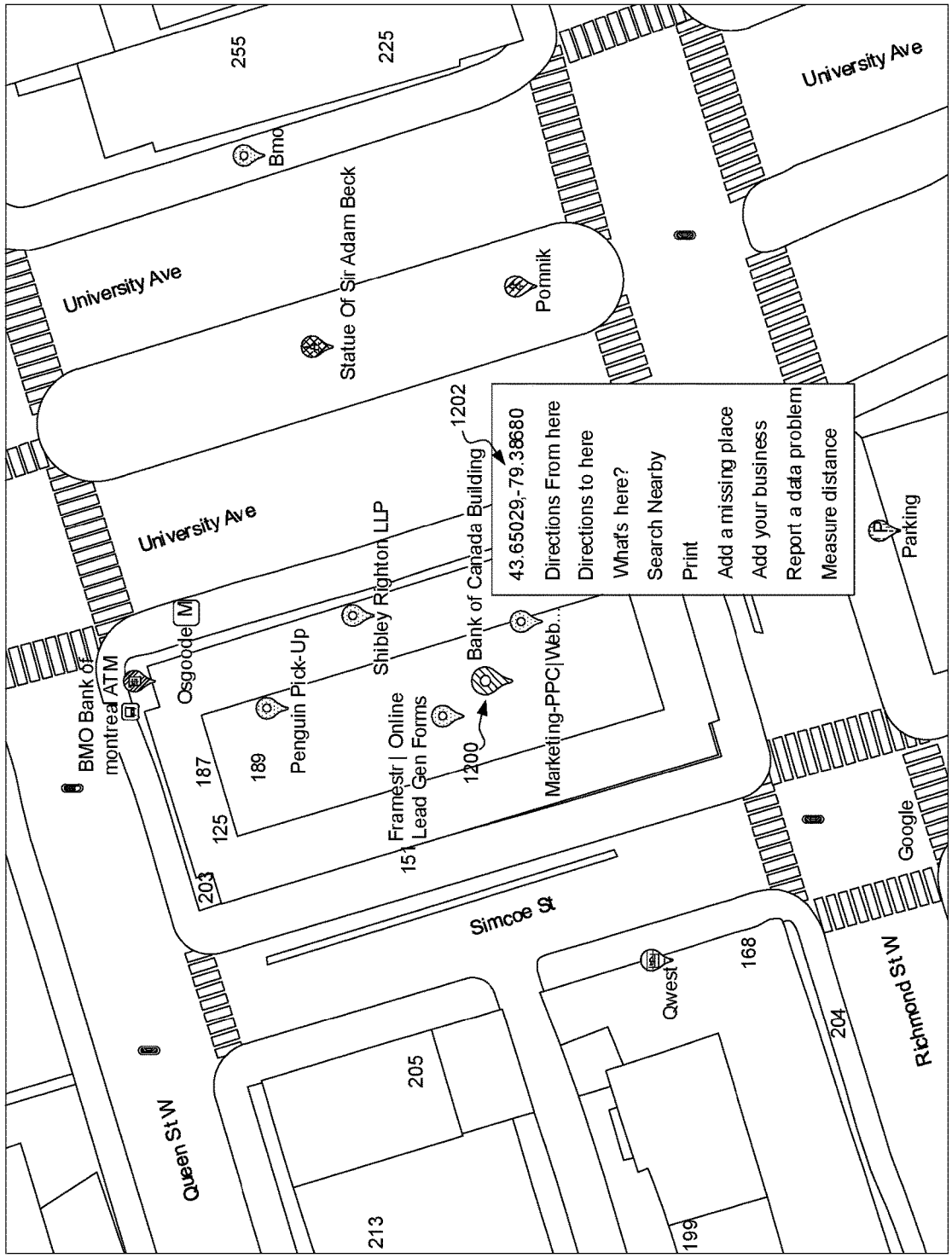
FIG. 12A illustrates an example map from a third party mapping service that is used by the XR method, in accordance with an example embodiment.
Figure 12B:
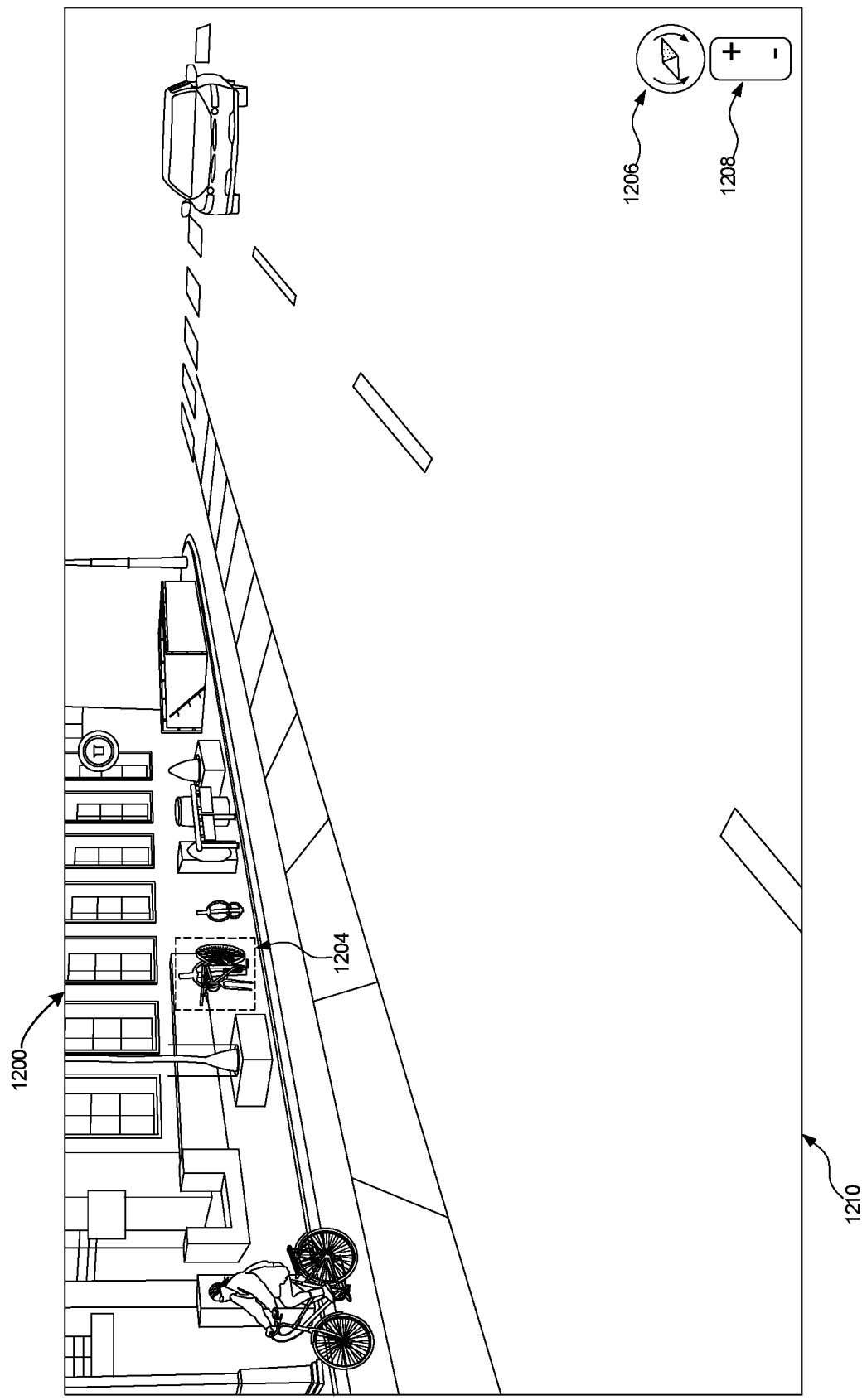
FIGS. 12B and 12C illustrate example images from different point of views of the example map of FIG. 12 that are used by the XR method, in accordance with an example embodiment.
Figure 12C:
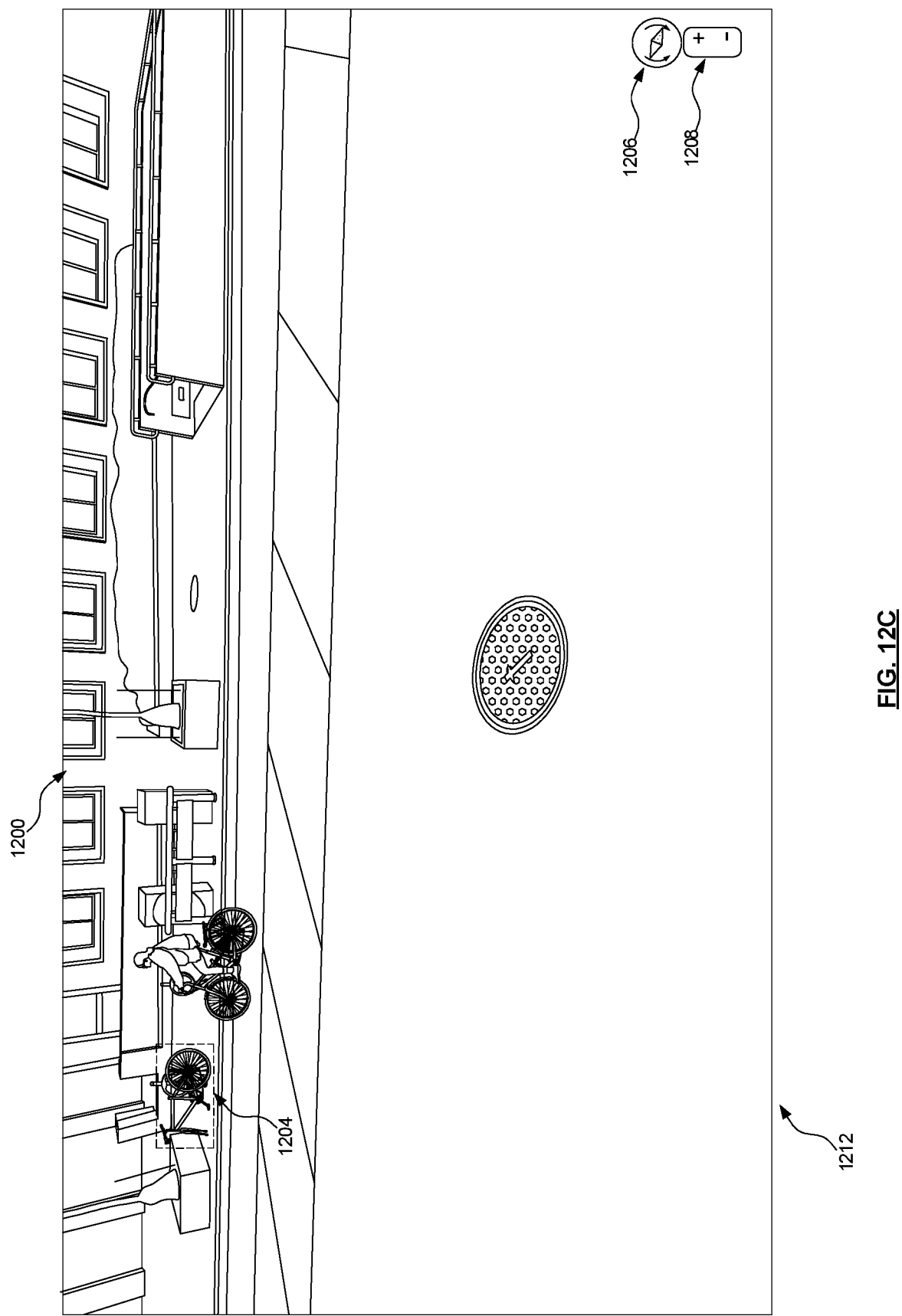

FIGS. 12A, 12B, and 12C illustrate example information and images from a third party mapping service such as Google Maps that are used by the XR method, in accordance with an example embodiment. FIG. 12B illustrates a first POV of a street view containing an object such as a bicycle 1204 that is localized using the XR method. FIG. 12C illustrates a second point view of the street view and the object. Additional images from further POVs or zoom distances can be used by the XR method.

In some examples, referring again to FIG. 7A with the sample information and images of FIGS. 12A, 12B and 12C, the camera 522 is from a third party mapping service, such as Google Maps™, and the images captured by the camera 522 are part of a third party mapping service, such as Google Maps™. For example, the third party mapping service such as Google Maps can provide images of the world, in POVs such as street view (rectilinear elevation or fishbowl) and satellite view. Other POVs may be available. The images from the third party mapping service are received or parsed by the XR method, using an API or other software applications (and/or can be extracted from 3D views of the third party mapping service). In such examples, the positioning module 518 obtains from the third party mapping service the 3D coordinates of the POV from the camera 522 (either X, Y, Z or at least longitude/latitude when the images are presumed to be at ground level) and the particular orientation of the camera 522. The remainder of the XR method in FIGS. 7A and 7B remains the same as described above, and can be used to continuously update the location and pose of the object from the images of the third party mapping service. For example, the cuboid generator 512 generates, using the images of the object, a cuboid of the object in 3D space. The centroid generator 514 generates, using the cuboid, a centroid of the object in 3D space. The pose estimation module 516 generates, using the images of the object: a pose of the object in 3D space. The centroid and the pose can be used by the mapping module 114 to determine whether the object requires updating in the 3D map. Therefore, a digital twin of objects in the world can be conveniently and automatically updated in the 3D map. In examples, the sensors 520 are not necessarily required. The images from the third party mapping service can be continuously used (parsed) for the camera device 104 and the mapping device 108 to generate up-to-date 3D maps, which includes the location and pose of the object. The 3D maps can be used for XR (e.g. VR or AR) applications.

FIG. 12A illustrates a map view of a real world location as provided by Google Maps. The map view includes a building 1200 which is a stationary object. The location name is "Bank of Canada Building" and the real world coordinates 1202 (location) of the building 1200 provided by Google Maps is 43.65029 latitude and −79.38680 longitude. The third party mapping application may also provide the coordinates of the camera location. FIGS. 12B and 12C illustrate example street view images from Google Maps captured at the real world coordinates 1202 of the building 1200. FIG. 12B shows a first image 1210 from a first POV from the camera 522 to the building 1200, in which the first image 1210 includes a bicycle 1204 (shown in a bounding box for clarity). FIG. 12C shows second image 1212 from a second POV (different location and orientation) from the camera 522 to the building 1200 and the bicycle 1204. As shown in FIGS. 12B and 12C, Google Maps also provides a compass direction 1206 of the particular POV of the camera 522. The Z direction of the camera 522 in the first image and the second image is approximately zero using ground as a reference. In other examples, the height of the camera 522 is generated as described above in relation to FIG. 2C, and can be used to determine the scale of the detected object.

Referring again to FIG. 7A, in some examples, the first image 1210 and the second image 1212 are received from Google Maps for the image 2D object detection module 510 and the pose estimation module 516. Additional images from further POVs or zoom distances can be used by the image 2D object detection module 510 and the pose estimation module 516. The image 2D object detection module 510 generates an object label and the bounding box of the bicycle 1204 in each image 1210, 1212. The building 1200 and the bicycle 1204 were previously mapped and 3D modelled and stored in the object database 110 and the map database 112, for example using photogrammetry and/or the XR method of FIGS. 6A and 6B. The real world coordinates 1202 and the compass direction 1206 of the POV are also received from Google Maps by the positioning module 518 to generate the camera location and the camera orientation. The distance to the object (bicycle 1204) can be generated using photogrammetry, for example with knowledge of the dimensions of the bicycle 1204 and/or the building 1200 from the object database 110, as described above.

The remainder of the XR method in FIGS. 7A and 7B remain the same as described above, and can be used to continuously update the location and pose of the bicycle 1204 from the images of Google Maps. For example, the cuboid generator 512 generates, using the images 1210, 1212 of the bicycle 1204: a cuboid of the bicycle 1204 in 3D space. The centroid generator 514 generates, using the cuboid: a centroid of the bicycle 1204 in 3D space. The pose estimation module 516 generates, using the images 1210, 1212 of the bicycle 1204: a pose of the bicycle 1204 in 3D space. The centroid and the pose can be used by the mapping module 114 to determine whether the bicycle 1204 requires updating in the 3D map. Therefore, a digital twin of the bicycle 1204 in the real world can be conveniently and automatically updated in the 3D map. The images from Google Maps can be continuously used (parsed and received) for the XR method of FIGS. 7A and 7B to generate up-to-date 3D maps, which includes the location and pose of the bicycle 1204. The 3D maps can be used for XR applications.

In the example of FIGS. 12B and 12C, Google Maps can be used to zoom in or zoom out from a particular POV of the camera 522. For example, multiple images can be taken from the same orientation of the camera 522 and different zoom distances to the object (relative to the camera 522). The multiple images at the same orientation and different zoom distances can be used by the XR method to provide greater accuracy. Similar examples apply to the user operating the camera device 104 to capture images from the camera 522 at the same orientation of the camera 522 and different distances (physically moving the camera device 104) or different zoom distances using a lens or digital zooming of the camera device 104.

Figure 13:
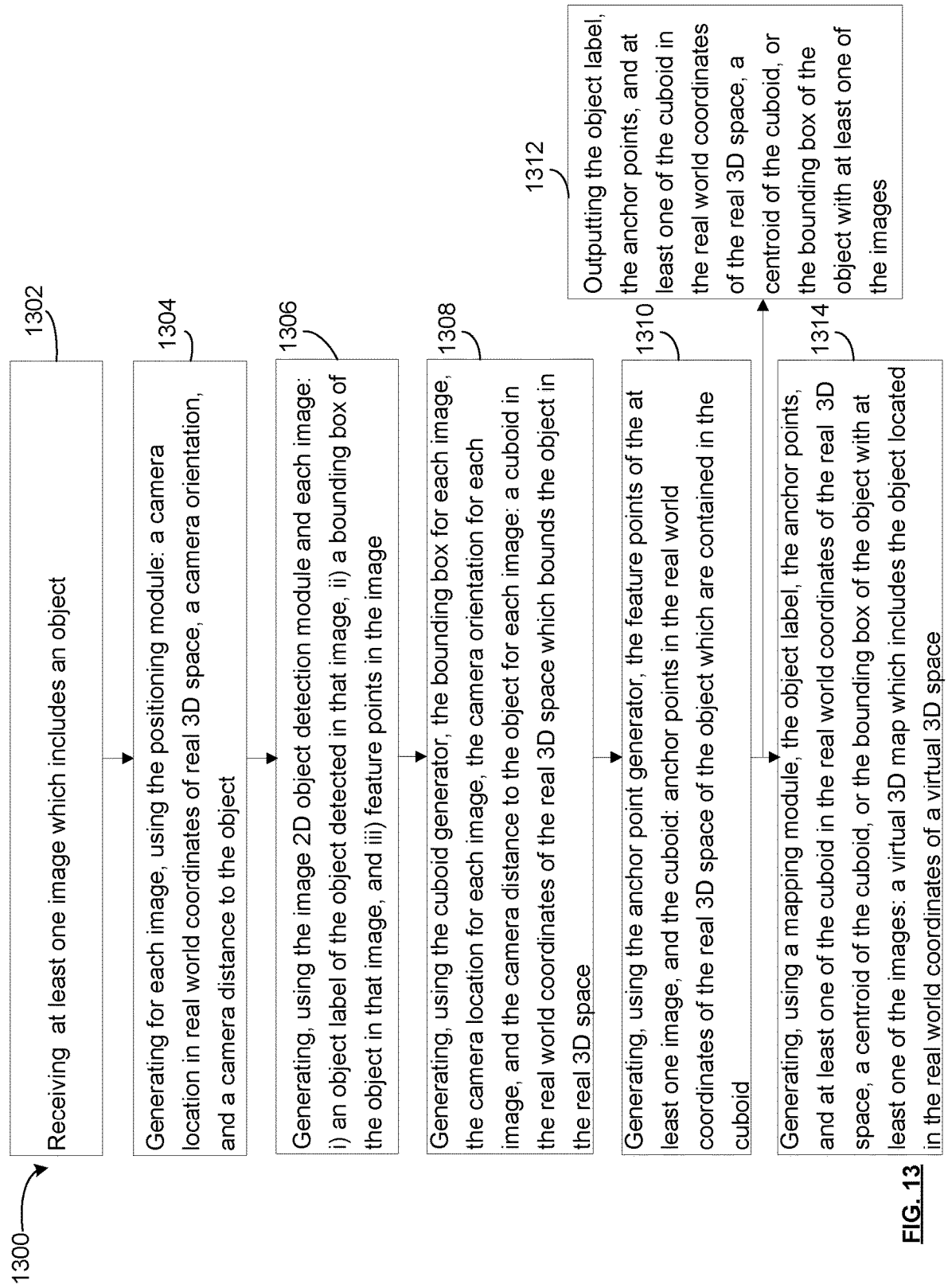
FIG. 13 illustrates an example detailed block diagram of the XR method performed by the camera device for localizing a real object, in accordance with an example embodiment.

FIG. 13 illustrates an example detailed block diagram of the XR method 1300 performed by the camera device 104 for localizing a real object, in accordance with an example embodiment. At step 1302, the camera device 104 receives at least one image which includes an object. For example, at least one image is received from the camera 522. At step 1304, the camera device 104 generates, for each image, using the positioning module 518: a camera location in real world coordinates of real 3D space, a camera orientation, and a camera distance to the object. At step 1306, the camera device 104 generates, using the image 2D object detection module 510 and each image: i) an object label of the object detected in that image, ii) a bounding box of the object in that image, and iii) feature points in the image. At step 1308, the camera device 104 generates, using the cuboid generator 512, the bounding box for each image, the camera location for each image, the camera orientation for each image, the camera distance to the object for each image: a cuboid in the real world coordinates of the real 3D space which bounds the object in the real 3D space. At step 1310, the camera device 104 generates, using the anchor point generator 524, the feature points of at least one image, and the cuboid: anchor points in the real world coordinates of the real 3D space of the object which are contained in the cuboid. At step 1312, the camera device 104 outputs (e.g. to the mapping device 108) the object label, the anchor points, and at least one of the cuboid in the real world coordinates of the real 3D space, a centroid of the cuboid, or the bounding box of the object with at least one of the images, for generating a 3D map which includes the object located in the real world coordinates of a virtual 3D space. In response to receiving the output from step 1312, at step 1314 the mapping module 114 (of the mapping device 108) generates the 3D map by using the 3D model of the object already stored in the object database 110. The 3D includes the virtual object at the same location as the real object, e.g. using the received anchor points, the centroid and/or the cuboid. In some examples, the camera device 104 includes the mapping module 114 for generating the 3D map which includes the object.

In some examples, for example when the mapping module 114 and/or the mapping device 108 is in the camera device 104, step 1312 is not required and the mapping module 114 of the camera device 104 performs step 1314 as follows: generating, using the mapping module 114, the object label, the anchor points, and at least one of the cuboid in the real world coordinates of the real 3D space, a centroid of the cuboid, or the bounding box of the object with at least one of the images: a 3D map which includes the object located in the real world coordinates of the real 3D space. For example, the mapping module 114 generates the 3D map by using the 3D model of the object already stored in the object database 110, and inserts the 3D model of the object at the virtual location which is the same as the location of the object.

Figure 14:
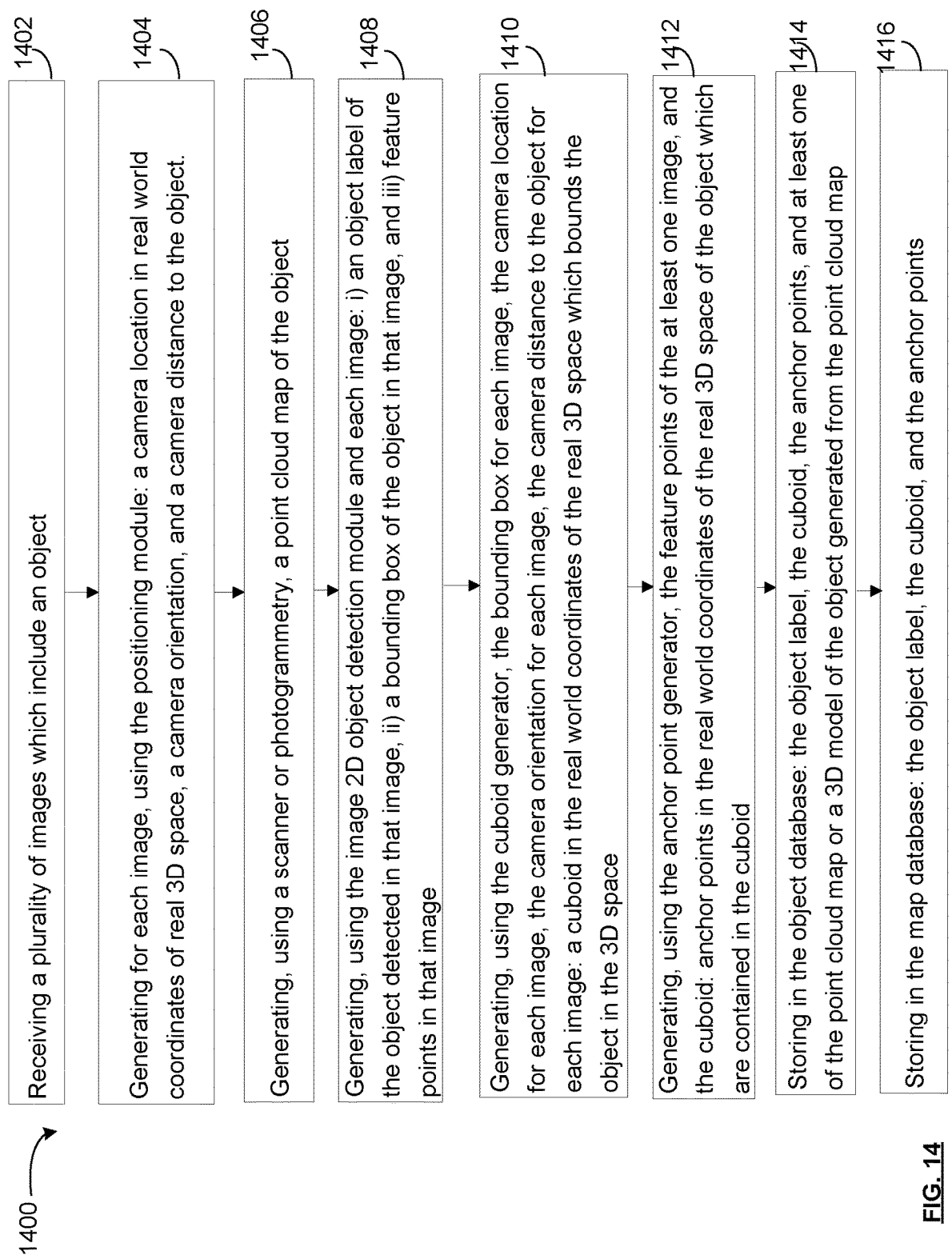
FIG. 14 illustrates an example detailed block diagram of the XR method performed by the camera device for initially mapping and 3D modelling of a real object, in accordance with an example embodiment.

FIG. 14 illustrates an example detailed block diagram of the XR method 1400 performed by the camera device 104 for initially mapping and 3D modelling of a real object, in accordance with an example embodiment. At step 1402, the camera device 104 receives at least one image which includes an object. For example, at least one image is received from the camera 522. At step 1404, the camera device 104 generates, for each image, using the positioning module 518: a camera location in real world coordinates of real 3D space, a camera orientation, and a camera distance to the object. At step 1406, the camera device 104 generates, using a scanner such as a LiDAR scanner or photogrammetry such as ARCore: a point cloud map of the object. At step 1408, the camera device 104 generates, using the image 2D object detection module 510 and each image: i) an object label of the object detected in that image, ii) a bounding box of the object in that image, and iii) feature points in that image. At step 1410, the camera device 104 generates, using the cuboid generator 512, the bounding box for each image, the camera location for each image, the camera orientation for each image, the camera distance to the object for each image: a cuboid in the real world coordinates of the real 3D space which bounds the object in the real 3D space. At step 1412, the camera device 104 generates, using the anchor point generator 524, the feature points of at least one image, and the cuboid: anchor points in the real world coordinates of the real 3D space of the object which are contained in the cuboid. At step 1414, the camera device 104 stores in the object database 110 (e.g. directly or by sending to the mapping device 108): the object label, the cuboid, the anchor points, and at least one of the point cloud map or a 3D model of the object generated from the point cloud map. At step 1416, the camera device 104 stores in the map database 112 (e.g. directly or by sending to the mapping device 108): the object label, the cuboid in the real world coordinates of the real 3D space, and the anchor points.

Figure 15:
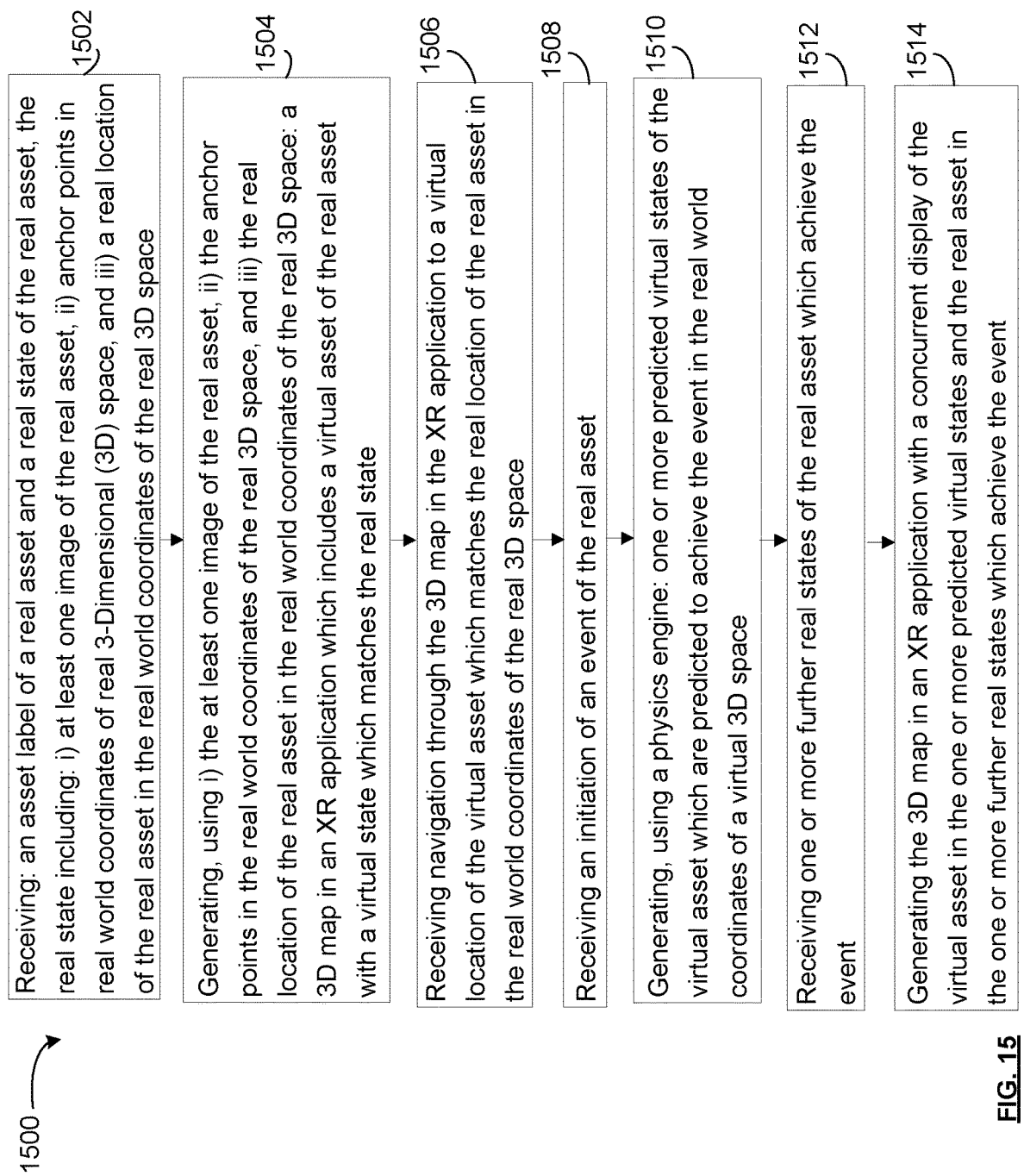
FIG. 15 illustrates an example detailed block diagram of the XR method for digital twins, in accordance with an example embodiment.

FIG. 15 illustrates an example detailed block diagram of the XR method 1500 for digital twins, performed by the mapping device 108, in accordance with an example embodiment. In other examples, the XR method 1500 can be performed at least partially or wholly by the camera device 104.

At step 1502, the mapping device 108 receives: an asset label of a real asset and a real state of the real asset, the real state including: i) at least one image of the real asset, ii) anchor points in real world coordinates of real 3-Dimensional (3D) space, and iii) a real location of the real asset in the real world coordinates of the real 3D space. At step 1504, the mapping device 108 generates, using i) the at least one image of the real asset, ii) the anchor points in the real world coordinates of the real 3D space, and iii) the real location of the real asset in the real world coordinates of the real 3D space: a 3D map in an XR application which includes a virtual asset of the real asset with a virtual state which matches the real state. At step 1506, the mapping device 108 receives navigation through the 3D map in the XR application to a virtual location of the virtual asset which matches the real location of the real asset in the real world coordinates of the real 3D space. At step 1508, the mapping device 108 receives an initiation of an event of the real asset. At step 1510, the mapping device 108 generates, using a physics engine: one or more predicted virtual states of the virtual asset which are predicted to achieve the event in the real world coordinates of a virtual 3D space. At step 1512, the mapping device 108 receives one or more further real states of the real asset which achieve the event. At step 1514, the mapping device 108 generates the 3D map in an XR application with a concurrent display of the virtual asset in the one or more predicted virtual states and the real asset in the one or more further real states which achieve the event.

Figure 16:
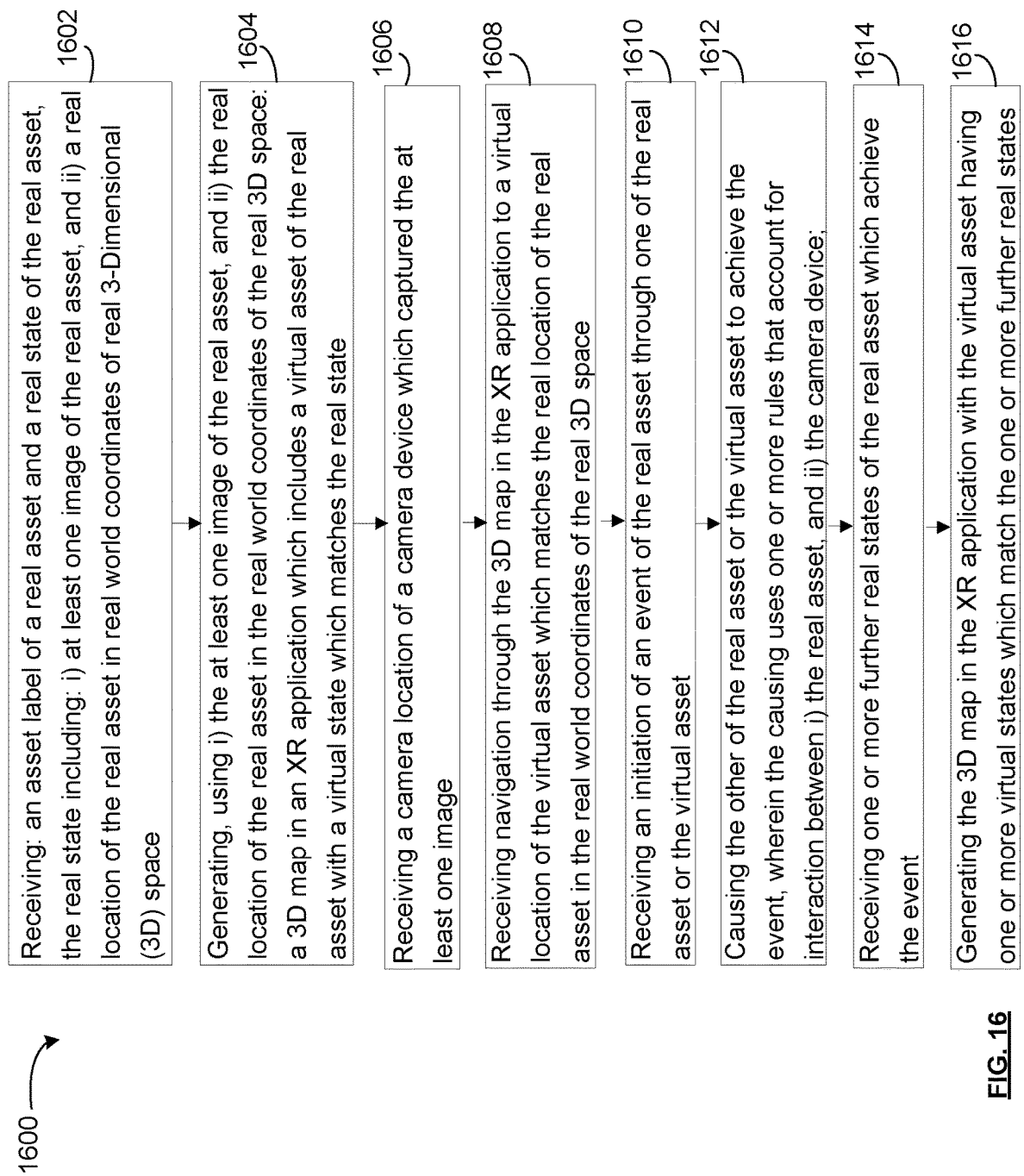
FIG. 16 illustrates another example detailed block diagram of the XR method for digital twins, in accordance with an example embodiment.

FIG. 16 illustrates another example detailed block diagram of the XR method 1600 for digital twins performed by the mapping device 108, in accordance with an example embodiment. In other examples, the XR method 1500 can be performed at least partially or wholly by the camera device 104.

At step 1602, the mapping device 108 receives: an asset label of a real asset and a real state of the real asset, the real state including: i) at least one image of the real asset, and ii) a real location of the real asset in real world coordinates of real 3-Dimensional (3D) space. At step 1604, the mapping device 108 generates, using i) the at least one image of the real asset, and ii) the real location of the real asset in the real world coordinates of the real 3D space: a 3D map in an XR application which includes a virtual asset of the real asset with a virtual state which matches the real state. At step 1606, the mapping device 108 receives a camera location of a camera device which captured the at least one image. At step 1608, the mapping device 108 receives navigation through the 3D map in the XR application to a virtual location of the virtual asset which matches the real location of the real asset in the real world coordinates of the real 3D space. At step 1610, the mapping device 108 receives an initiation of an event of the real asset through one of the real asset or the virtual asset. At step 1612, the mapping device 108 causes the other of the real asset or the virtual asset to achieve the event, wherein the causing uses one or more rules that account for interaction between i) the real asset, and ii) the camera device. At step 1614, the mapping device 108 receives one or more further real states of the real asset which achieve the event. At step 1616, the mapping device 108 generates the 3D map in the XR application with the virtual asset having one or more virtual states which match the one or more further real states.

An example of the XR method can be applied to the scenario of event venue setup, in which real objects, stage, seating, audiovisual equipment, etc., are required to be set up at particular locations. In an example, a digital twin of a chair has a physical counterpart real chair, in which the real chair has the location moved out of a row in the real world. In an example, a predefined rule can set the location of physical chairs in a venue according to the placement of their digital twins in a virtual 3D map. So when a chair is removed from a row of chairs in the venue, the XR method can, automatically or through manual intervention, output instructions to cause the chair to be moved back to the location of its digital twin as specified in the virtual 3D map. A similar example scenario can be applied to the scenario when the pose of the real chair has been manually changed, the XR method can output instructions to move the chair back to the pose of its digital twin as specified in the virtual 3D map. Another example embodiment is that any change in the real world is prioritized as being desired, and the location of the digital twin is automatically updated to bring it into conformity with the real world object location. A similar example scenario can mirror any changes in the pose of the real chair.

In the example embodiments, it should be understood that the described XR system 100, the XR method, object 202, camera device 104, the display device 106, and the mapping device 108 may be implemented in other manners. For example, the unit division is merely a logical function division and may be another type of division in other examples. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units may be implemented in electronic, mechanical, or other forms. In some examples, the mapping device 108 may be provided on the camera device 104 or the display devices 106. In some examples, the display device 106 may be provided on the camera device 104.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of example embodiments may be implemented in the form of a software product. The software product is stored in a storage medium, and includes several instructions for instructing a computer device (which may be a personal computer, a server, or a network device) to perform all or some of the steps of the methods (including XR methods) described in the example embodiments. The foregoing storage medium includes any medium that can store program code, such as a Universal Serial Bus (USB) flash drive, a removable hard disk, a read-only memory (ROM), a random access memory (RAM), a magnetic disk, or an optical disc. In an example, the software product can be an inference model generated from a machine learning training process.

In the described methods (including XR methods) or block diagrams, the boxes may represent events, steps, functions, processes, modules, messages, and/or state-based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described herein may be separated into a number of sub-messages or sub-steps in other embodiments. Even further, some or all of the steps may be repeated, as necessary. Elements described as methods (including XR methods) or steps similarly apply to systems or subcomponents, and vice-versa. Reference to such words as "sending" or "receiving" could be interchanged depending on the perspective of the particular device.

The described embodiments are considered to be illustrative and not restrictive. Example embodiments described as methods (including XR methods) would similarly apply to systems or devices, and vice-versa.

The various example embodiments are merely examples and are in no way meant to limit the scope of the example embodiments. Variations of the innovations described herein will be apparent to persons of ordinary skill in the art, such variations being within the intended scope of the example embodiments. In particular, features from one or more of the example embodiments may be selected to create alternative embodiments comprised of a sub-combination of features which may not be explicitly described. In addition, features from one or more of the described example embodiments may be selected and combined to create alternative example embodiments composed of a combination of features which may not be explicitly described. Features suitable for such combinations and sub-combinations would be readily apparent to persons skilled in the art. The subject matter described herein intends to cover all suitable changes in technology.

What is claimed is:

1. An extended reality (XR) method performed by at least one processor, the XR method comprising:
   receiving: an asset label of a real asset and a real state of the real asset, the real state including: i) at least one image of the real asset, ii) anchor points in real world coordinates of real 3-Dimensional (3D) space, and iii) a real location of the real asset in the real world coordinates of the real 3D space;
   generating, using i) the at least one image of the real asset, ii) the anchor points in the real world coordinates of the real 3D space, and iii) the real location of the real asset in the real world coordinates of the real 3D space: a 3D map in an XR application which includes a virtual asset of the real asset with a virtual state which matches the real state;

receiving navigation through the 3D map in the XR application to a virtual location of the virtual asset which matches the real location of the real asset in the real world coordinates of the real 3D space;

receiving an initiation of an event of the real asset;

generating, using a physics engine: one or more predicted virtual states of the virtual asset which are predicted to achieve the event in the real world coordinates of a virtual 3D space wherein the physics engine includes a rules based model or a convolutional neural network (CNN) model;

receiving one or more further real states of the real asset which achieve the event;

generating the 3D map in an XR application with a concurrent display of the virtual asset in the one or more predicted virtual states and the real asset in the one or more further real states which achieve the event; and generating for display the 3D map on a display, wherein the at least one image of the real asset is taken from a camera device, wherein the receiving the initiation of the event is from the real asset, wherein the receiving the initiation of the event includes receiving a communication from the real asset, wherein the receiving the initiation of the event includes:
receiving one or more further real states of the real asset, and
detecting a change in the real state of the real asset, wherein the receiving the one or more further real states of the real asset includes receiving a respective bounding box for each of the at least one image of the real asset, and wherein the detecting the change in the real state includes comparing the respective bounding box and the at least one image of the real asset with a known attribute of the real asset.

2. The extended reality method of claim 1, wherein the receiving the one or more further real states of the real asset includes receiving a centroid of a cuboid of the real asset in the real world coordinates of the real 3D space, and wherein the detecting the change in the real state includes comparing the centroid with a known centroid of the real asset.

3. The extended reality method of claim 1, wherein the receiving the one or more further real states of the real asset includes receiving a cuboid in the real world coordinates of the real 3D space, and wherein the detecting the change in the real state includes comparing the cuboid with a known cuboid of the real asset.

4. The extended reality method of claim 1, wherein the receiving the one or more further real states of the real asset includes receiving further anchor points of the real asset, and wherein the detecting the change in the real state includes comparing the further anchor points with known anchor points of the real asset.

5. The extended reality method of claim 1, further comprising generating a cuboid of the real asset or a centroid of the cuboid using the anchor points of the real asset, wherein the detecting the change in the real state includes comparing the cuboid or the centroid with a known cuboid of the real asset or a known centroid of the real asset.

6. The extended reality method of claim 1, wherein the receiving the one or more further real states of the real asset includes receiving a pose in the real world coordinates of the real 3D space, and wherein the detecting the change in the real state includes comparing the pose with a known pose of the real asset.

7. The extended reality method of claim 1, wherein the receiving the one or more further real states of the real asset includes receiving further anchor points, and wherein the detecting the change in the real state includes using the further anchor points to determine a change in a pose in the real world coordinates of the real 3D space of the real asset.

8. The extended reality method of claim 1, wherein the receiving the one or more further real states of the real asset includes receiving a 3D model or a point cloud of the real asset, and wherein the detecting the change in the real state includes comparing the 3D model or the point cloud with a known 3D model or a known point cloud of the real asset.

9. The extended reality method of claim 1, wherein the receiving the one or more further real states of the real asset includes receiving sensor information other than visually detected information of the real asset wherein the detecting the change in the real state uses the sensor information.

10. The extended reality method of claim 1, further comprising determining that the one or more predicted virtual states does not match the one or more further real states of the real asset which achieve the event, and in response causing the real asset to change the one or more further real states of the real asset to match the one or more predicted virtual states.

11. The extended reality method of claim 10, wherein the causing includes sending an instruction to the real asset.

12. The extended reality method of claim 1, further comprising determining that the one or more predicted virtual states does not match the one or more further real states of the real asset which achieve the event, and in response updating the virtual state of the virtual asset in the 3D map of the XR application to match at least the one of the real states of the real asset.

13. The extended reality method of claim 1, wherein the receiving the real state include receiving at least one of: a cuboid in the real world coordinates of the 3D space of the real asset; a centroid of the cuboid in the real world coordinates of the 3D space; or a respective bounding box for each of the at least one image of the real asset.

14. The extended reality method of claim 1, wherein the one or more predicted virtual states of the virtual asset which are predicted to achieve the event include one or more further virtual locations of the virtual asset, wherein the one or more further real states to achieve the event includes one or more further real locations of the real asset.

15. The extended reality method of claim 1, wherein the one or more predicted virtual states of the virtual asset which are predicted to achieve the event include predicted anchor points, wherein the one or more further real states to achieve the event includes one or more further anchor points.

16. The extended reality method of claim 1, further comprising receiving: a location of a camera device that captured the at least one image of the real asset;
wherein the generating the one or more predicted virtual states includes accounting for interaction between i) the real asset and ii) the camera device.

17. The extended reality method of claim 1, further comprising receiving a second asset label of a second real asset and one or more second real states of the second real as set;
wherein the generating the one or more predicted virtual states includes accounting for real interaction between i) the real asset and ii) the second real asset.

18. The extended reality method of claim 1, the real location is represented by: the anchor points in the real world coordinates of the real 3D space, a cuboid of the real asset in the real world coordinates of the real 3D space, and/or a centroid of the cuboid in the real world coordinates of the real 3D space.

19. The extended reality method of claim 1, further comprising retrieving a point cloud map or a 3D model of the real asset from an object database, retrieving a map of a real world in the real world coordinates of the real 3D space from a map database, and wherein the generating the 3D map includes inserting the point cloud map or the 3D model of the real asset into the map of the real world using the anchor points in the real world coordinates of the real 3D space.

20. The extended reality method of claim 1, further comprising updating a training of the physics engine using: the one or more predicted virtual states of the virtual asset which are predicted to achieve the event and the one or more further real states of the real asset which achieve the event.

21. The extended reality method of claim 1, a wherein the display is a 360 degree display, wherein the camera device includes the 360 degree display.

22. An extended reality (XR) system, comprising:
a camera device for capturing at least one image of a real asset;
at least one processor; and
memory containing instructions which, when executed by the at least one processor, cause the at least one processor to:
receive: an asset label of a real asset and a real state of the real asset, the real state including: i) at least one image of the real asset, ii) anchor points in real world coordinates of real 3-Dimensional (3D) space, and iii) a real location of the real asset in the real world coordinates of the real 3D space;
generate, using i) the at least one image of the real asset, ii) the anchor points in the real world coordinates of the real 3D space, and iii) the real location of the real asset in the real world coordinates of the real 3D space: a 3D map in an XR application which includes a virtual asset of the real asset with a virtual state which matches the real state;
receive navigation through the 3D map in the XR application to a virtual location of the virtual asset which matches the real location of the real asset in the real world coordinates of the real 3D space;
receive an initiation of an event of the real asset;
generate, using a physics engine: one or more predicted virtual states of the virtual asset which are predicted to achieve the event in the real world coordinates of a virtual 3D space, wherein the physics engine includes a rules based model or a convolutional neural network (CNN) model;
receive one or more further real states of the real asset which achieve the event;
generate the 3D map in an XR application with a concurrent display of the virtual asset in the one or more predicted virtual states and the real asset in the one or more further real states which achieve the event; and
generate for display the 3D map on a display, wherein the at least one image of the real asset is taken from the camera device,
wherein the receive the initiation of the event is from the real asset,
wherein the receive the initiation of the event includes receive a communication from the real asset,
wherein the receive the initiation of the event includes:
receive one or more further real states of the real asset, and
detect a change in the real state of the real asset,
wherein the receive the one or more further real states of the real asset includes receive a respective bounding box for each of the at least one image of the real asset, and wherein the detect the change in the real state includes compare the respective bounding box and the at least one image of the real asset with a known attribute of the real asset.

23. A non-transitory memory containing instructions which, when executed by at least one processor, cause at least one processor to perform an extended reality (XR) method, the instructions comprising:
instructions for receiving: an asset label of a real asset and a real state of the real asset, the real state including: i) at least one image of the real asset, ii) anchor points in real world coordinates of real 3-Dimensional (3D) space, and iii) a real location of the real asset in the real world coordinates of the real 3D space;
instructions for generating, using i) the at least one image of the real asset, ii) the anchor points in the real world coordinates of the real 3D space, and iii) the real location of the real asset in the real world coordinates of the real 3D space: a 3D map in an XR application which includes a virtual asset of the real asset with a virtual state which matches the real state;
instructions for receiving navigation through the 3D map in the XR application to a virtual location of the virtual asset which matches the real location of the real asset in the real world coordinates of the real 3D space;
instructions for receiving an initiation of an event of the real asset;
instructions for generating, using a physics engine: one or more predicted virtual states of the virtual asset which are predicted to achieve the event in the real world coordinates of a virtual 3D space, wherein the physics engine includes a rules based model or a convolutional neural network (CNN) model;
instructions for receiving one or more further real states of the real asset which achieve the event;
instructions for generating the 3D map in an XR application with a concurrent display of the virtual asset in the one or more predicted virtual states and the real asset in the one or more further real states which achieve the event; and
instructions for generating for display the 3D map on a display, wherein the at least one image of the real asset is taken from a camera device,
wherein the receiving the initiation of the event is from the real asset,
wherein the receiving the initiation of the event includes receiving a communication from the real asset,
wherein the receiving the initiation of the event includes:
receiving one or more further real states of the real asset, and
detecting a change in the real state of the real asset,
wherein the receiving the one or more further real states of the real asset includes receiving a respective bounding box for each of the at least one image of the real asset, and wherein the detecting the change in the real state includes comparing the respective bounding box and the at least one image of the real asset with a known attribute of the real asset.

* * * * *